(12) United States Patent
Chang et al.

(10) Patent No.: US 11,402,612 B2
(45) Date of Patent: *Aug. 2, 2022

(54) OPTICAL IMAGE CAPTURING SYSTEM

(71) Applicant: ABILITY OPTO-ELECTRONICS TECHNOLOGY CO., LTD., Taichung (TW)

(72) Inventors: Yeong-Ming Chang, Taichung (TW); Chien-Hsun Lai, Taichung (TW); Yao-Wei Liu, Taichung (TW)

(73) Assignee: ABILITY OPTO-ELECTRONICS TECHNOLOGY CO., LTD., Taichung (TW)

( * ) Notice: Subject to any disclaimer, the term of this patent is extended or adjusted under 35 U.S.C. 154(b) by 681 days.

This patent is subject to a terminal disclaimer.

(21) Appl. No.: 16/202,733

(22) Filed: Nov. 28, 2018

(65) Prior Publication Data

US 2019/0361202 A1 Nov. 28, 2019

(30) Foreign Application Priority Data

May 23, 2018 (TW) ................................ 107117573

(51) Int. Cl.
*G02B 13/00* (2006.01)
*G02B 9/64* (2006.01)
*H04N 5/225* (2006.01)

(52) U.S. Cl.
CPC ........... *G02B 13/0045* (2013.01); *G02B 9/64* (2013.01); *G02B 13/008* (2013.01); *H04N 5/2253* (2013.01)

(58) Field of Classification Search
CPC .... G02B 9/64; G02B 13/0045; G02B 13/008; G02B 13/002; G02B 13/0015;
(Continued)

(56) References Cited

U.S. PATENT DOCUMENTS 10,473,896 B2 * 11/2019 Chang ................. G02B 13/0045
10,502,933 B2 * 12/2019 Chang .................. G02B 13/008
(Continued)

FOREIGN PATENT DOCUMENTS

CN 106483629 A 3/2017
CN 106547071 A 3/2017
(Continued)

OTHER PUBLICATIONS

Search Report issued in TW107117573 dated Mar. 5, 2020 with English translation, 2 pages.
(Continued)

*Primary Examiner* — Derek S. Chapel
*Assistant Examiner* — Adam W Booher
(74) *Attorney, Agent, or Firm* — Muncy, Geissler, Olds & Lowe, P.C.

(57) ABSTRACT

An optical image capturing system includes, along the optical axis in order from an object side to an image side, a first lens, a second lens, a third lens, a fourth lens, a fifth lens, a sixth lens, and a seventh lens. At least one lens among the first to the sixth lenses has positive refractive force. The seventh lens can have negative refractive force, wherein both the surfaces of the seventh lens are aspheric surfaces, and at least one surface of the seventh lens has an inflection point. The lenses in the optical image capturing system which have refractive power include the first to the seventh lenses. The optical image capturing system can increase aperture value and improve the imaging quality for use in compact cameras.

24 Claims, 30 Drawing Sheets

(58) Field of Classification Search
CPC .... G02B 13/001; G02B 13/14; G02B 13/146; G02B 13/18; H04N 5/2253
See application file for complete search history.

(56) References Cited

U.S. PATENT DOCUMENTS

| | | |
|---|---|---|
| 2006/0007558 A1 | 1/2006 | Hirata |
| 2017/0082835 A1* | 3/2017 | Tang ..................... G02B 13/06 |
| 2017/0090158 A1* | 3/2017 | Tang ........................ G02B 9/64 |
| 2017/0131521 A1* | 5/2017 | Tang ................... G02B 27/646 |
| 2017/0139186 A1* | 5/2017 | Tang ................. G02B 13/0055 |
| 2019/0204542 A1* | 7/2019 | Lai ........................... G02B 9/60 |

FOREIGN PATENT DOCUMENTS

| | | |
|---|---|---|
| CN | 106556913 A | 4/2017 |
| CN | 106855654 A | 6/2017 |
| CN | 107402432 A | 11/2017 |
| CN | 107765395 A | 3/2018 |
| CN | 107966783 A | 4/2018 |
| JP | 2015161871 A | 9/2015 |
| JP | 2016085431 A | 5/2016 |
| TW | 201708868 A | 3/2017 |

OTHER PUBLICATIONS

Search Report issued in CN2019104355496 dated Mar. 2, 2021 with English translation, 5 pages.

* cited by examiner

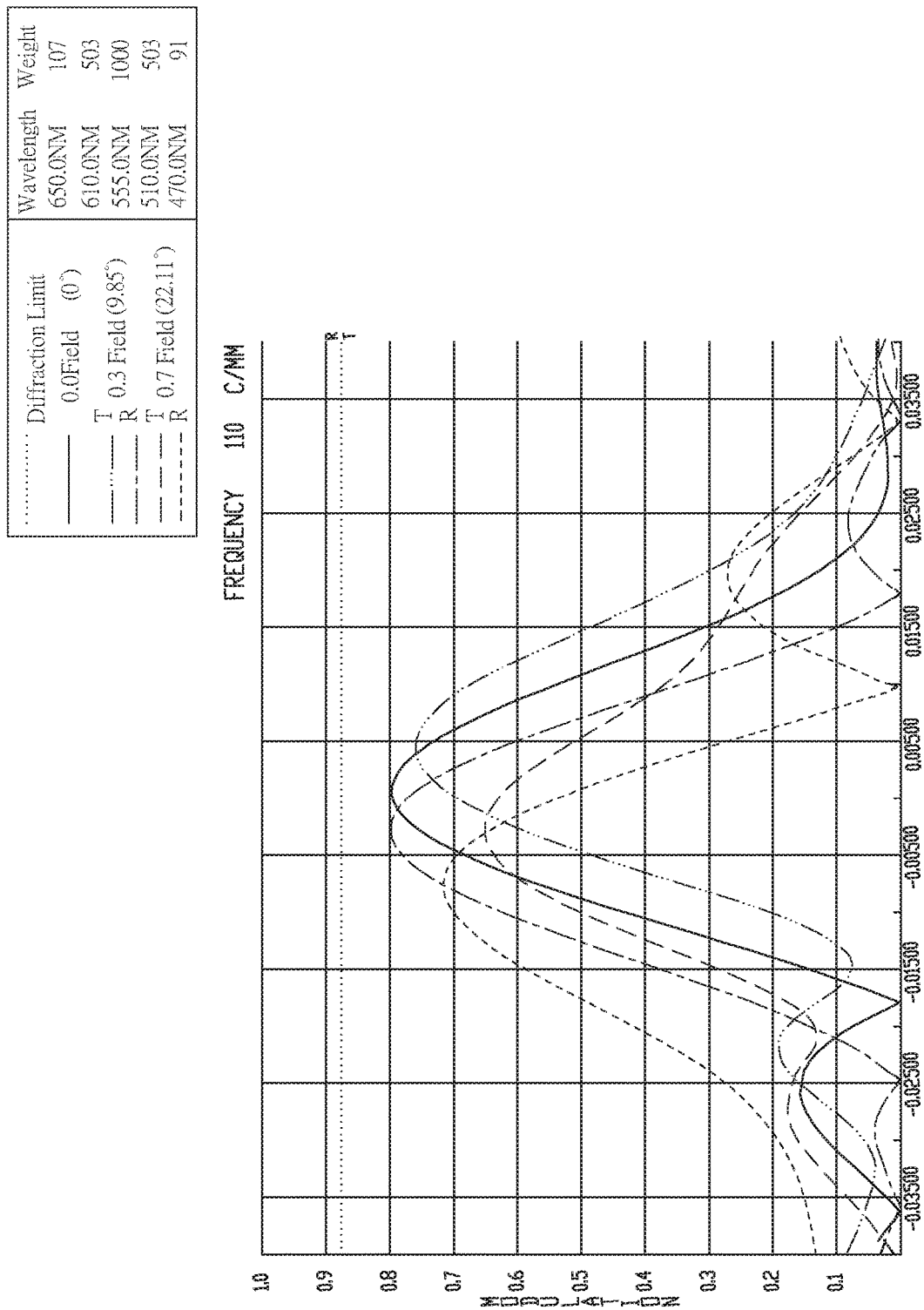

OPTICAL IMAGE CAPTURING SYSTEM

BACKGROUND OF THE INVENTION

Technical Field

The present invention relates generally to an optical system, and more particularly to a compact optical image capturing system for an electronic device.

Description of Related Art

In recent years, with the rise of portable electronic devices having camera functionalities, the demand for an optical image capturing system is raised gradually. The image sensing device of the ordinary photographing camera is commonly selected from charge coupled device (CCD) or complementary metal-oxide semiconductor sensor (CMOS Sensor). In addition, as advanced semiconductor manufacturing technology enables the minimization of the pixel size of the image sensing device, the development of the optical image capturing system towards the field of high pixels. Therefore, the requirement for high imaging quality is rapidly raised.

The conventional optical system of the portable electronic device usually has five or six lenses. However, the optical system is asked to take pictures in a dark environment, in other words, the optical system is asked to have a large aperture. The conventional optical system provides high optical performance as required.

It is an important issue to increase the quantity of light entering the lens. In addition, the modern lens is also asked to have several characters, including high image quality.

BRIEF SUMMARY OF THE INVENTION

The aspect of embodiment of the present disclosure directs to an optical image capturing system and an optical image capturing lens which use combination of refractive powers, convex and concave surfaces of seven-piece optical lenses (the convex or concave surface in the disclosure denotes the geometrical shape of an image-side surface or an object-side surface of each lens on an optical axis) to increase the quantity of incoming light of the optical image capturing system, and to improve imaging quality for image formation, so as to be applied to minimized electronic products.

In addition, when it comes to certain application of optical imaging, there will be a need to capture image via light sources with wavelengths in both visible and infrared ranges, an example of this kind of application is IP video surveillance camera, which is equipped with the Day & Night function. The visible light spectrum for human vision has wavelengths ranging from 400 to 700 nm, but the image formed on the camera sensor includes infrared light, which is invisible to human eyes. Therefore, under certain circumstances, an IR cut filter removable (ICR) is placed before the sensor of the IP video surveillance camera, in order to ensure that only the light that is visible to human eyes is picked up by the sensor eventually, so as to enhance the "fidelity" of the image. The ICR of the IP video surveillance camera can completely filter out the infrared light under daytime mode to avoid color cast; whereas under night mode, it allows infrared light to pass through the lens to enhance the image brightness. Nevertheless, the elements of the ICR occupy a significant amount of space and are expensive, which impede to the design and manufacture of miniaturized surveillance cameras in the future.

The aspect of embodiment of the present disclosure directs to an optical image capturing system and an optical image capturing lens which utilize the combination of refractive powers, convex surfaces and concave surfaces of seven lenses, as well as the selection of materials thereof, to reduce the difference between the imaging focal length of visible light and imaging focal length of infrared light, in order to achieve the near "confocal" effect without the use of ICR elements.

The term and its definition to the lens parameter in the embodiment of the present are shown as below for further reference.

The lens parameters related to the magnification of the optical image capturing system The optical image capturing system can be designed and applied to biometrics, for example, facial recognition. When the embodiment of the present disclosure is configured to capture image for facial recognition, the infrared light can be adopted as the operation wavelength. For a face of about 15 centimeters (cm) wide at a distance of 25-30 cm, at least 30 horizontal pixels can be formed in the horizontal direction of an image sensor (pixel size of 1.4 micrometers ($\mu$m)). The linear magnification of the infrared light on the image plane is LM, and it meets the following conditions: LM≥0.0003, where LM=(30 horizontal pixels)*(1.4 $\mu$m pixel size)/(15 cm, width of the photographed object). Alternatively, the visible light can also be adopted as the operation wavelength for image recognition. When the visible light is adopted, for a face of about 15 cm wide at a distance of 25-30 cm, at least 50 horizontal pixels can be formed in the horizontal direction of an image sensor (pixel size of 1.4 micrometers ($\mu$m)).

The lens parameter related to a length or a height in the lens:

For visible light spectrum, the present invention may adopt the wavelength of 555 nm as the primary reference wavelength and the basis for the measurement of focus shift; for infrared spectrum (700-1000 nm), the present invention may adopt the wavelength of 850 nm as the primary reference wavelength and the basis for the measurement of focus shift.

The optical image capturing system includes a first image plane and a second image plane. The first image plane is an image plane specifically for the visible light, and the first image plane is perpendicular to the optical axis; the through-focus modulation transfer rate (value of MTF) at the first spatial frequency has a maximum value at the central field of view of the first image plane; the second image plane is an image plane specifically for the infrared light, and second image plane is perpendicular to the optical axis; the through-focus modulation transfer rate (value of MTF) at the first spatial frequency has a maximum value in the central of field of view of the second image plane. The optical image capturing system also includes a first average image plane and a second average image plane. The first average image plane is an image plane specifically for the visible light, and the first average image plane is perpendicular to the optical axis. The first average image plane is installed at the average position of the defocusing positions, where the values of MTF of the visible light at the central field of view, 0.3 field of view, and the 0.7 field of view are at their respective maximum at the first spatial frequency. The second average image plane is an image plane specifically for the infrared light, and the second average image plane is perpendicular to the optical axis. The second average image plane is installed at the average position of the defocusing positions, where the values of MTF of the infrared light at the central field of view, 0.3 field of view, and the 0.7 field of view are at their respective maximum at the first spatial frequency.

The aforementioned first spatial frequency is set to be half of the spatial frequency (half frequency) of the image sensor (sensor) used in the present invention. For example, for an image sensor having the pixel size of 1.12 m or less, the quarter spatial frequency, half spatial frequency (half frequency) and full spatial frequency (full frequency) in the characteristic diagram of modulation transfer function are at least 110 cycles/mm, 220 cycles/mm and 440 cycles/mm, respectively. Lights of any field of view can be further divided into sagittal ray and tangential ray.

The focus shifts where the through-focus MTF values of the visible sagittal ray at the central field of view, 0.3 field of view, and 0.7 field of view of the optical image capturing system are at their respective maxima, are denoted by VSFS0, VSFS3, and VSFS7 (unit of measurement: mm), respectively. The maximum values of the through-focus MTF of the visible sagittal ray at the central field of view, 0.3 field of view, and 0.7 field of view are denoted by VSMTF0, VSMTF3, and VSMTF7, respectively. The focus shifts where the through-focus MTF values of the visible tangential ray at the central field of view, 0.3 field of view, and 0.7 field of view of the optical image capturing system are at their respective maxima, are denoted by VTFS0, VTFS3, and VTFS7 (unit of measurement: mm), respectively. The maximum values of the through-focus MTF of the visible tangential ray at the central field of view, 0.3 field of view, and 0.7 field of view are denoted by VTMTF0, VTMTF3, and VTMTF7, respectively. The average focus shift (position) of both the aforementioned focus shifts of the visible sagittal ray at three fields of view and focus shifts of the visible tangential ray at three fields of view is denoted by AVFS (unit of measurement: mm), which equals to the absolute value |(VSFS0+VSFS3+VSFS7+VTFS0+VTFS3+VTFS7)/6|.

The focus shifts where the through-focus MTF values of the infrared sagittal ray at the central field of view, 0.3 field of view, and 0.7 field of view of the optical image capturing system are at their respective maxima, are denoted by ISFS0, ISFS3, and ISFS7 (unit of measurement: mm), respectively. The average focus shift (position) of the aforementioned focus shifts of the infrared sagittal ray at three fields of view is denoted by AISFS (unit of measurement: mm). The maximum values of the through-focus MTF of the infrared sagittal ray at the central field of view, 0.3 field of view, and 0.7 field of view are denoted by ISMTF0, ISMTF3, and ISMTF7, respectively. The focus shifts where the through-focus MTF values of the infrared tangential ray at the central field of view, 0.3 field of view, and 0.7 field of view of the optical image capturing system are at their respective maxima, are denoted by ITFS0, ITFS3, and ITFS7 (unit of measurement: mm), respectively. The average focus shift (position) of the aforementioned focus shifts of the infrared tangential ray at three fields of view is denoted by AITFS (unit of measurement: mm). The maximum values of the through-focus MTF of the infrared tangential ray at the central field of view, 0.3 field of view, and 0.7 field of view are denoted by ITMTF0, ITMTF3, and ITMTF7, respectively. The average focus shift (position) of both of the aforementioned focus shifts of the infrared sagittal ray at the three fields of view and focus shifts of the infrared tangential ray at the three fields of view is denoted by AIFS (unit of measurement: mm), which equals the absolute value of |(ISFS0+ISFS3+ISFS7+ITFS0+ITFS3+ITFS7)/6|.

The focus shift (difference) between the focal points of the visible light and the infrared light at their central fields of view (RGB/IR) of the entire optical image capturing system (i.e. wavelength of 850 nm versus wavelength of 555 nm, unit of measurement: mm) is denoted by FS, which satisfies the absolute value |(VSFS0+VTFS0)/2−(ISFS0+ITFS0)/2|. The difference (focus shift) between the average focus shift of the visible light in the three fields of view and the average focus shift of the infrared light in the three fields of view (RGB/IR) of the entire optical image capturing system is denoted by AFS (i.e. wavelength of 850 nm versus wavelength of 555 nm, unit of measurement: mm), which equals to the absolute value of |AIFS−AVFS|.

A maximum height for image formation of the optical image capturing system is denoted by HOI. A height of the optical image capturing system is denoted by HOS. A distance from the object-side surface of the first lens to the image-side surface of the seventh lens is denoted by InTL. A distance from the first lens to the second lens is denoted by IN12 (instance). A central thickness of the first lens of the optical image capturing system on the optical axis is denoted by TP1 (instance).

The lens parameter related to a material in the lens:

An Abbe number of the first lens in the optical image capturing system is denoted by NA1 (instance). A refractive index of the first lens is denoted by Ndl (instance).

The lens parameter related to a view angle in the lens:

A view angle is denoted by AF. Half of the view angle is denoted by HAF. A major light angle is denoted by MRA.

The lens parameter related to exit/entrance pupil in the lens:

An entrance pupil diameter of the optical image capturing system is denoted by HEP. For any surface of any lens, a maximum effective half diameter (EHD) is a perpendicular distance between an optical axis and a crossing point on the surface where the incident light with a maximum viewing angle of the system passing the very edge of the entrance pupil. For example, the maximum effective half diameter of the object-side surface of the first lens is denoted by EHD11, the maximum effective half diameter of the image-side surface of the first lens is denoted by EHD12, the maximum effective half diameter of the object-side surface of the second lens is denoted by EHD21, the maximum effective half diameter of the image-side surface of the second lens is denoted by EHD22, and so on.

The lens parameter related to a depth of the lens shape:

A displacement from a point on the object-side surface of the seventh lens, which is passed through by the optical axis, to a point on the optical axis, where a projection of the maximum effective semi diameter of the object-side surface of the seventh lens ends, is denoted by InRS71 (the depth of the maximum effective semi diameter). A displacement from a point on the image-side surface of the seventh lens, which is passed through by the optical axis, to a point on the optical axis, where a projection of the maximum effective semi diameter of the image-side surface of the seventh lens ends, is denoted by InRS72 (the depth of the maximum effective semi diameter). The depth of the maximum effective semi diameter (sinkage) on the object-side surface or the image-side surface of any other lens is denoted in the same manner.

The lens parameter related to the lens shape:

A critical point C is a tangent point on a surface of a specific lens, and the tangent point is tangent to a plane perpendicular to the optical axis and the tangent point cannot be a crossover point on the optical axis. By the definition, a distance perpendicular to the optical axis between a critical point C51 on the object-side surface of the fifth lens and the optical axis is HVT51 (instance), and a distance perpendicular to the optical axis between a critical point C52 on the image-side surface of the fifth lens and the optical axis is HVT52 (instance). A distance perpendicular to the optical axis between a critical point C61 on the object-side surface of the sixth lens and the optical axis is HVT61 (instance), and a distance perpendicular to the optical axis between a critical point C62 on the image-side surface of the sixth lens and the optical axis is HVT62 (instance). A distance perpendicular to the optical axis between a critical point on the object-side or image-side surface of other lenses, e.g., the seventh lens, and the optical axis is denoted in the same manner.

The object-side surface of the seventh lens has one inflection point IF711 which is nearest to the optical axis, and the sinkage value of the inflection point IF711 is denoted by SGI711 (instance). A distance perpendicular to the optical axis between the inflection point IF711 and the optical axis is HIF711 (instance). The image-side surface of the seventh lens has one inflection point IF721 which is nearest to the optical axis, and the sinkage value of the inflection point IF721 is denoted by SGI721 (instance). A distance perpendicular to the optical axis between the inflection point IF721 and the optical axis is HIF721 (instance).

The object-side surface of the seventh lens has one inflection point IF712 which is the second nearest to the optical axis, and the sinkage value of the inflection point IF712 is denoted by SGI712 (instance). A distance perpendicular to the optical axis between the inflection point IF712 and the optical axis is HIF712 (instance). The image-side surface of the seventh lens has one inflection point IF722 which is the second nearest to the optical axis, and the sinkage value of the inflection point IF722 is denoted by SGI722 (instance). A distance perpendicular to the optical axis between the inflection point IF722 and the optical axis is HIF722 (instance).

The object-side surface of the seventh lens has one inflection point IF713 which is the third nearest to the optical axis, and the sinkage value of the inflection point IF713 is denoted by SGI713 (instance). A distance perpendicular to the optical axis between the inflection point IF713 and the optical axis is HIF713 (instance). The image-side surface of the seventh lens has one inflection point IF723 which is the third nearest to the optical axis, and the sinkage value of the inflection point IF723 is denoted by SGI723 (instance). A distance perpendicular to the optical axis between the inflection point IF723 and the optical axis is HIF723 (instance).

The object-side surface of the seventh lens has one inflection point IF714 which is the fourth nearest to the optical axis, and the sinkage value of the inflection point IF714 is denoted by SGI714 (instance). A distance perpendicular to the optical axis between the inflection point IF714 and the optical axis is HIF714 (instance). The image-side surface of the seventh lens has one inflection point IF724 which is the fourth nearest to the optical axis, and the sinkage value of the inflection point IF724 is denoted by SGI724 (instance). A distance perpendicular to the optical axis between the inflection point IF724 and the optical axis is HIF724 (instance).

An inflection point, a distance perpendicular to the optical axis between the inflection point and the optical axis, and a sinkage value thereof on the object-side surface or image-side surface of other lenses is denoted in the same manner.

The lens parameter related to an aberration:

Optical distortion for image formation in the optical image capturing system is denoted by ODT. TV distortion for image formation in the optical image capturing system is denoted by TDT. Further, the range of the aberration offset for the view of image formation may be limited to 50%-100% field. An offset of the spherical aberration is denoted by DFS. An offset of the coma aberration is denoted by DFC.

A modulation transfer function (MTF) graph of an optical image capturing system is used to test and evaluate the contrast and sharpness of the generated images. The vertical axis of the coordinate system of the MTF graph represents the contrast transfer rate, of which the value is between 0 and 1, and the horizontal axis of the coordinate system represents the spatial frequency, of which the unit is cycles/mm or lp/mm, i.e., line pairs per millimeter. Theoretically, a perfect optical image capturing system can present all detailed contrast and every line of an object in an image. However, the contrast transfer rate of a practical optical image capturing system along a vertical axis thereof would be less than 1. In addition, peripheral areas in an image would have poorer realistic effect than a center area thereof has. For visible light spectrum, the values of MTF in the spatial frequency of 55 cycles/mm at the optical axis, 0.3 field of view, and 0.7 field of view on an image plane are respectively denoted by MTFE0, MTFE3, and MTFE7; the values of MTF in the spatial frequency of 110 cycles/mm at the optical axis, 0.3 field of view, and 0.7 field of view on an image plane are respectively denoted by MTFQ0, MTFQ3, and MTFQ7; the values of MTF in the spatial frequency of 220 cycles/mm at the optical axis, 0.3 field of view, and 0.7 field of view on an image plane are respectively denoted by MTFH0, MTFH3, and MTFH7; the values of MTF in the spatial frequency of 440 cycles/mm at the optical axis, 0.3 field of view, and 0.7 field of view on the image plane are respectively denoted by MTF0, MTF3, and MTF7. The three aforementioned fields of view respectively represent the center, the inner field of view, and the outer field of view of a lens, and, therefore, can be used to evaluate the performance of an optical image capturing system. If the optical image capturing system provided in the present invention corresponds to photosensitive components which provide pixels having a size no large than 1.12 micrometer, a quarter of the spatial frequency, a half of the spatial frequency (half frequency), and the full spatial frequency (full frequency) of the MTF diagram are respectively at least 110 cycles/mm, 220 cycles/mm and 440 cycles/mm. If an optical image capturing system is required to be able also to image for infrared spectrum, e.g., to be used in low-light environments, then the optical image capturing system should be workable in wavelengths of 850 nm or 800 nm. Since the main function for an optical image capturing system used in low-light environment is to distinguish the shape of objects by light and shade, which does not require high resolution, it is appropriate to only use spatial frequency less than 110 cycles/mm for evaluating the performance of optical image capturing system in the infrared spectrum. When the aforementioned wavelength of 850 nm focuses on the image plane, the contrast transfer rates (i.e., the values of MTF) in spatial frequency of 55 cycles/mm at the optical axis, 0.3 field of view, and 0.7 field of view on an image plane are respectively denoted by MTFI0, MTFI3, and MTFI7. However, infrared wavelengths of 850 nm or 800 nm are far away from the wavelengths of visible light; it would be difficult to design an optical image capturing system capable of focusing visible and infrared light (i.e., dual-mode) at the same time and achieving certain performance.

The present invention provides an optical image capturing system capable of focusing visible and infrared light (i.e., dual-mode) at the same time and achieving certain performance, in which the seventh lens is provided with an inflection point at the object-side surface or at the image-side surface to adjust the incident angle of each view field and modify the ODT and the TDT. In addition, the surfaces of the seventh lens are capable of modifying the optical path to improve the imagining quality.

The optical image capturing system of the present invention includes a first lens, a second lens, a third lens, a fourth lens, a fifth lens, as sixth lens, a seventh lens, a first image plane, and a second image plane. The first image plane is an image plane specifically for the visible light spectrum, and the first image plane is located at the optical axis; the through-focus modulation transfer rate (value of MTF) at the first spatial frequency has a maximum value at the first image plane; the second image plane is an image plane specifically for the infrared light spectrum, and second image plane is located at the optical axis; the through-focus modulation transfer rate (value of MTF) at the first spatial frequency has a maximum value at the second image plane. Each lens of the optical image capturing system has refractive power. The optical image capturing system satisfies:

$1.0 \le f/HEP \le 10.0$; 0 deg$<HAF \le 150$ deg; $0.2 \le SETP/STP<1$; and $|FS| \le 60$ μm;

where f1, f2, f3, f4, f5, f6, and f7 are the focal lengths of the first, the second, the third, the fourth, the fifth, the sixth, the seventh lenses, respectively; f is a focal length of the optical image capturing system; HEP is an entrance pupil diameter of the optical image capturing system; HOS is a distance on the optical axis between an object-side surface, which face the object side, of the first lens and the first image plane on the optical axis; HAF is a half of a maximum view angle of the optical image capturing system; HOI is the maximum image height on the first image plane perpendicular to the optical axis of the optical image capturing system; FS is the distance on the optical axis between the first image plane and the second image plane; ETP1, ETP2, ETP3, ETP4, ETP5, ETP6, and ETP7 are respectively a thickness in parallel with the optical axis at a height of ½ HEP of the first lens to the seventh lens, wherein SETP is a sum of the aforementioned ETP1 to ETP7; TP1, TP2, TP3, TP4, TP5, TP6, and TP7 are respectively a thickness at the optical axis of the first lens to the seventh lens, wherein STP is a sum of the aforementioned TP1 to TP7.

The present invention further provides an optical image capturing system, including a first lens, a second lens, a third lens, a fourth lens, a fifth lens, a sixth lens, a seventh lens, a first image plane, and a second image plane. The first image plane is an image plane specifically for the visible light spectrum, and the first image plane is located at the optical axis; the through-focus modulation transfer rate (value of MTF) at the first spatial frequency has a maximum value at the first image plane; the second image plane is an image plane specifically for the infrared light spectrum, and second image plane is located at the optical axis; the through-focus modulation transfer rate (value of MTF) at the first spatial frequency has a maximum value at the second image plane. The first lens has refractive power, and an object-side surface thereof could be convex near the optical axis. The second lens has refractive power. The third lens has refractive power. The fourth lens has refractive power. The fifth lens has refractive power. The sixth lens has refractive power. The seventh lens has refractive power. HOI is a maximum height for image formation perpendicular to the optical axis on the image plane. At least one lens among the first lens to the seventh lens is made of plastic. At least one lens among the first lens to the seventh lens has positive refractive power. The optical image capturing system satisfies:

$1 \le f/HEP \le 10$; 0 deg$<HAF \le 150$ deg; $0.2 \le EIN/ETL<1$; and $|FS| \le 60$ μm;

where f1, f2, f3, f4, f5, f6, and f7 are the focal lengths of the first, the second, the third, the fourth, the fifth, the sixth, the seventh lenses, respectively; f is a focal length of the optical image capturing system; HEP is an entrance pupil diameter of the optical image capturing system; HOS is a distance between the object-side surface of the first lens and the first image plane on the optical axis; HAF is a half of a maximum view angle of the optical image capturing system; HOI is the maximum image height on the first image plane perpendicular to the optical axis of the optical image capturing system; FS is the distance on the optical axis between the first image plane and the second image plane; ETL is a distance in parallel with the optical axis between a coordinate point at a height of ½ HEP on the object-side surface of the first lens and the first image plane; EIN is a distance in parallel with the optical axis between the coordinate point at the height of ½ HEP on the object-side surface of the first lens and a coordinate point at a height of ½ HEP on the image-side surface of the seventh lens.

The present invention further provides an optical image capturing system, including a first lens, a second lens, a third lens, a fourth lens, a fifth lens, a sixth lens, a seventh lens, a first average image plane, and a second average image plane. The first average image plane is an image plane specifically for the visible light, and the first average image plane is perpendicular to the optical axis. The first average image plane is installed at the average position of the defocusing positions, where the values of MTF of the visible light at the central field of view, 0.3 field of view, and the 0.7 field of view are at their respective maximum at the first spatial frequency. The second average image plane is an image plane specifically for the infrared light, and the second average image plane is perpendicular to the optical axis. The second average image plane is installed at the average position of the defocusing positions, where the values of MTF of the infrared light at the central field of view, 0.3 field of view, and the 0.7 field of view are at their respective maximum at the first spatial frequency. The number of the lenses having refractive power in the optical image capturing system is seven. HOI is a maximum height for image formation perpendicular to the optical axis on the image plane. The first lens has refractive power. The second lens has refractive power. The third lens has refractive power. The fourth lens has refractive power. The fifth lens has refractive power. The sixth lens has refractive power. The seventh lens has refractive power. The optical image capturing system satisfies:

$1.0 \le f/HEP \le 10.0$; 0 deg$<HAF \le 150$ deg; $0.2 \le SETP/STP<1$; and $|AFS| \le 60$ μm;

where f1, f2, f3, f4, f5, f6, and f7 are the focal lengths of the first, the second, the third, the fourth, the fifth, the sixth, the seventh lenses, respectively; f is a focal length of the optical image capturing system; HEP is an entrance pupil diameter of the optical image capturing system; HOS is a distance between the object-side surface of the first lens and the first average image plane on the optical axis; HAF is a half of a maximum view angle of the optical image capturing system; HOI is the maximum image height on the first average image plane perpendicular to the optical axis of the optical image capturing system; ARE is a profile curve length measured from a start point where the optical axis of the belonging optical image capturing system passes through the surface of the lens, along a surface profile of the lens, and finally to a coordinate point of a perpendicular distance where is a half of the entrance pupil diameter away from the optical axis; AFS is the distance between the first average image plane and the second average image plane; ETL is a distance in parallel with the optical axis between a coordinate point at a height of ½ HEP on the object-side surface of the first lens and the image plane; ETP1, ETP2, ETP3, ETP4, ETP5, ETP6, and ETP7 are respectively a thickness in parallel with the optical axis at a height of ½ HEP of the first lens to the seventh lens, wherein SETP is a sum of the aforementioned ETP1 to ETP7; TP1, TP2, TP3, TP4, TP5, TP6, and TP7 are respectively a thickness at the optical axis of the first lens to the seventh lens, wherein STP is a sum of the aforementioned TP1 to TP7.

For any lens, the thickness at the height of a half of the entrance pupil diameter (HEP) particularly affects the ability of correcting aberration and differences between optical paths of light in different fields of view of the common region of each field of view of light within the covered range at the height of a half of the entrance pupil diameter (HEP). With greater thickness, the ability to correct aberration is better. However, the difficulty of manufacturing increases as well. Therefore, the thickness at the height of a half of the entrance pupil diameter (HEP) of any lens has to be controlled. The ratio between the thickness (ETP) at the height of a half of the entrance pupil diameter (HEP) and the thickness (TP) of any lens on the optical axis (i.e., ETP/TP) has to be particularly controlled. For example, the thickness at the height of a half of the entrance pupil diameter (HEP) of the first lens is denoted by ETP1, the thickness at the height of a half of the entrance pupil diameter (HEP) of the second lens is denoted by ETP2, and the thickness at the height of a half of the entrance pupil diameter (HEP) of any other lens in the optical image capturing system is denoted in the same manner. The optical image capturing system of the present invention satisfies:

$0.3 \leq SETP/EIN < 1;$ where SETP is the sum of the aforementioned ETP1 to ETP7.

In order to enhance the ability of correcting aberration and to lower the difficulty of manufacturing at the same time, the ratio between the thickness (ETP) at the height of a half of the entrance pupil diameter (HEP) and the thickness (TP) of any lens on the optical axis (i.e., ETP/TP) has to be particularly controlled. For example, the thickness at the height of a half of the entrance pupil diameter (HEP) of the first lens is denoted by ETP1, the thickness of the first lens on the optical axis is TP1, and the ratio between these two parameters is ETP1/TP1; the thickness at the height of a half of the entrance pupil diameter (HEP) of the first lens is denoted by ETP2, the thickness of the second lens on the optical axis is TP2, and the ratio between these two parameters is ETP2/TP2. The ratio between the thickness at the height of a half of the entrance pupil diameter (HEP) and the thickness of any other lens in the optical image capturing system is denoted in the same manner. The optical image capturing system of the present invention satisfies:

$0.2 \leq ETP/TP \leq 3.$

The horizontal distance between two neighboring lenses at the height of a half of the entrance pupil diameter (HEP) is denoted by ED, wherein the aforementioned horizontal distance (ED) is parallel to the optical axis of the optical image capturing system, and particularly affects the ability of correcting aberration and differences between optical paths of light in different fields of view of the common region of each field of view of light at the height of a half of the entrance pupil diameter (HEP). With longer distance, the ability to correct aberration is potential to be better. However, the difficulty of manufacturing increases, and the feasibility of "slightly shorten" the length of the optical image capturing system is limited as well. Therefore, the horizontal distance (ED) between two specific neighboring lenses at the height of a half of the entrance pupil diameter (HEP) has to be controlled.

In order to enhance the ability of correcting aberration and to lower the difficulty of "slightly shorten" the length of the optical image capturing system at the same time, the ratio between the horizontal distance (ED) between two neighboring lenses at the height of a half of the entrance pupil diameter (HEP) and the parallel distance (IN) between these two neighboring lens on the optical axis (i.e., ED/IN) has to be particularly controlled. For example, the horizontal distance between the first lens and the second lens at the height of a half of the entrance pupil diameter (HEP) is denoted by ED12, the horizontal distance between the first lens and the second lens on the optical axis is denoted by IN12, and the ratio between these two parameters is ED12/IN12; the horizontal distance between the second lens and the third lens at the height of a half of the entrance pupil diameter (HEP) is denoted by ED23, the horizontal distance between the second lens and the third lens on the optical axis is denoted by IN23, and the ratio between these two parameters is ED23/IN23. The ratio between the horizontal distance between any two neighboring lenses at the height of a half of the entrance pupil diameter (HEP) and the horizontal distance between these two neighboring lenses on the optical axis is denoted in the same manner.

The horizontal distance in parallel with the optical axis between a coordinate point at the height of ½ HEP on the image-side surface of the seventh lens and the first image plane is denoted by EBL. The horizontal distance in parallel with the optical axis between the point on the image-side surface of the seventh lens where the optical axis passes through and the image plane is denoted by BL. In order to enhance the ability to correct aberration and to preserve more space for other optical components, the optical image capturing system of the present invention can satisfy: $0.2 \leq EBL/BL \leq 1.5$. The optical image capturing system can further include a filtering component, which is provided between the seventh lens and the image plane, wherein the horizontal distance in parallel with the optical axis between the coordinate point at the height of ½ HEP on the image-side surface of the seventh lens and the filtering component is denoted by EIR, and the horizontal distance in parallel with the optical axis between the point on the image-side surface of the seventh lens where the optical axis passes through and the filtering component is denoted by PIR. The optical image capturing system of the present invention can satisfy: $0.1 \leq EIR/PIR \leq 1.1$.

In an embodiment, a height of the optical image capturing system (HOS) can be reduced while $|f1|>|f7|$.

In an embodiment, when $|f2|+|f3|+|f4|+|f5|+|f6|$ and $|f1|+|f7|$ of the lenses satisfy the aforementioned conditions, at least one lens among the second to the sixth lenses could have weak positive refractive power or weak negative refractive power. Herein the weak refractive power means the absolute value of the focal length of one specific lens is greater than 10. When at least one lens among the second to the sixth lenses has weak positive refractive power, it may share the positive refractive power of the first lens, and on the contrary, when at least one lens among the second to the sixth lenses has weak negative refractive power, it may fine tune and correct the aberration of the system.

In an embodiment, the seventh lens could have negative refractive power, and an image-side surface thereof is concave, it may reduce back focal length and size. Besides, the seventh lens can have at least an inflection point on at least a surface thereof, which may reduce an incident angle of the light of an off-axis field of view and correct the aberration of the off-axis field of view.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 5D is a diagram showing the through-focus MTF values of the visible light spectrum at the central field of view, 0.3 field of view, and 0.7 field of view of the fifth embodiment of the present invention;

DETAILED DESCRIPTION OF THE INVENTION

Figure 1A:
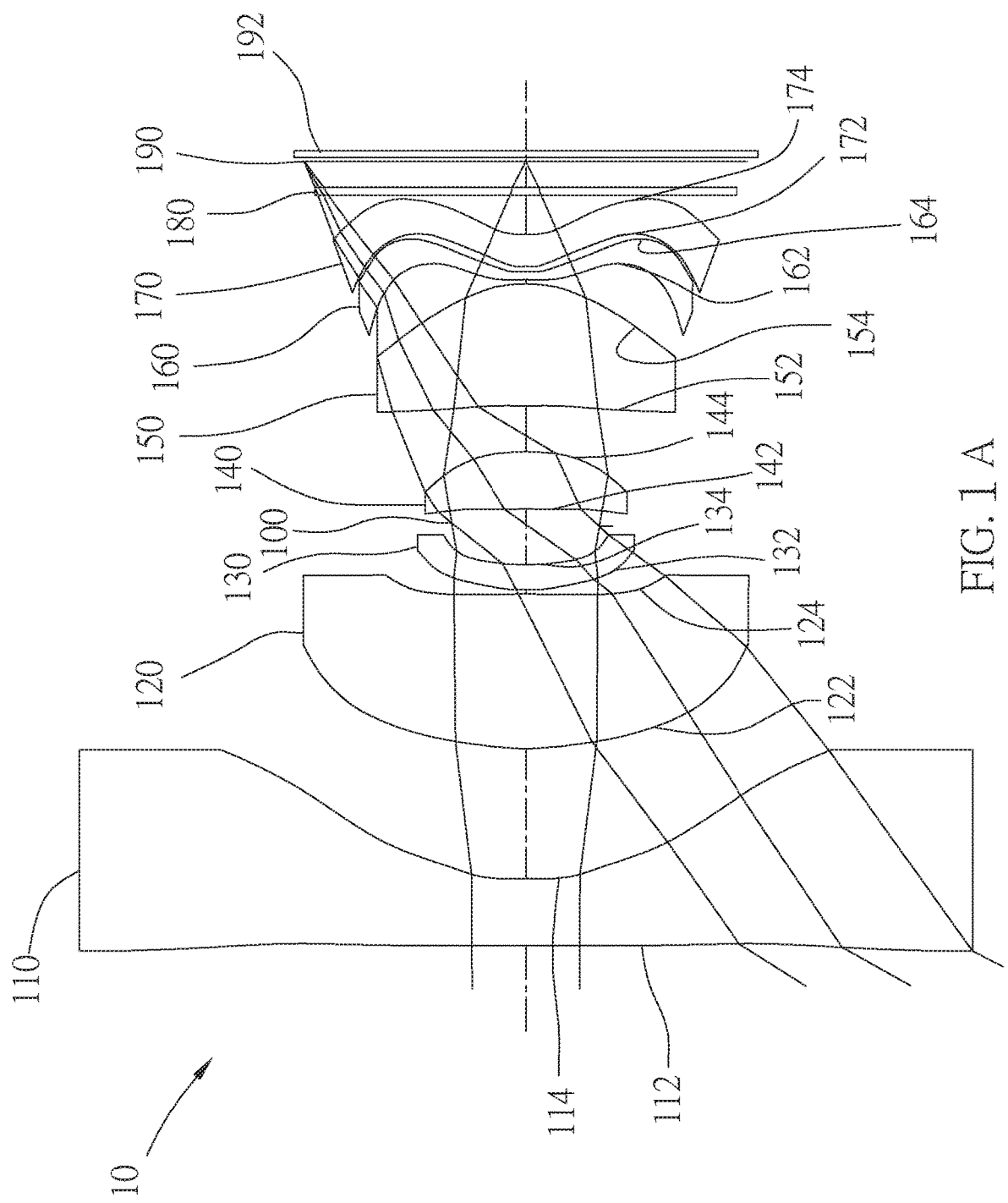
FIG. 1A is a schematic diagram of a first embodiment of the present invention.

An optical image capturing system of the present invention includes a first lens, a second lens, a third lens, a fourth lens, a fifth lens, a sixth lens, a seventh lens, and an image plane from an object side to an image side. The optical image capturing system further is provided with an image sensor at an image plane. The height for image formation in each of the following embodiments is about 3.91 mm.

The optical image capturing system can work in three wavelengths, including 486.1 nm, 587.5 nm, and 656.2 nm, wherein 587.5 nm is the main reference wavelength and is the reference wavelength for obtaining the technical characters. The optical image capturing system can also work in five wavelengths, including 480 nm, 510 nm, 555 nm, 610 nm, and 650 nm wherein 555 nm is the main reference wavelength, and is the reference wavelength for obtaining the technical characters.

The optical image capturing system of the present invention satisfies $0.5 \leq \Sigma PPR/|\Sigma NPR| \leq 15$, and a preferable range is $1 \leq \Sigma PPR/|\Sigma NPR| \leq 3.0$, where PPR is a ratio of the focal length f of the optical image capturing system to a focal length fp of each of lenses with positive refractive power; NPR is a ratio of the focal length f of the optical image capturing system to a focal length fn of each of lenses with negative refractive power; $\Sigma PPR$ is a sum of the PPRs of each positive lens; and $\Sigma NPR$ is a sum of the NPRs of each negative lens. It is helpful for control of an entire refractive power and an entire length of the optical image capturing system.

The image sensor is provided on the image plane. The optical image capturing system of the present invention satisfies $HOS/HOI \leq 10$ and $0.5 \leq HOS/f \leq 10$, and a preferable range is $1 \leq HOS/HOI \leq 5$ and $1 \leq HOS/f \leq 7$, where HOI is a half of a diagonal of an effective sensing area of the image sensor, i.e., the maximum image height, and HOS is a height of the optical image capturing system, i.e. a distance on the optical axis between the object-side surface of the first lens and the image plane. It is helpful for reduction of the size of the system for used in compact cameras.

The optical image capturing system of the present invention further is provided with an aperture to increase image quality.

In the optical image capturing system of the present invention, the aperture could be a front aperture or a middle aperture, wherein the front aperture is provided between the object and the first lens, and the middle is provided between the first lens and the image plane. The front aperture provides a long distance between an exit pupil of the system and the image plane, which allows more elements to be installed. The middle could enlarge a view angle of view of the system and increase the efficiency of the image sensor. The optical image capturing system satisfies $0.2 \leq InS/HOS \leq 1.1$, where InS is a distance between the aperture and the image-side surface of the sixth lens. It is helpful for size reduction and wide angle.

The optical image capturing system of the present invention satisfies $0.1 \leq \Sigma TP/InTL \leq 0.9$, where InTL is a distance between the object-side surface of the first lens and the image-side surface of the seventh lens, and $\Sigma TP$ is a sum of central thicknesses of the lenses on the optical axis. It is helpful for the contrast of image and yield rate of manufacture and provides a suitable back focal length for installation of other elements.

The optical image capturing system of the present invention satisfies $0.001 \leq |R1/R2| \leq 20$, and a preferable range is $0.01 \leq |R1/R2| < 10$, where R1 is a radius of curvature of the object-side surface of the first lens, and R2 is a radius of curvature of the image-side surface of the first lens. It provides the first lens with a suitable positive refractive power to reduce the increase rate of the spherical aberration.

The optical image capturing system of the present invention satisfies $-7 < (R11-R12)/(R11+R12) < 50$, where R13 is a radius of curvature of the object-side surface of the seventh lens, and R14 is a radius of curvature of the image-side surface of the seventh lens. It may modify the astigmatic field curvature.

The optical image capturing system of the present invention satisfies $IN12/f \leq 3.0$, where IN12 is a distance on the optical axis between the first lens and the second lens. It may correct chromatic aberration and improve the performance.

The optical image capturing system of the present invention satisfies $IN67/f \leq 0.8$, where IN67 is a distance on the optical axis between the sixth lens and the seventh lens. It may correct chromatic aberration and improve the performance.

The optical image capturing system of the present invention satisfies $0.1 \leq (TP1+IN12)/TP2 \leq 10$, where TP1 is a central thickness of the first lens on the optical axis, and TP2 is a central thickness of the second lens on the optical axis. It may control the sensitivity of manufacture of the system and improve the performance.

The optical image capturing system of the present invention satisfies $0.1 \leq (TP7+IN67)/TP6 \leq 10$, where TP6 is a central thickness of the sixth lens on the optical axis, TP7 is a central thickness of the seventh lens on the optical axis, and IN67 is a distance between the sixth lens and the seventh lens. It may control the sensitivity of manufacture of the system and improve the performance.

The optical image capturing system of the present invention satisfies $0.1 \leq TP4/(IN34+TP4+IN45) < 1$, where TP3 is a central thickness of the third lens on the optical axis, TP4 is a central thickness of the fourth lens on the optical axis, TP5 is a central thickness of the fifth lens on the optical axis, IN34 is a distance on the optical axis between the third lens and the fourth lens, IN45 is a distance on the optical axis between the fourth lens and the fifth lens, and InTL is a distance between the object-side surface of the first lens and the image-side surface of the seventh lens. It may fine tune and correct the aberration of the incident rays layer by layer, and reduce the height of the system.

The optical image capturing system satisfies $0 \text{ mm} \leq HVT71 \leq 3 \text{ mm}$; $0 \text{ mm} < HVT72 \leq 6 \text{ mm}$; $0 \leq HVT71/HVT72$; $0 \text{ mm} \leq |SGC71| \leq 0.5 \text{ mm}$; $0 \text{ mm} < |SGC72| \leq 2 \text{ mm}$; and $0 < |SGC72|/(SGC72|+TP7) \leq 0.9$, where HVT71 a distance perpendicular to the optical axis between the critical point C71 on the object-side surface of the seventh lens and the optical axis; HVT72 a distance perpendicular to the optical axis between the critical point C72 on the image-side surface of the seventh lens and the optical axis; SGC71 is a distance on the optical axis between a point on the object-side surface of the seventh lens where the optical axis passes through and a point where the critical point C71 projects on the optical axis; SGC72 is a distance on the optical axis between a point on the image-side surface of the seventh lens where the optical axis passes through and a point where the critical point C72 projects on the optical axis. It is helpful to correct the off-axis view field aberration.

The optical image capturing system satisfies $0.2 \leq HVT72/HOI \leq 0.9$, and preferably satisfies $0.3 \leq HVT72/HOI \leq 0.8$. It may help to correct the peripheral aberration.

The optical image capturing system satisfies $0 \leq HVT72/HOS \leq 0.5$, and preferably satisfies $0.2 \leq HVT72/HOS \leq 0.45$. It may help to correct the peripheral aberration.

The optical image capturing system of the present invention satisfies $0 < SGI711/(SGI711+TP7) \leq 0.9$; $0 < SGI721/(SGI721+TP7) \leq 0.9$, and it is preferable to satisfy $0.1 \leq SGI711/(SGI711+TP7) \leq 0.6$; $0.1 \leq SGI721/(SGI721+TP7) \leq 0.6$, where SGI711 is a displacement on the optical axis from a point on the object-side surface of the seventh lens, through which the optical axis passes, to a point where the inflection point on the object-side surface, which is the closest to the optical axis, projects on the optical axis, and SGI721 is a displacement on the optical axis from a point on the image-side surface of the seventh lens, through which the optical axis passes, to a point where the inflection point on the image-side surface, which is the closest to the optical axis, projects on the optical axis.

The optical image capturing system of the present invention satisfies 0<SGI712/(SGI712+TP7)≤0.9; 0<SGI722/(SGI722+TP7)≤0.9, and it is preferable to satisfy 0.1≤SGI712/(SGI712+TP7)≤0.6; 0.1≤SGI722/(SGI722+TP7)≤0.6, where SGI712 is a displacement on the optical axis from a point on the object-side surface of the seventh lens, through which the optical axis passes, to a point where the inflection point on the object-side surface, which is the second closest to the optical axis, projects on the optical axis, and SGI722 is a displacement on the optical axis from a point on the image-side surface of the seventh lens, through which the optical axis passes, to a point where the inflection point on the image-side surface, which is the second closest to the optical axis, projects on the optical axis.

The optical image capturing system of the present invention satisfies 0.001 mm≤|HIF711|≤5 mm; 0.001 mm≤|HIF721|≤5 mm, and it is preferable to satisfy 0.1 mm≤|HIF711|≤3.5 mm; 1.5 mm≤|HIF721|≤3.5 mm, where HIF711 is a distance perpendicular to the optical axis between the inflection point on the object-side surface of the seventh lens, which is the closest to the optical axis, and the optical axis; HIF721 is a distance perpendicular to the optical axis between the inflection point on the image-side surface of the seventh lens, which is the closest to the optical axis, and the optical axis.

The optical image capturing system of the present invention satisfies 0.001 mm≤|HIF712|≤5 mm; 0.001 mm≤|HIF722|≤5 mm, and it is preferable to satisfy 0.1 mm≤|HIF722|≤3.5 mm; 0.1 mm≤|HIF712|≤3.5 mm, where HIF712 is a distance perpendicular to the optical axis between the inflection point on the object-side surface of the seventh lens, which is the second closest to the optical axis, and the optical axis; HIF722 is a distance perpendicular to the optical axis between the inflection point on the image-side surface of the seventh lens, which is the second closest to the optical axis, and the optical axis.

The optical image capturing system of the present invention satisfies 0.001 mm≤|HIF713|≤5 mm; 0.001 mm≤|HIF723|≤5 mm, and it is preferable to satisfy 0.1 mm≤|HIF723|≤3.5 mm; 0.1 mm≤|HIF713|≤3.5 mm, where HIF713 is a distance perpendicular to the optical axis between the inflection point on the object-side surface of the seventh lens, which is the third closest to the optical axis, and the optical axis; HIF723 is a distance perpendicular to the optical axis between the inflection point on the image-side surface of the seventh lens, which is the third closest to the optical axis, and the optical axis.

The optical image capturing system of the present invention satisfies 0.001 mm≤|HIF714|≤5 mm; 0.001 mm≤|HIF724|≤5 mm, and it is preferable to satisfy 0.1 mm≤|HIF724|≤3.5 mm; 0.1 mm≤|HIF714|≤3.5 mm, where HIF714 is a distance perpendicular to the optical axis between the inflection point on the object-side surface of the seventh lens, which is the fourth closest to the optical axis, and the optical axis; HIF724 is a distance perpendicular to the optical axis between the inflection point on the image-side surface of the seventh lens, which is the fourth closest to the optical axis, and the optical axis.

In an embodiment, the lenses of high Abbe number and the lenses of low Abbe number are arranged in an interlaced arrangement that could be helpful for correction of aberration of the system.

An equation of aspheric surface is $$z=ch^2/[1+[1(k+1)c^2h^2]^{0.5}]+A4h^4+A6h^6+A8h^8+A10h^{10}+A12h^{12}+A14h^{14}+A16h^{16}+A18h^{18}+A20h^{20}+ \quad (1)$$

where z is a depression of the aspheric surface; k is conic constant; c is reciprocal of the radius of curvature; and A4, A6, A8, A10, A12, A14, A16, A18, and A20 are high-order aspheric coefficients.

In the optical image capturing system, the lenses could be made of plastic or glass. The plastic lenses may reduce the weight and lower the cost of the system, and the glass lenses may control the thermal effect and enlarge the space for arrangement of the refractive power of the system. In addition, the opposite surfaces (object-side surface and image-side surface) of the first to the seventh lenses could be aspheric that can obtain more control parameters to reduce aberration. The number of aspheric glass lenses could be less than the conventional spherical glass lenses, which is helpful for reduction of the height of the system.

When the lens has a convex surface, which means that the surface is convex around a position, through which the optical axis passes, and when the lens has a concave surface, which means that the surface is concave around a position, through which the optical axis passes.

The optical image capturing system of the present invention could be applied in a dynamic focusing optical system. It is superior in the correction of aberration and high imaging quality so that it could be allied in lots of fields.

The optical image capturing system of the present invention could further include a driving module to meet different demands, wherein the driving module can be coupled with the lenses to move the lenses. The driving module can be a voice coil motor (VCM), which is used to move the lens for focusing, or can be an optical image stabilization (OIS) component, which is used to lower the possibility of having the problem of image blurring which is caused by subtle movements of the lens while shooting.

To meet different requirements, at least one lens among the first lens to the seventh lens of the optical image capturing system of the present invention can be a light filter, which filters out light of wavelength shorter than 500 nm. Such effect can be achieved by coating on at least one surface of the lens, or by using materials capable of filtering out short waves to make the lens.

To meet different requirements, the image plane of the optical image capturing system in the present invention can be either flat or curved. If the image plane is curved (e.g., a sphere with a radius of curvature), the incidence angle required for focusing light on the image plane can be decreased, which is not only helpful to shorten the length of the system (TTL), but also helpful to increase the relative illuminance.

We provide several embodiments in conjunction with the accompanying drawings for the best understanding, which are:

First Embodiment

Figure 1B:
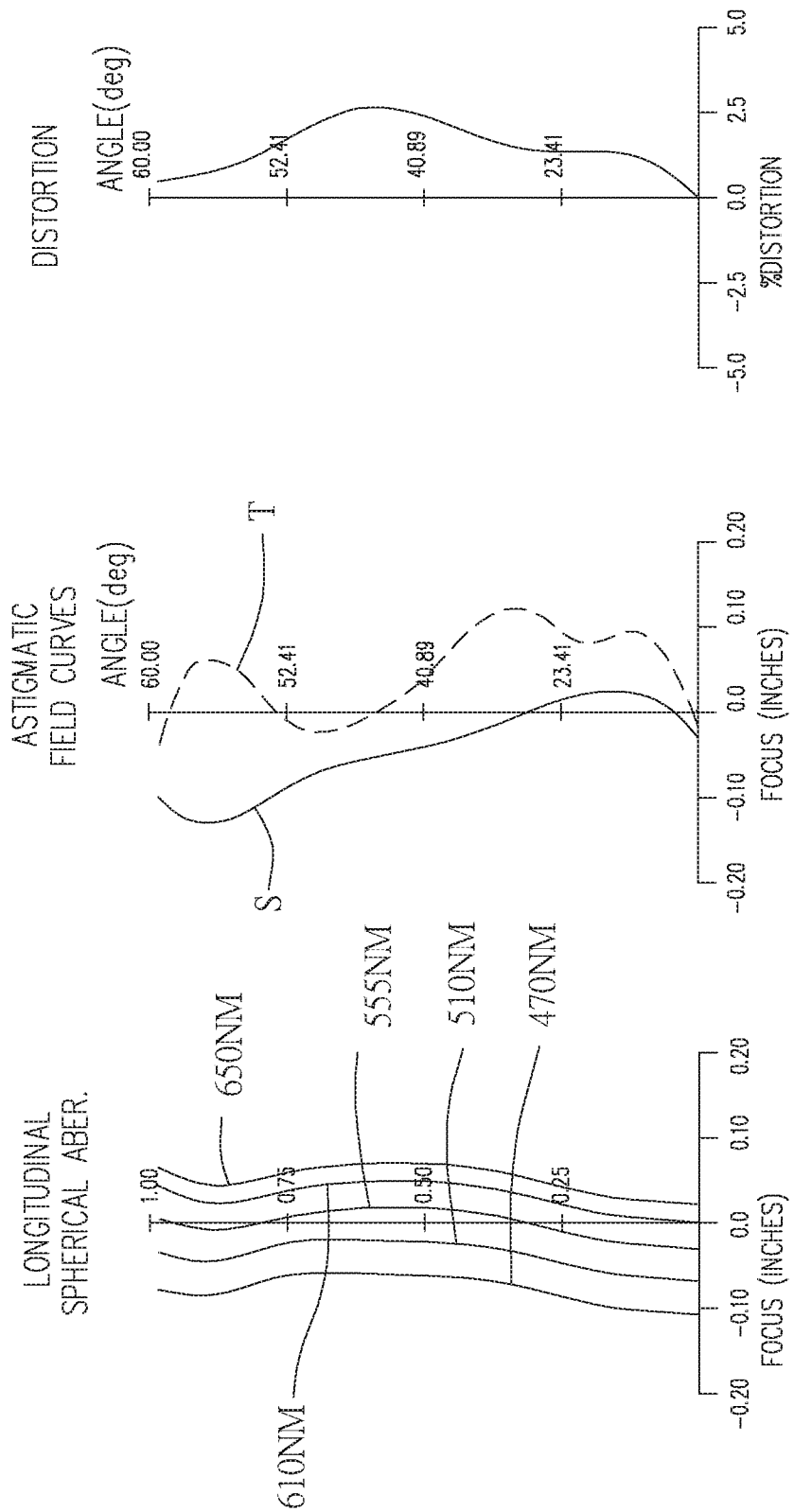
FIG. 1B shows curve diagrams of longitudinal spherical aberration, astigmatic field, and optical distortion of the optical image capturing system in the order from left to right of the first embodiment of the present application.
Figure 1C:
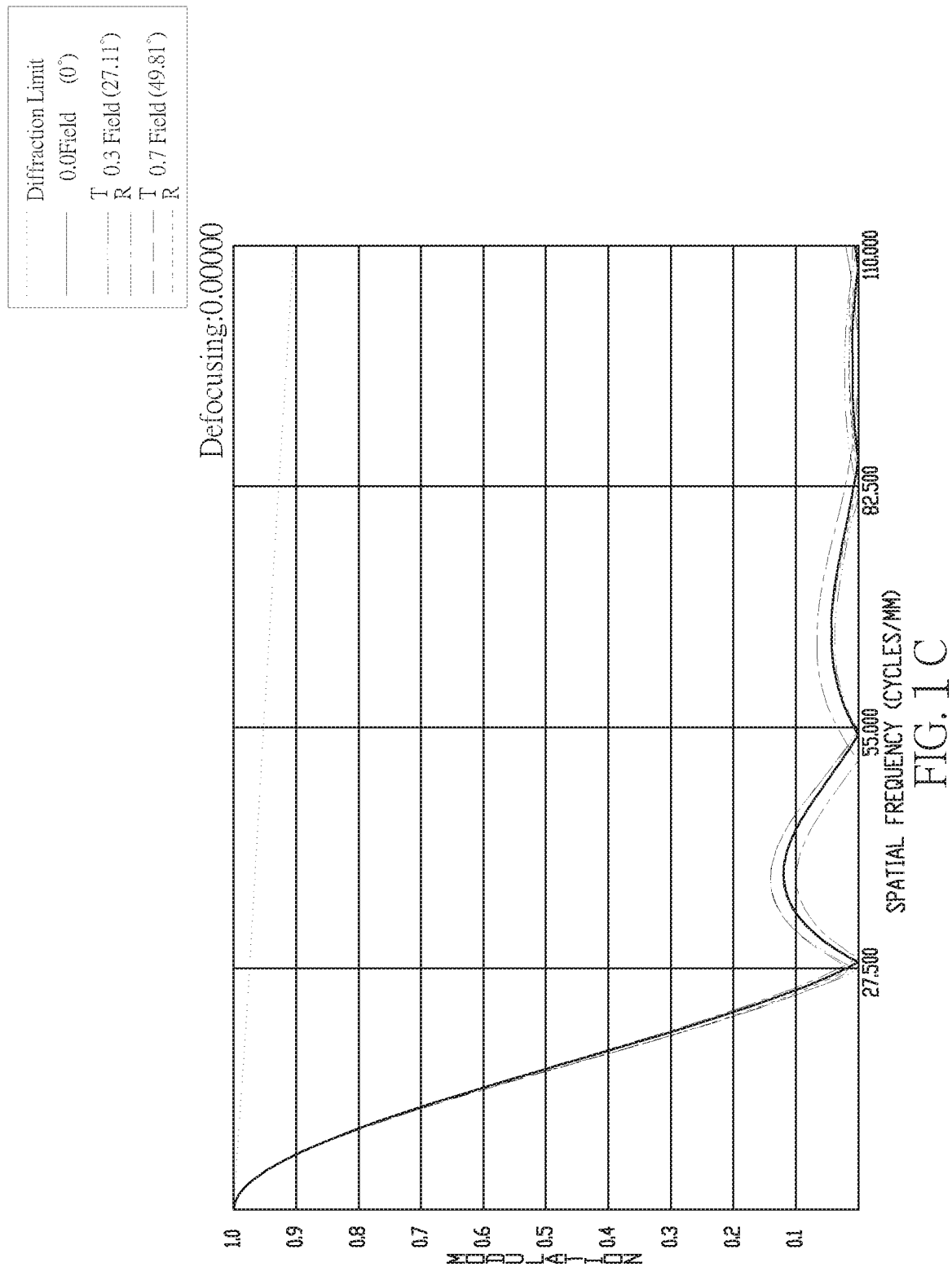
FIG. 1C shows a feature map of modulation transformation of the optical image capturing system of the first embodiment of the present application in visible light spectrum.
Figure 1D:
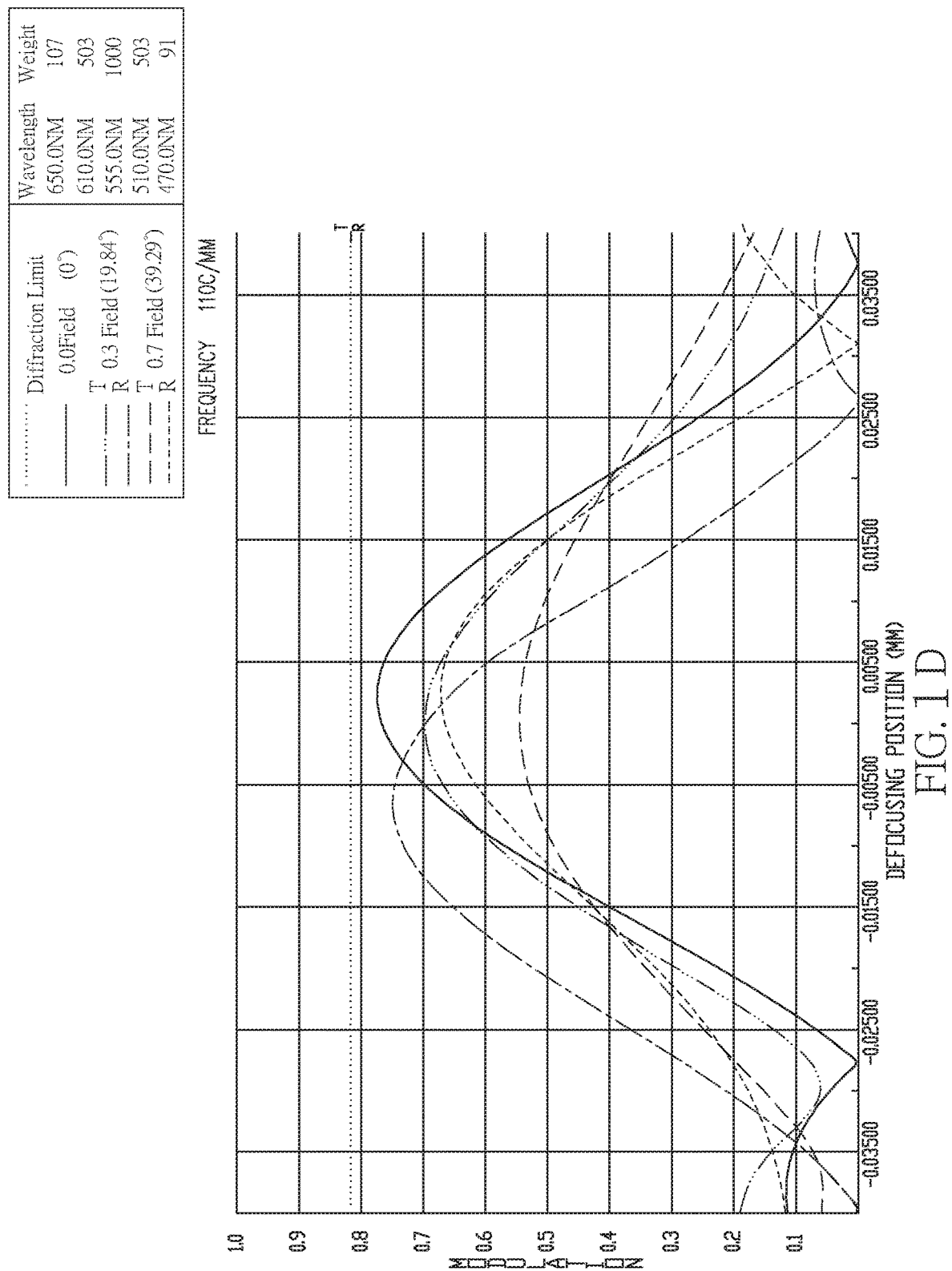
FIG. 1D is a diagram showing the through-focus MTF values of the visible light spectrum at the central field of view, 0.3 field of view, and 0.7 field of view of the first embodiment of the present invention.
Figure 1:
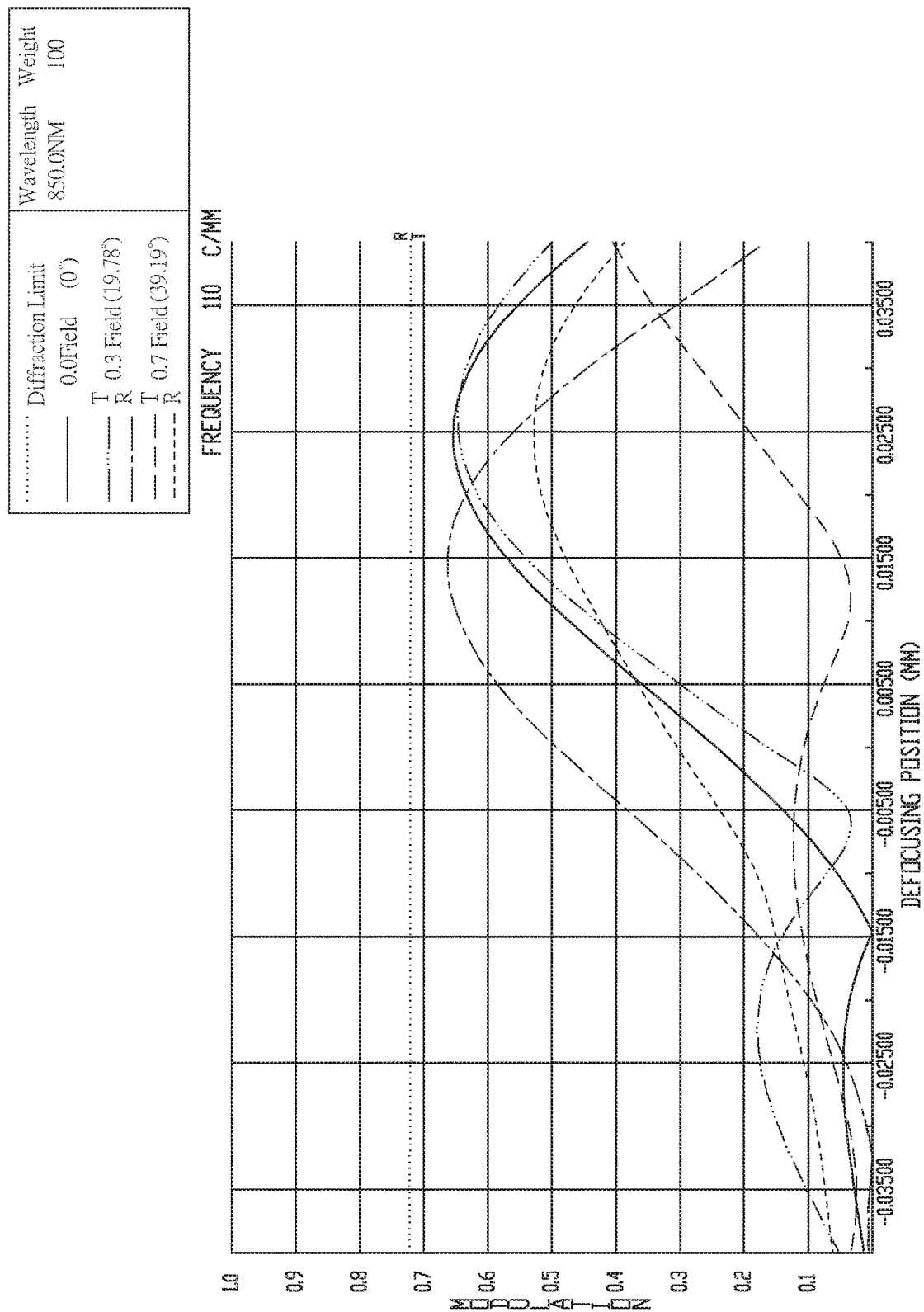
FIG. 1E is a diagram showing the through-focus MTF values of the infrared light spectrum at the central field of view, 0.3 field of view, and 0.7 field of view of the first embodiment of the present disclosure.

As shown in FIG. 1A and FIG. 1B, an optical image capturing system 10 of the first embodiment of the present invention includes, along an optical axis from an object side to an image side, a first lens 110, a second lens 120, a third lens 130, an aperture 100, a fourth lens 140, a fifth lens 150, a sixth lens 160, a seventh lens 170, an infrared rays filter 180, an image plane 190, and an image sensor 192. FIG. 1C shows a feature map of modulation transformation of the optical image capturing system of the first embodiment of the present application in visible light spectrum. FIG. 1D is a diagram showing the through-focus MTF values of the visible light spectrum at the central field of view, 0.3 field of view, and 0.7 field of view of the first embodiment of the present invention. FIG. 1E is a diagram showing the through-focus MTF values of the infrared light spectrum at the central field of view, 0.3 field of view, and 0.7 field of view of the first embodiment of the present disclosure. Lights of any field of view of the present disclosure can be further divided into sagittal ray and tangential ray, and the spatial frequency of 55 cycles/mm serves as the benchmark for assessing the focus shifts and the values of MTF. A wavelength of the infrared light is 850 nm.

The first lens 110 has negative refractive power and is made of plastic. An object-side surface 112 thereof, which faces the object side, is a concave aspheric surface, and an image-side surface 114 thereof, which faces the image side, is a concave aspheric surface. The object-side surface 112 has an inflection point thereon, and the image-side surface 114 has two inflection points. A thickness of the first lens 110 on the optical axis is TP1, and a thickness of the first lens 110 at the height of a half of the entrance pupil diameter (HEP) is denoted by ETP1.

The first lens satisfies S SGI111=−0.1110 mm; SGI121=2.7120 mm; TP1=2.2761 mm; SGI111/(|SGI111|+TP1)=0.0465; |SGI121|/(|SGI121|+TP1)=0.5437, where SGI111 is a displacement on the optical axis from a point on the object-side surface of the first lens, through which the optical axis passes, to a point where the inflection point on the object-side surface, which is the closest to the optical axis, projects on the optical axis, and SGI121 is a displacement on the optical axis from a point on the image-side surface of the first lens, through which the optical axis passes, to a point where the inflection point on the image-side surface, which is the closest to the optical axis, projects on the optical axis.

The first lens satisfies SGI112=0 mm; SGI122=4.2315 mm; |SGI112|/(|SGI112|+TP1)=0, where SGI112 is a displacement on the optical axis from a point on the object-side surface of the first lens, through which the optical axis passes, to a point where the inflection point on the object-side surface, which is the second closest to the optical axis, projects on the optical axis, and SGI122 is a displacement on the optical axis from a point on the image-side surface of the first lens, through which the optical axis passes, to a point where the inflection point on the image-side surface, which is the second closest to the optical axis, projects on the optical axis.

The first lens satisfies HIF111=12.8432 mm; HIF111/HOI=1.7127; HIF121=7.1744 mm; HIF121/HOI=0.9567, where HIF111 is a displacement perpendicular to the optical axis from a point on the object-side surface of the first lens, through which the optical axis passes, to the inflection point, which is the closest to the optical axis; HIF121 is a displacement perpendicular to the optical axis from a point on the image-side surface of the first lens, through which the optical axis passes, to the inflection point, which is the closest to the optical axis.

The first lens satisfies HIF112=0 mm; HIF112/HOI=0; HIF122=9.8592 mm; HIF122/HOI=1.3147, where HIF112 is a displacement perpendicular to the optical axis from a point on the object-side surface of the first lens, through which the optical axis passes, to the inflection point, which is the second closest to the optical axis; HIF122 is a displacement perpendicular to the optical axis from a point on the image-side surface of the first lens, through which the optical axis passes, to the inflection point, which is the second closest to the optical axis.

The second lens 120 has positive refractive power and is made of plastic. An object-side surface 122 thereof, which faces the object side, is a convex aspheric surface, and an image-side surface 124 thereof, which faces the image side, is a concave aspheric surface. A thickness of the second lens 120 on the optical axis is TP2, and thickness of the second lens 120 at the height of a half of the entrance pupil diameter (HEP) is denoted by ETP2.

For the second lens, a displacement on the optical axis from a point on the object-side surface of the second lens, through which the optical axis passes, to a point where the inflection point on the image-side surface, which is the closest to the optical axis, projects on the optical axis, is denoted by SGI211, and a displacement on the optical axis from a point on the image-side surface of the second lens, through which the optical axis passes, to a point where the inflection point on the image-side surface, which is the closest to the optical axis, projects on the optical axis is denoted by SGI221.

For the second lens, a displacement perpendicular to the optical axis from a point on the object-side surface of the second lens, through which the optical axis passes, to the inflection point, which is the closest to the optical axis is denoted by HIF211, and a displacement perpendicular to the optical axis from a point on the image-side surface of the second lens, through which the optical axis passes, to the inflection point, which is the closest to the optical axis is denoted by HIF221.

The third lens 130 has negative refractive power and is made of plastic. An object-side surface 132, which faces the object side, is a convex aspheric surface, and an image-side surface 134, which faces the image side, is a concave aspheric surface. A thickness of the third lens 130 on the optical axis is TP3, and a thickness of the third lens 130 at the height of a half of the entrance pupil diameter (HEP) is denoted by ETP3.

For the third lens 130, SGI311 is a displacement on the optical axis from a point on the object-side surface of the third lens, through which the optical axis passes, to a point where the inflection point on the object-side surface, which is the closest to the optical axis, projects on the optical axis, and SGI321 is a displacement on the optical axis from a point on the image-side surface of the third lens, through which the optical axis passes, to a point where the inflection point on the image-side surface, which is the closest to the optical axis, projects on the optical axis.

For the third lens 130, SGI312 is a displacement on the optical axis from a point on the object-side surface of the third lens, through which the optical axis passes, to a point where the inflection point on the object-side surface, which is the second closest to the optical axis, projects on the optical axis, and SGI322 is a displacement on the optical axis from a point on the image-side surface of the third lens, through which the optical axis passes, to a point where the inflection point on the object-side surface, which is the second closest to the optical axis, projects on the optical axis.

For the third lens 130, HIF311 is a distance perpendicular to the optical axis between the inflection point on the object-side surface of the third lens, which is the closest to the optical axis, and the optical axis; HIF321 is a distance perpendicular to the optical axis between the inflection point on the image-side surface of the third lens, which is the closest to the optical axis, and the optical axis.

For the third lens 130, HIF312 is a distance perpendicular to the optical axis between the inflection point on the object-side surface of the third lens, which is the second closest to the optical axis, and the optical axis; HIF322 is a distance perpendicular to the optical axis between the inflection point on the image-side surface of the third lens, which is the second closest to the optical axis, and the optical axis.

The fourth lens 140 has positive refractive power and is made of plastic. An object-side surface 142, which faces the object side, is a convex aspheric surface, and an image-side surface 144, which faces the image side, is a convex aspheric surface. The object-side surface 142 has an inflection point. A thickness of the fourth lens 140 on the optical axis is TP4, and a thickness of the fourth lens 140 at the height of a half of the entrance pupil diameter (HEP) is denoted by ETP4.

The fourth lens 140 satisfies SGI411=0.0018 mm; |SGI411|/(|SGI411|+TP4)=0.0009, where SGI411 is a displacement on the optical axis from a point on the object-side surface of the fourth lens, through which the optical axis passes, to a point where the inflection point on the object-side surface, which is the closest to the optical axis, projects on the optical axis, and SGI421 is a displacement on the optical axis from a point on the image-side surface of the fourth lens, through which the optical axis passes, to a point where the inflection point on the image-side surface, which is the closest to the optical axis, projects on the optical axis.

For the fourth lens 140, SGI412 is a displacement on the optical axis from a point on the object-side surface of the fourth lens, through which the optical axis passes, to a point where the inflection point on the object-side surface, which is the second closest to the optical axis, projects on the optical axis, and SGI422 is a displacement on the optical axis from a point on the image-side surface of the fourth lens, through which the optical axis passes, to a point where the inflection point on the object-side surface, which is the second closest to the optical axis, projects on the optical axis.

The fourth lens 140 further satisfies HIF411=0.7191 mm; HIF411/HOI=0.0959, where HIF411 is a distance perpendicular to the optical axis between the inflection point on the object-side surface of the fourth lens, which is the closest to the optical axis, and the optical axis; HIF421 is a distance perpendicular to the optical axis between the inflection point on the image-side surface of the fourth lens, which is the closest to the optical axis, and the optical axis.

For the fourth lens 140, HIF412 is a distance perpendicular to the optical axis between the inflection point on the object-side surface of the fourth lens, which is the second closest to the optical axis, and the optical axis; HIF422 is a distance perpendicular to the optical axis between the inflection point on the image-side surface of the fourth lens, which is the second closest to the optical axis, and the optical axis.

The fifth lens 150 has positive refractive power and is made of plastic. An object-side surface 152, which faces the object side, is a concave aspheric surface, and an image-side surface 154, which faces the image side, is a convex aspheric surface. The object-side surface 152 and the image-side surface 154 both have an inflection point. A thickness of the fifth lens 150 on the optical axis is TP5, and a thickness of the fifth lens 150 at the height of a half of the entrance pupil diameter (HEP) is denoted by ETP5.

The fifth lens 150 satisfies SGI511=−0.1246 mm; SGI521=−2.1477 mm; |SGI5111|/(|SGI5111|+TP5)=0.0284; |SGI5211|/(|SGI5211|+TP5)=0.3346, where SGI511 is a displacement on the optical axis from a point on the object-side surface of the fifth lens, through which the optical axis passes, to a point where the inflection point on the object-side surface, which is the closest to the optical axis, projects on the optical axis, and SGI521 is a displacement on the optical axis from a point on the image-side surface of the fifth lens, through which the optical axis passes, to a point where the inflection point on the image-side surface, which is the closest to the optical axis, projects on the optical axis.

For the fifth lens 150, SGI512 is a displacement on the optical axis from a point on the object-side surface of the fifth lens, through which the optical axis passes, to a point where the inflection point on the object-side surface, which is the second closest to the optical axis, projects on the optical axis, and SGI522 is a displacement on the optical axis from a point on the image-side surface of the fifth lens, through which the optical axis passes, to a point where the inflection point on the object-side surface, which is the second closest to the optical axis, projects on the optical axis.

The fifth lens 150 further satisfies HIF511=3.8179 mm; HIF521=4.5480 mm; HIF511/HOI=0.5091; HIF521/HOI=0.6065, where HIF511 is a distance perpendicular to the optical axis between the inflection point on the object-side surface of the fifth lens, which is the closest to the optical axis, and the optical axis; HIF521 is a distance perpendicular to the optical axis between the inflection point on the image-side surface of the fifth lens, which is the closest to the optical axis, and the optical axis.

For the fifth lens 150, HIF512 is a distance perpendicular to the optical axis between the inflection point on the object-side surface of the fifth lens, which is the second closest to the optical axis, and the optical axis; HIF522 is a distance perpendicular to the optical axis between the inflection point on the image-side surface of the fifth lens, which is the second closest to the optical axis, and the optical axis.

The sixth lens 160 has negative refractive power and is made of plastic. An object-side surface 162, which faces the object side, is a convex surface, and an image-side surface 164, which faces the image side, is a concave surface. The object-side surface 162 and the image-side surface 164 both have an inflection point, which could adjust the incident angle of each view field to improve aberration. A thickness of the sixth lens 160 on the optical axis is TP6. A thickness in parallel with the optical axis at a height of ½ HEP of the sixth lens 160 is ETP6.

The sixth lens 160 satisfies SGI611=0.3208 mm; SGI621=0.5937 mm; |SGI611|/(|SGI611|+TP6)=0.5167; |SGI621|/(|SGI621|+TP6)=0.6643, where SGI611 is a displacement on the optical axis from a point on the object-side surface of the sixth lens, through which the optical axis passes, to a point where the inflection point on the object-side surface, which is the closest to the optical axis, projects on the optical axis, and SGI621 is a displacement on the optical axis from a point on the image-side surface of the sixth lens, through which the optical axis passes, to a point where the inflection point on the image-side surface, which is the closest to the optical axis, projects on the optical axis.

The sixth lens 160 further satisfies HIF611=1.9655 mm; HIF621=2.0041 mm; HIF611/HOI=0.2621; HIF621/HOI=0.2672, where HIF611 is a distance perpendicular to the optical axis between the inflection point on the object-side surface of the sixth lens, which is the closest to the optical axis, and the optical axis; HIF621 is a distance perpendicular to the optical axis between the inflection point on the image-side surface of the sixth lens, which is the closest to the optical axis, and the optical axis.

The seventh lens 170 has positive refractive power and is made of plastic. An object-side surface 172, which faces the object side, is a convex surface, and an image-side surface 174, which faces the image side, is a concave surface. This would help to shorten the back focal length, whereby to keep the optical image capturing system miniaturized. The object-side surface 172 and the image-side surface 174 both have an inflection point. A thickness of the seventh lens 170 on the optical axis is TP7. A thickness in parallel with the optical axis at a height of ½ HEP of the seventh lens 170 is ETP7.

The seventh lens 170 satisfies SGI711=0.5212 mm; SGI721=0.5668 mm; |SGI711|/(|SGI711|+TP7)=0.3179; |SGI721|/(|SGI721|+TP7)=0.3364, where SGI711 is a displacement on the optical axis from a point on the object-side surface of the seventh lens, through which the optical axis passes, to a point where the inflection point on the object-side surface, which is the closest to the optical axis, projects on the optical axis, and SGI721 is a displacement on the optical axis from a point on the image-side surface of the seventh lens, through which the optical axis passes, to a point where the inflection point on the image-side surface, which is the closest to the optical axis, projects on the optical axis.

The seventh lens 170 further satisfies HIF711=1.6707 mm; HIF721=1.8616 mm; HIF711/HOI=0.2228; HIF721/HOI=0.2482, where HIF711 is a distance perpendicular to the optical axis between the inflection point on the object-side surface of the seventh lens, which is the closest to the optical axis, and the optical axis; HIF721 is a distance perpendicular to the optical axis between the inflection point on the image-side surface of the seventh lens, which is the closest to the optical axis, and the optical axis.

A distance in parallel with the optical axis between a coordinate point at a height of ½ HEP on the object-side surface of the first lens 110 and the image plane is ETL, and a distance in parallel with the optical axis between the coordinate point at the height of ½ HEP on the object-side surface of the first lens 110 and a coordinate point at a height of ½ HEP on the image-side surface of the fourth lens 140 is EIN, which satisfy: ETL=26.980 mm; EIN=24.999 mm; EIN/ETL=0.927.

The optical image capturing system of the first embodiment satisfies: ETP1=2.470 mm; ETP2=5.144 mm; ETP3=0.898 mm; ETP4=1.706 mm; ETP5=3.901 mm; ETP6=0.528 mm; ETP7=1.077 mm. The sum of the aforementioned ETP1 to ETP7 is SETP, wherein SETP=15.723 mm. In addition, TP1=2.276 mm; TP2=5.240 mm; TP3=0.837 mm; TP4=2.002 mm; TP5=4.271 mm; TP6=0.300 mm; TP7=1.118 mm. The sum of the aforementioned TP1 to TP7 is STP, wherein STP=16.044 mm; SETP/STP=0.980; SETP/EIN=0.629.

In order to enhance the ability of correcting aberration and to lower the difficulty of manufacturing at the same time, the ratio between the thickness (ETP) at the height of a half of the entrance pupil diameter (HEP) and the thickness (TP) of any lens on the optical axis (i.e., ETP/TP) in the optical image capturing system of the first embodiment is particularly controlled, which satisfies: ETP1/TP1=1.085; ETP2/TP2=0.982; ETP3/TP3=1.073; ETP4/TP4=0.852; ETP5/TP5=0.914; ETP6/TP6=1.759; ETP7/TP7=0.963.

In order to enhance the ability of correcting aberration, lower the difficulty of manufacturing, and "slightly shortening" the length of the optical image capturing system at the same time, the ratio between the horizontal distance (ED) between two neighboring lenses at the height of a half of the entrance pupil diameter (HEP) and the parallel distance (IN) between these two neighboring lens on the optical axis (i.e., ED/IN) in the optical image capturing system of the first embodiment is particularly controlled, which satisfies: the horizontal distance between the first lens 110 and the second lens 120 at the height of a half of the entrance pupil diameter (HEP) is denoted by ED12, wherein ED12=4.474 mm; the horizontal distance between the second lens 120 and the third lens 130 at the height of a half of the entrance pupil diameter (HEP) is denoted by ED23, wherein ED23=0.349 mm; the horizontal distance between the third lens 130 and the fourth lens 140 at the height of a half of the entrance pupil diameter (HEP) is denoted by ED34, wherein ED34=1.660 mm; the horizontal distance between the fourth lens 140 and the fifth lens 150 at the height of a half of the entrance pupil diameter (HEP) is denoted by ED45, wherein ED45=1.794 mm; the horizontal distance between the fifth lens 150 and the sixth lens 160 at the height of a half of the entrance pupil diameter (HEP) is denoted by ED56, wherein ED56=0.714 mm; the horizontal distance between the sixth lens 160 and the seventh lens 170 at the height of a half of the entrance pupil diameter (HEP) is denoted by ED67, wherein ED67=0.284 mm. The sum of the aforementioned ED12 to ED67 is SED, wherein SED=9.276 mm.

The horizontal distance between the first lens 110 and the second lens 120 on the optical axis is denoted by IN12, wherein IN12=4.552 mm, and ED12/IN12=0.983. The horizontal distance between the second lens 120 and the third lens 130 on the optical axis is denoted by IN23, wherein IN23=0.162 mm, and ED23/IN23=2.153. The horizontal distance between the third lens 130 and the fourth lens 140 on the optical axis is denoted by IN34, wherein IN34=1.927 mm, and ED34/IN34=0.862. The horizontal distance between the fourth lens 140 and the fifth lens 150 on the optical axis is denoted by IN45, wherein IN45=1.515 mm, and ED45/IN45=1.184. The horizontal distance between the fifth lens 150 and the sixth lens 160 on the optical axis is denoted by IN56, wherein IN56=0.050 mm, and ED56/IN56=14.285. The horizontal distance between the sixth lens 160 and the seventh lens 170 on the optical axis is denoted by IN67, wherein IN67=0.211 mm, and ED67/IN67=1.345. The sum of the aforementioned IN12 to IN67 is denoted by SIN, wherein SIN=8.418 mm, and SED/SIN=1.102.

The optical image capturing system of the first embodiment satisfies: ED12/ED23=12.816; ED23/ED34=0.210; ED34/ED45=0.925; ED45/ED56=2.512; ED56/ED67=2.512; IN12/IN23=28.080; IN23/IN34=0.084; IN34/IN45=1.272; IN45/IN56=30.305; IN56/IN67=0.236.

The horizontal distance in parallel with the optical axis between a coordinate point at the height of ½ HEP on the image-side surface of the seventh lens 170 and image plane is denoted by EBL, wherein EBL=1.982 mm. The horizontal distance in parallel with the optical axis between the point on the image-side surface of the seventh lens 170 where the optical axis passes through and the image plane is denoted by BL, wherein BL=2.517 mm. The optical image capturing system of the first embodiment satisfies: EBL/BL=0.7874. The horizontal distance in parallel with the optical axis between the coordinate point at the height of ½ HEP on the image-side surface of the seventh lens 170 and the infrared rays filter 180 is denoted by EIR, wherein EIR=0.865 mm. The horizontal distance in parallel with the optical axis between the point on the image-side surface of the seventh lens 170 where the optical axis passes through and the infrared rays filter 180 is denoted by PIR, wherein PIR=1.400 mm, and it satisfies: EIR/PIR=0.618.

The features related to the inflection points which are described below are obtained according to the main reference wavelength of 555 nm.

The infrared rays filter 180 is made of glass and between the seventh lens 170 and the image plane 190. The infrared rays filter 180 gives no contribution to the focal length of the system.

The optical image capturing system 10 of the first embodiment has the following parameters, which are f=4.3019 mm; f/HEP=1.2; HAF=59.9968 degrees; and tan (HAF)=1.7318, where f is a focal length of the system; HAF is a half of the maximum field angle; and HEP is an entrance pupil diameter.

The parameters of the lenses of the first embodiment are f1=−14.5286 mm; |f/f1|=0.2961; f7=8.2933; |f1|>f7; and |f1/f7|=1.7519, where f1 is a focal length of the first lens 110; and f7 is a focal length of the seventh lens 170.

The first embodiment further satisfies |f2|+|f3|+|f4|+|f5|+|f6|=144.7494; |f1|+|f7|=22.8219 and |f2|+|f3|+|f4|+|f5|+|f6|>|f1|+|f7|, where f2 is a focal length of the second lens 120, f3 is a focal length of the third lens 130, f4 is a focal length of the fourth lens 140, f5 is a focal length of the fifth lens 150, f6 is a focal length of the sixth lens 160, and f7 is a focal length of the seventh lens 170.

The optical image capturing system 10 of the first embodiment further satisfies ΣPPR=f/f2+f/f4+f/f5+f/f7=1.7384; ΣNPR=f/f1+f/f3+f/f6=−0.9999; ΣPPR/|ΣNPR|=1.7386; |f/f2|=0.1774; |f/f3|=0.0443; f/f4|=0.4411; |f/f5|=0.6012; |f/f6|=0.6595; |f/f7|=0.5187, where PPR is a ratio of a focal length f of the optical image capturing system to a focal length fp of each of the lenses with positive refractive power; and NPR is a ratio of a focal length f of the optical image capturing system to a focal length fn of each of lenses with negative refractive power.

The optical image capturing system 10 of the first embodiment further satisfies InTL+BFL=HOS; HOS=26.9789 mm; HOI=7.5 mm; HOS/HOI=3.5977; HOS/f=6.2715; InS=12.4615 mm; and InS/HOS=0.4619, where InTL is a distance between the object-side surface 112 of the first lens 110 and the image-side surface 174 of the seventh lens 170; HOS is a height of the image capturing system, i.e. a distance between the object-side surface 112 of the first lens 110 and the image plane 190; InS is a distance between the aperture 100 and the image plane 190; HOI is a half of a diagonal of an effective sensing area of the image sensor 192, i.e., the maximum image height; and BFL is a distance between the image-side surface 174 of the seventh lens 170 and the image plane 190.

The optical image capturing system 10 of the first embodiment further satisfies ΣTP=16.0446 mm; and ΣTP/InTL=0.6559, where ΣTP is a sum of the thicknesses of the lenses 110-150 with refractive power. It is helpful for the contrast of image and yield rate of manufacture and provides a suitable back focal length for installation of other elements.

The optical image capturing system 10 of the first embodiment further satisfies |R1/R2|=129.9952, where R1 is a radius of curvature of the object-side surface 112 of the first lens 110, and R2 is a radius of curvature of the image-side surface 114 of the first lens 110. It provides the first lens with a suitable positive refractive power to reduce the increase rate of the spherical aberration.

The optical image capturing system 10 of the first embodiment further satisfies (R13−R14)/(R13+R14)=−0.0806, where R13 is a radius of curvature of the object-side surface 172 of the seventh lens 170, and R14 is a radius of curvature of the image-side surface 174 of the seventh lens 170. It may modify the astigmatic field curvature.

The optical image capturing system 10 of the first embodiment further satisfies ΣPP=f2+f4+f5+f7=49.4535 mm; and f4/(f2+f4+f5+f7)=0.1972, where ΣPP is a sum of the focal lengths fp of each lens with positive refractive power. It is helpful to share the positive refractive power of the fourth lens 140 to other positive lenses to avoid the significant aberration caused by the incident rays.

The optical image capturing system 10 of the first embodiment further satisfies ΣNP=f1+f3+f6=−118.1178 mm; and f1/(f1+f3+f6)=0.1677, where ΣNP is a sum of the focal lengths fn of each lens with negative refractive power. It is helpful to share the negative refractive power of the first lens 110 to other negative lenses, which avoids the significant aberration caused by the incident rays.

The optical image capturing system 10 of the first embodiment further satisfies IN12=4.5524 mm; IN12/f=1.0582, where IN12 is a distance on the optical axis between the first lens 110 and the second lens 120. It may correct chromatic aberration and improve the performance.

The optical image capturing system 10 of the first embodiment further satisfies TP1=2.2761 mm; TP2=0.2398 mm; and (TP1+IN12)/TP2=1.3032, where TP1 is a central thickness of the first lens 110 on the optical axis, and TP2 is a central thickness of the second lens 120 on the optical axis. It may control the sensitivity of manufacture of the system and improve the performance.

The optical image capturing system 10 of the first embodiment further satisfies TP6=0.3000 mm; TP7=1.1182 mm; and (TP7+IN67)/TP6=4.4322, where TP6 is a central thickness of the sixth lens 160 on the optical axis, TP7 is a central thickness of the seventh lens 170 on the optical axis, and IN67 is a distance on the optical axis between the sixth lens 160 and the seventh lens 170. It may control the sensitivity of manufacture of the system and lower the total height of the system.

The optical image capturing system 10 of the first embodiment further satisfies TP3=0.8369 mm; TP4=2.0022 mm; TP5=4.2706 mm; IN34=1.9268 mm; IN45=1.5153 mm; and TP4/(IN34+TP4+IN45)=0.3678, where TP3 is a central thickness of the third lens 130 on the optical axis, TP4 is a central thickness of the fourth lens 140 on the optical axis, TP5 is a central thickness of the fifth lens 150 on the optical axis, IN34 is a distance on the optical axis between the third lens 130 and the fourth lens 140, IN45 is a distance on the optical axis between the fourth lens 140 and the fifth lens 150, and InTL is a distance from the object-side surface 112 of the first lens 110 to the image-side surface 174 of the seventh lens 170 on the optical axis. It may control the sensitivity of manufacture of the system and lower the total height of the system.

The optical image capturing system 10 of the first embodiment further satisfies InRS61=−0.7823 mm; InRS62=−0.2166 mm; and |InRS62|/TP6=0.722, where InRS61 is a displacement from a point on the object-side surface 162 of the sixth lens 160 passed through by the optical axis to a point on the optical axis where a projection of the maximum effective semi diameter of the object-side surface 162 of the sixth lens 160 ends; InRS62 is a displacement from a point on the image-side surface 166 of the sixth lens 160 passed through by the optical axis to a point on the optical axis where a projection of the maximum effective semi diameter of the image-side surface 166 of the sixth lens 160 ends; and TP6 is a central thickness of the sixth lens 160 on the optical axis. It is helpful for manufacturing and shaping of the lenses and is helpful to reduce the size.

The optical image capturing system 10 of the first embodiment further satisfies HVT61=3.3498 mm; HVT62=3.9860 mm; and HVT61/HVT62=0.8404, where HVT61 is a distance perpendicular to the optical axis between the critical point on the object-side surface 162 of the sixth lens and the optical axis; and HVT62 is a distance perpendicular to the optical axis between the critical point on the image-side surface 166 of the sixth lens and the optical axis.

The optical image capturing system 10 of the first embodiment further satisfies InRS71=−0.2756 mm; InRS72=−0.0938 mm; and |InRS72|/TP7=0.0839, where InRS71 is a displacement from a point on the object-side surface 172 of the seventh lens 170 passed through by the optical axis to a point on the optical axis where a projection of the maximum effective semi diameter of the object-side surface 172 of the seventh lens 170 ends; InRS72 is a displacement from a point on the image-side surface 174 of the seventh lens 170 passed through by the optical axis to a point on the optical axis where a projection of the maximum effective semi diameter of the image-side surface 174 of the seventh lens 170 ends; and TP7 is a central thickness of the seventh lens 170 on the optical axis. It is helpful for manufacturing and shaping of the lenses and is helpful to reduce the size.

The optical image capturing system 10 of the first embodiment satisfies HVT71=3.6822 mm; HVT72=4.0606 mm; and HVT71/HVT72=0.9068, where HVT71 a distance perpendicular to the optical axis between the critical point on the object-side surface 172 of the seventh lens and the optical axis; and HVT72 a distance perpendicular to the optical axis between the critical point on the image-side surface 174 of the seventh lens and the optical axis.

The optical image capturing system 10 of the first embodiment satisfies HVT72/HOI=0.5414. It is helpful for correction of the aberration of the peripheral view field of the optical image capturing system.

The optical image capturing system 10 of the first embodiment satisfies HVT72/HOS=0.1505. It is helpful for correction of the aberration of the peripheral view field of the optical image capturing system.

The optical image capturing system 10 of the first embodiment further satisfies |TDT|=2.5678%; |ODT|=2.1302%, where TDT is TV distortion; and ODT is optical distortion.

In the present embodiment, the lights of any field of view can be further divided into sagittal ray and tangential ray, and the spatial frequency of 110 cycles/mm serves as the benchmark for assessing the focus shifts and the values of MTF. The focus shifts where the through-focus MTF values of the visible sagittal ray at the central field of view, 0.3 field of view, and 0.7 field of view of the optical image capturing system are at their respective maxima are denoted by VSFS0, VSFS3, and VSFS7 (unit of measurement: mm), respectively. The values of VSFS0, VSFS3, and VSFS7 equal to 0.000 mm, −0.005 mm, and 0.000 mm, respectively. The maximum values of the through-focus MTF of the visible sagittal ray at the central field of view, 0.3 field of view, and 0.7 field of view are denoted by VSMTF0, VSMTF3, and VSMTF7, respectively. The values of VSMTF0, VSMTF3, and VSMTF7 equal to 0.886, 0.885, and 0.863, respectively. The focus shifts where the through-focus MTF values of the visible tangential ray at the central field of view, 0.3 field of view, and 0.7 field of view of the optical image capturing system are at their respective maxima, are denoted by VTFS0, VTFS3, and VTFS7 (unit of measurement: mm), respectively. The values of VTFS0, VTFS3, and VTFS7 equal to 0.000 mm, 0.001 mm, and −0.005 mm, respectively. The maximum values of the through-focus MTF of the visible tangential ray at the central field of view, 0.3 field of view, and 0.7 field of view are denoted by VTMTF0, VTMTF3, and VTMTF7, respectively. The values of VTMTF0, VTMTF3, and VTMTF7 equal to 0.886, 0.868, and 0.796, respectively. The average focus shift (position) of both the aforementioned focus shifts of the visible sagittal ray at three fields of view and focus shifts of the visible tangential ray at three fields of view is denoted by AVFS (unit of measurement: mm), which satisfies the absolute value |(VSFS0+VSFS3+VSFS7+VTFS0+VTFS3+VTFS7)/6|=|0.000 mm|.

The focus shifts where the through-focus MTF values of the infrared sagittal ray at the central field of view, 0.3 field of view, and 0.7 field of view of the optical image capturing system are at their respective maxima, are denoted by ISFS0, ISFS3, and ISFS7 (unit of measurement: mm), respectively. The values of ISFS0, ISFS3, and ISFS7 equal to 0.025 mm, 0.020 mm, and 0.020 mm, respectively. The average focus shift (position) of the aforementioned focus shifts of the infrared sagittal ray at three fields of view is denoted by AISFS (unit of measurement: mm). The maximum values of the through-focus MTF of the infrared sagittal ray at the central field of view, 0.3 field of view, and 0.7 field of view are denoted by ISMTF0, ISMTF3, and ISMTF7, respectively. The values of ISMTF0, ISMTF3, and ISMTF7 equal to 0.787, 0.802, and 0.772, respectively. The focus shifts where the through-focus MTF values of the infrared tangential ray at the central field of view, 0.3 field of view, and 0.7 field of view of the optical image capturing system are at their respective maxima, are denoted by ITFS0, ITFS3, and ITFS7 (unit of measurement: mm), respectively. The values of ITFS0, ITFS3, and ITFS7 equal to 0.025, 0.035, and 0.035, respectively. The average focus shift (position) of the aforementioned focus shifts of the infrared tangential ray at three fields of view is denoted by AITFS (unit of measurement: mm). The maximum values of the through-focus MTF of the infrared tangential ray at the central field of view, 0.3 field of view, and 0.7 field of view are denoted by ITMTF0, ITMTF3, and ITMTF7, respectively. The values of ITMTF0, ITMTF3, and ITMTF7 equal to 0.787, 0.805, and 0.721, respectively. The average focus shift (position) of both of the aforementioned focus shifts of the infrared sagittal ray at the three fields of view and focus shifts of the infrared tangential ray at the three fields of view is denoted by AIFS (unit of measurement: mm), which equals to the absolute value of |(ISFS0+ISFS3+ISFS7+ITFS0+ITFS3+ITFS7)/6|=|0.02667 mm|.

The focus shift (difference) between the focal points of the visible light and the infrared light at their central fields of view (RGB/IR) of the entire optical image capturing system (i.e. wavelength of 850 nm versus wavelength of 555 nm, unit of measurement: mm) is denoted by FS (the distance between the first and second image planes on the optical axis), which satisfies the absolute value |(VSFS0+VTFS0)/2−(ISFS0+ITFS0)/2|=|0.025 mm|. The difference (focus shift) between the average focus shift of the visible light in the three fields of view and the average focus shift of the infrared light in the three fields of view (RGB/IR) of the entire optical image capturing system is denoted by AFS (i.e. wavelength of 850 nm versus wavelength of 555 nm, unit of measurement: mm), for which the absolute value of |AIFS−AVFS|=10.02667 mm is satisfied.

For the optical image capturing system of the first embodiment, the values of MTF for visible light in the spatial frequency of 55 cycles/mm at the optical axis, 0.3 field of view, and 0.7 field of view on an image plane are respectively denoted by MTFE0, MTFE3, and MTFE7, wherein MTFE0 is around 0.35, MTFE3 is around 0.14, and MTFE7 is around 0.28; the values of MTF for visible light in the spatial frequency of 110 cycles/mm at the optical axis, 0.3 field of view, and 0.7 field of view on an image plane are respectively denoted by MTFQ0, MTFQ3, and MTFQ7, wherein MTFQ0 is around 0.126, MTFQ3 is around 0.075, and MTFQ7 is around 0.177; the values of modulation transfer function (MTF) in the spatial frequency of 220 cycles/mm at the optical axis, 0.3 field of view, and 0.7 field of view on an image plane are respectively denoted by MTFH0, MTFH3, and MTFH7, wherein MTFH0 is around 0.01, MTFH3 is around 0.01, and MTFH7 is around 0.01.

For the optical image capturing system of the first embodiment, when the infrared of wavelength of 850 nm focuses on the image plane, the values of MTF in spatial frequency (55 cycles/mm) at the optical axis, 0.3 HOI, and 0.7 HOI on an image plane are respectively denoted by MTFI0, MTFI3, and MTFI7, wherein MTFI0 is around 0.01, MTFI3 is around 0.01, and MTFI7 is around 0.01.

The parameters of the lenses of the first embodiment are listed in Table 1 and Table 2.

TABLE 1 f = 4.3019 mm; f/HEP = 1.2; HAF = 59.9968 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | 1st lens | −1079.499964 | 2.276 | plastic | 1.565 | 58.00 | −14.53 |
| 2 | | 8.304149657 | 4.552 | | | | |
| 3 | 2nd lens | 14.39130913 | 5.240 | plastic | 1.650 | 21.40 | 24.25 |
| 4 | | 130.0869482 | 0.162 | | | | |
| 5 | 3rd lens | 8.167310118 | 0.837 | plastic | 1.650 | 21.40 | −97.07 |
| 6 | | 6.944477468 | 1.450 | | | | |
| 7 | Aperture | plane | 0.477 | | | | |
| 8 | 4th lens | 121.5965254 | 2.002 | plastic | 1.565 | 58.00 | 9.75 |
| 9 | | −5.755749302 | 1.515 | | | | |
| 10 | 5th lens | −86.27705938 | 4.271 | plastic | 1.565 | 58.00 | 7.16 |
| 11 | | −3.942936258 | 0.050 | | | | |
| 12 | 6th lens | 4.867364751 | 0.300 | plastic | 1.650 | 21.40 | −6.52 |
| 13 | | 2.220604983 | 0.211 | | | | |
| 14 | 7th lens | 1.892510651 | 1.118 | plastic | 1.650 | 21.40 | 8.29 |
| 15 | | 2.224128115 | 1.400 | | | | |
| 16 | Infrared rays filter | plane | 0.200 | BK_7 | 1.517 | 64.2 | |
| 17 | | plane | 0.917 | | | | |
| 18 | Image plane | plane | | | | | |

Reference wavelength: 555 nm.

TABLE 2

Coefficients of the aspheric surfaces

| Surface | 1 | 2 | 3 | 4 | 5 | 6 | 8 |
|---|---|---|---|---|---|---|---|
| k | 2.500000E+01 | −4.711931E−01 | 1.531617E+00 | −1.153034E+01 | −2.915013E+00 | 4.886991E+00 | −3.459463E+01 |
| A4 | 5.236918E−06 | −2.117558E−04 | 7.146736E−05 | 4.353586E−04 | 5.793768E−04 | −3.756697E−04 | −1.292614E−03 |
| A6 | −3.014384E−08 | −1.838670E−06 | 2.334364E−06 | 1.400287E−05 | 2.112652E−04 | 3.901218E−04 | −1.602381E−05 |
| A8 | −2.487400E−10 | 9.605910E−09 | −7.479362E−08 | −1.688929E−07 | −1.344586E−05 | −4.925422E−05 | −8.452359E−06 |
| A10 | 1.170000E−12 | −8.256000E−11 | 1.701570E−09 | 3.829807E−08 | 1.000482E−06 | 4.139741E−06 | 7.243999E−07 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |

| Surface | 9 | 10 | 11 | 12 | 13 | 14 | 15 |
|---|---|---|---|---|---|---|---|
| k | −7.549291E+00 | −5.000000E+01 | −1.740728E+00 | −4.709650E+00 | −4.509781E+00 | −3.427137E+00 | −3.215123E+00 |
| A4 | −5.583548E−03 | 1.240671E−04 | 6.467538E−04 | −1.872317E−03 | −8.967310E−04 | −3.189453E−03 | −2.815022E−03 |
| A6 | 1.947110E−04 | −4.949077E−05 | −4.981838E−05 | −1.523141E−05 | −2.688331E−05 | −1.058126E−05 | 1.884580E−05 |
| A8 | −1.486947E−05 | 2.088854E−06 | 9.129031E−07 | −2.169414E−06 | −8.324958E−07 | 1.760103E−06 | −1.017223E−08 |
| A10 | −6.501246E−08 | −1.438383E−08 | 7.108550E−09 | −2.308304E−08 | −6.184250E−09 | −4.730294E−08 | 3.660000E−12 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |

The detail parameters of the first embodiment are listed in Table 1, in which the unit of the radius of curvature, thickness, and focal length are millimeter, and surface 0-10 indicates the surfaces of all elements in the system in sequence from the object side to the image side. Table 2 is the list of coefficients of the aspheric surfaces, in which A1-A20 indicate the coefficients of aspheric surfaces from the first order to the twentieth order of each aspheric surface. The following embodiments have the similar diagrams and tables, which are the same as those of the first embodiment, so we do not describe it again.

Second Embodiment

Figure 2A:
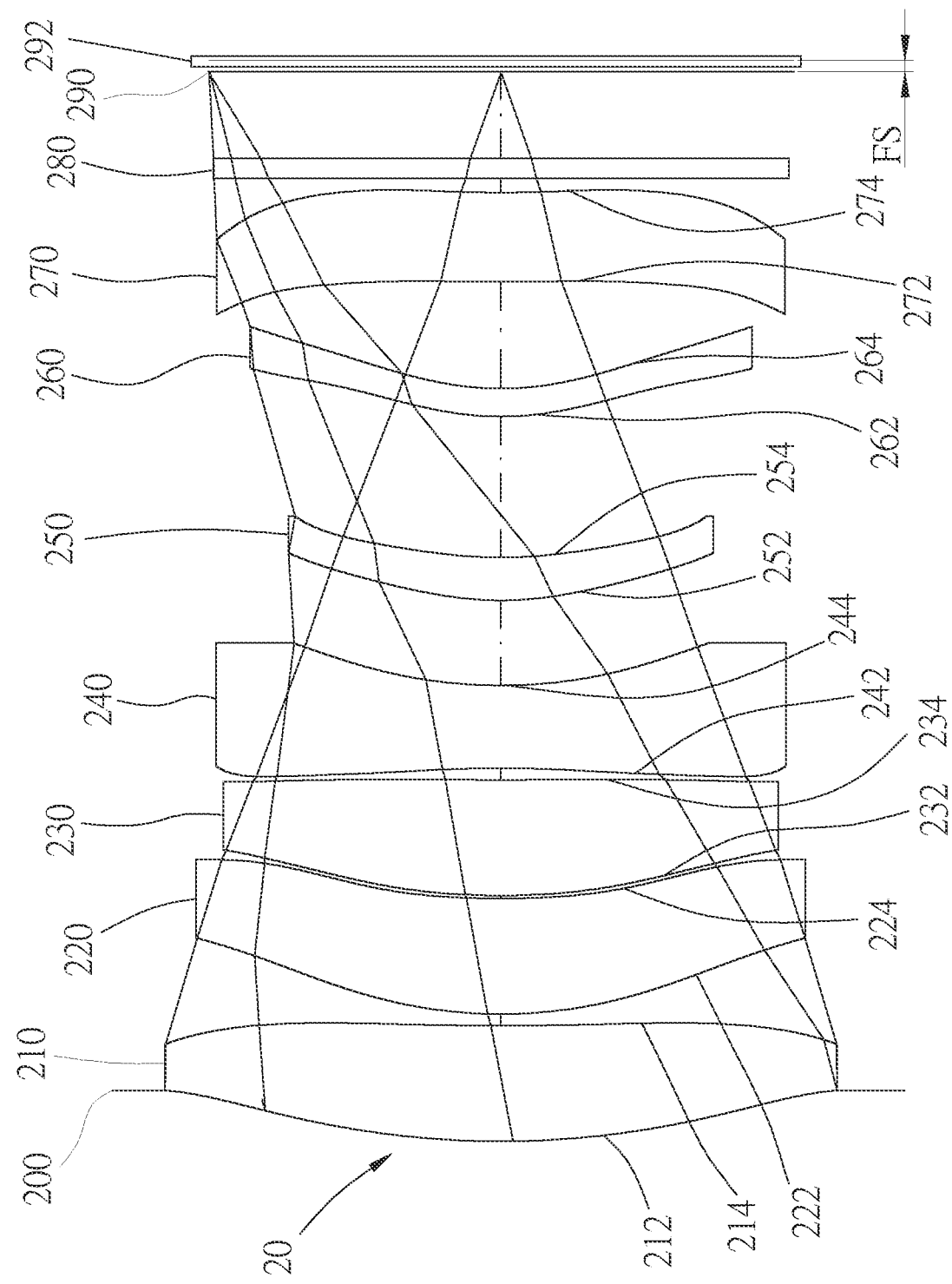
FIG. 2A is a schematic diagram of a second embodiment of the present invention.
Figure 2B:
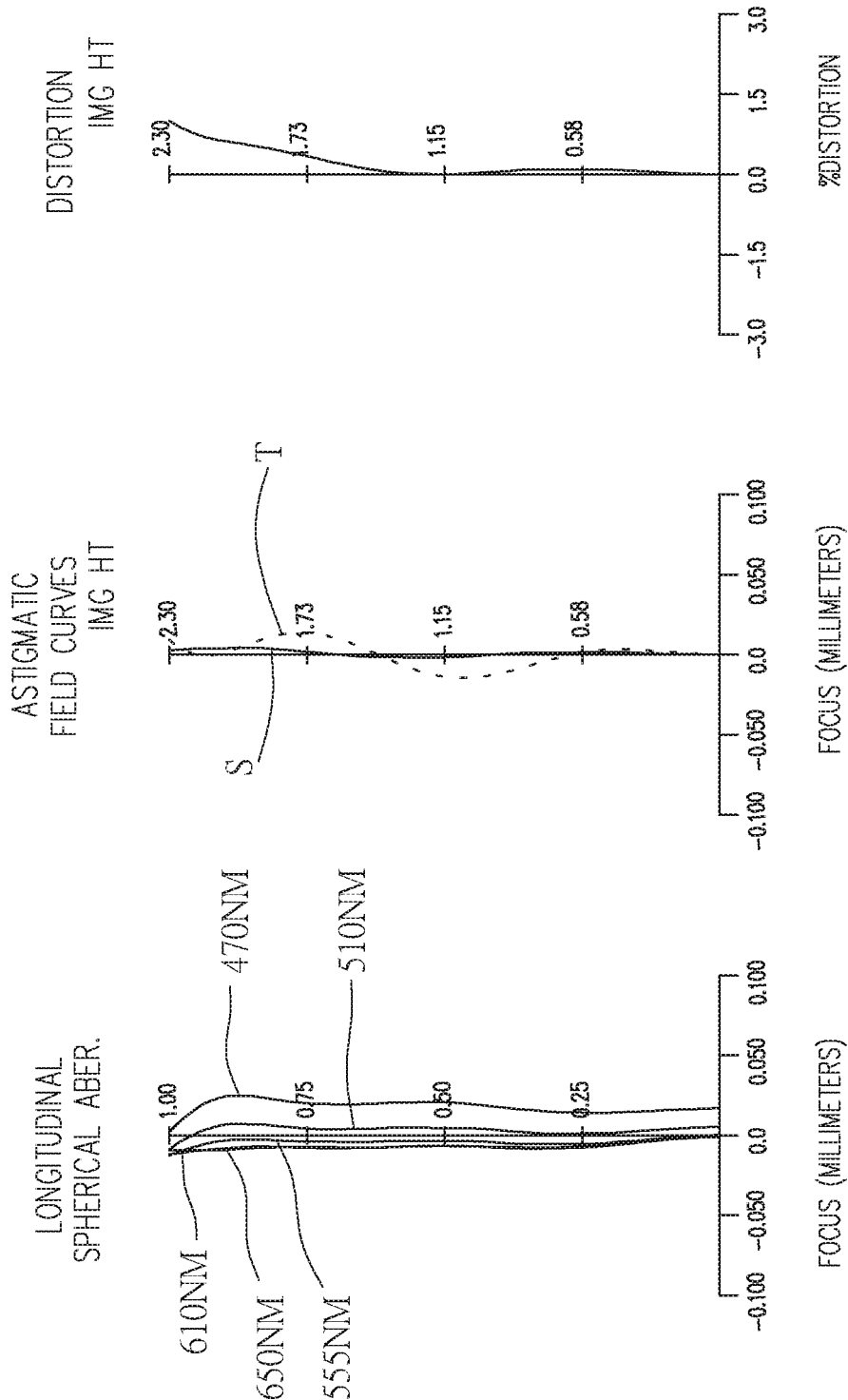
FIG. 2B shows curve diagrams of longitudinal spherical aberration, astigmatic field, and optical distortion of the optical image capturing system in the order from left to right of the second embodiment of the present application.
Figure 2C:
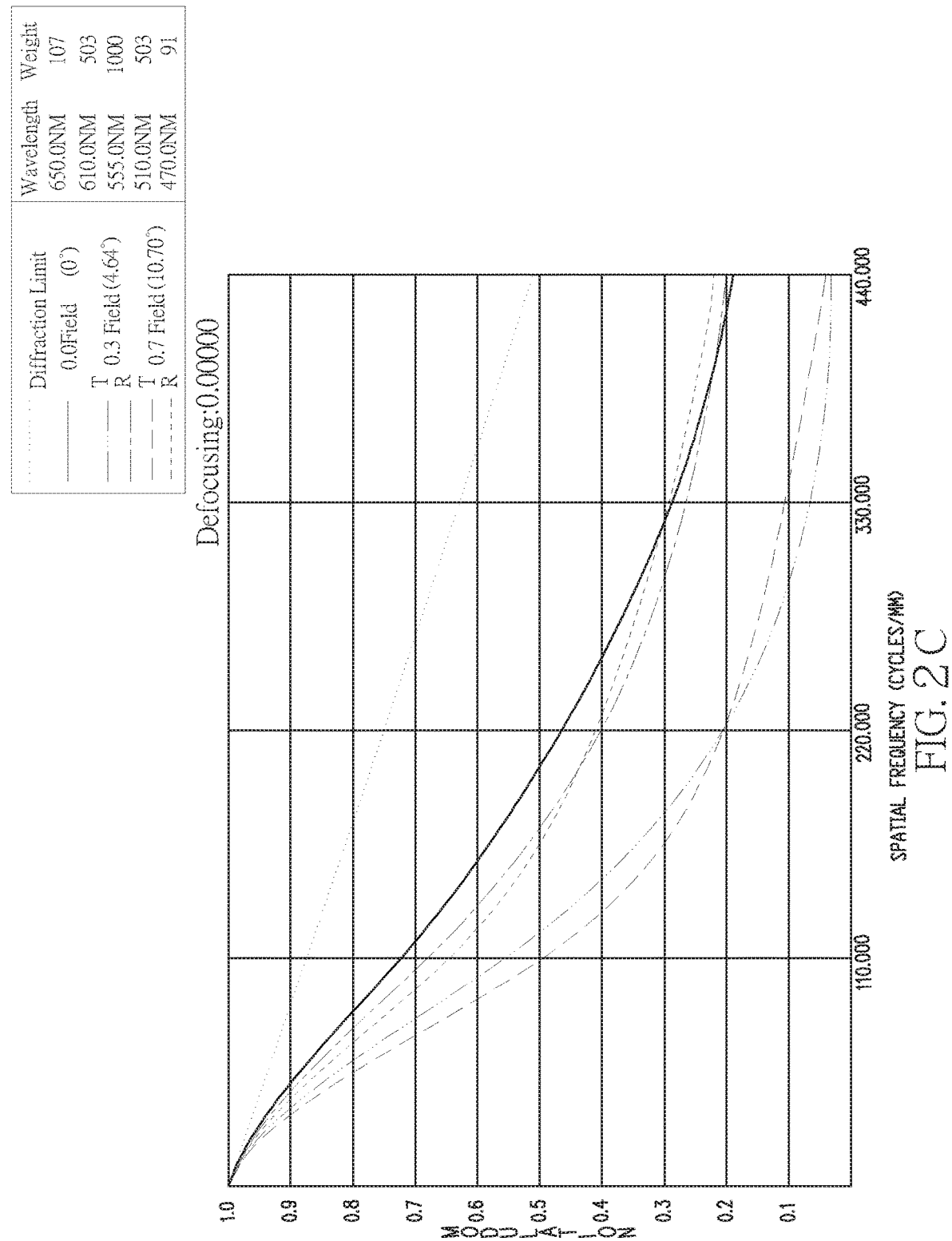
FIG. 2C shows a feature map of modulation transformation of the optical image capturing system of the second embodiment of the present application in visible light spectrum.
Figure 2D:
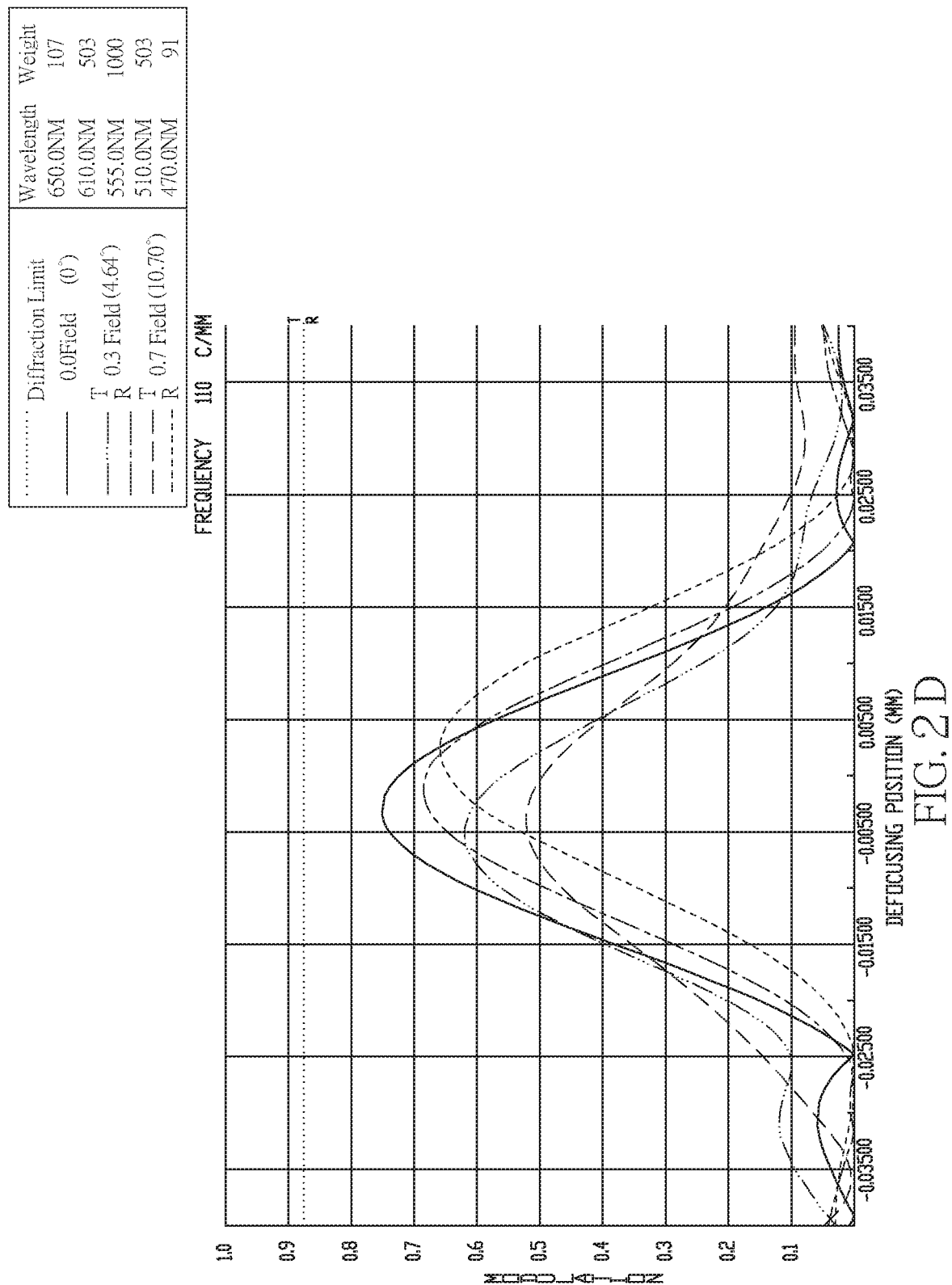
FIG. 2D is a diagram showing the through-focus MTF values of the visible light spectrum at the central field of view, 0.3 field of view, and 0.7 field of view of the second embodiment of the present invention.
Figure 2:
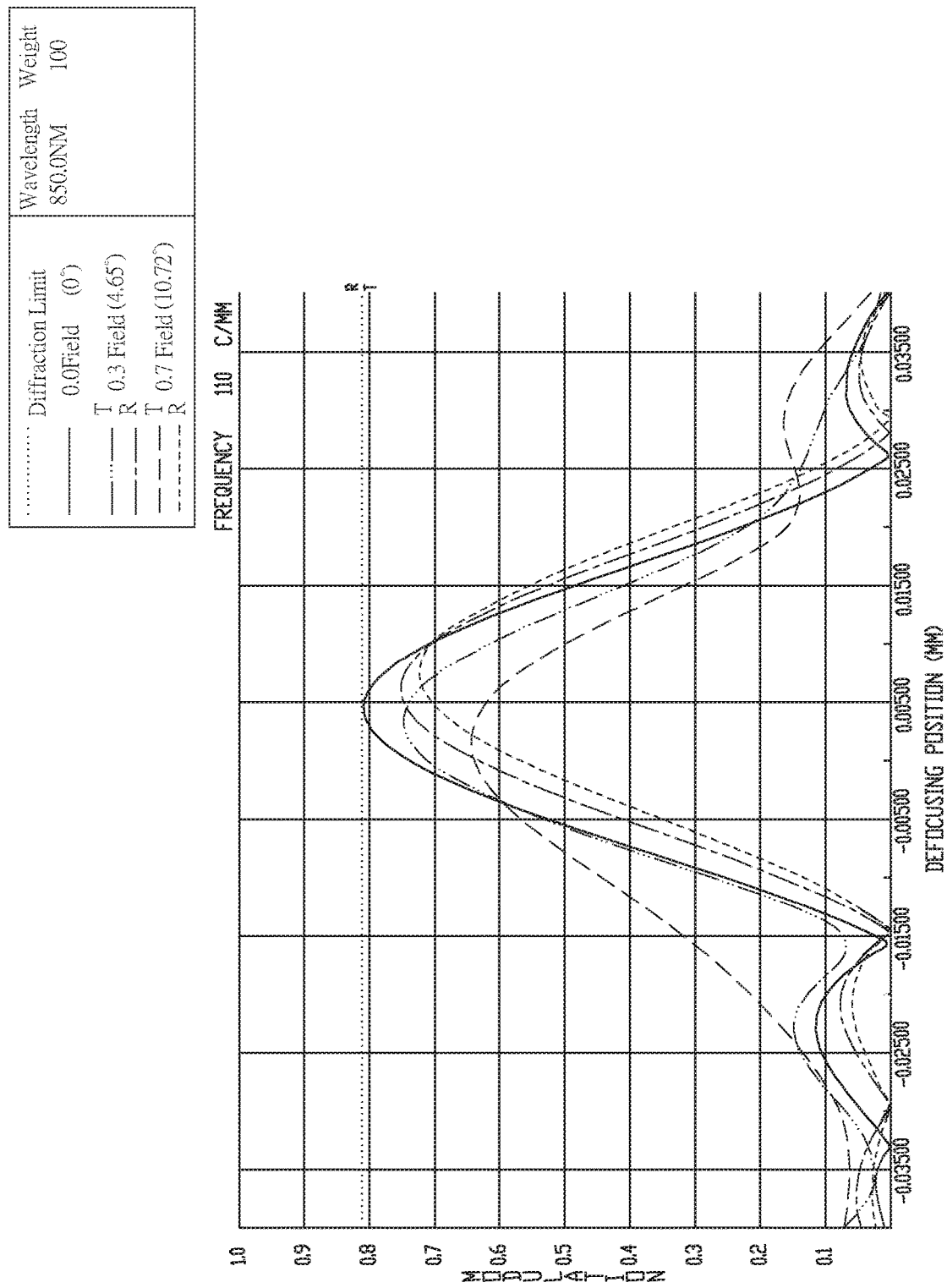
FIG. 2E is a diagram showing the through-focus MTF values of the infrared light spectrum at the central field of view, 0.3 field of view, and 0.7 field of view of the second embodiment of the present disclosure.

As shown in FIG. 2A and FIG. 2B, an optical image capturing system 20 of the second embodiment of the present invention includes, along an optical axis from an object side to an image side, an aperture 200, a first lens 210, a second lens 220, a third lens 230, a fourth lens 240, a fifth lens 250, a sixth lens 260, a seventh lens 270, an infrared rays filter 280, an image plane 290, and an image sensor 292. FIG. 2C shows a feature map of modulation transformation of the optical image capturing system of the second embodiment of the present application in visible light spectrum. FIG. 2D is a diagram showing the through-focus MTF values of the visible light spectrum at the central field of view, 0.3 field of view, and 0.7 field of view of the second embodiment of the present invention. FIG. 2E is a diagram showing the through-focus MTF values of the infrared light spectrum at the central field of view, 0.3 field of view, and 0.7 field of view of the second embodiment of the present disclosure.

The first lens 210 has positive refractive power and is made of plastic. An object-side surface 212 thereof, which faces the object side, is a convex aspheric surface, and an image-side surface 214 thereof, which faces the image side, is a concave aspheric surface. The object-side surface 212 and the image-side surface 214 both have an inflection point.

The second lens 220 has positive refractive power and is made of plastic. An object-side surface 222 thereof, which faces the object side, is a convex aspheric surface, and an image-side surface 224 thereof, which faces the image side, is a concave aspheric surface. The object-side surface 222 has two inflection points, and the image-side surface 224 has an inflection point.

The third lens 230 has positive refractive power and is made of plastic. An object-side surface 232, which faces the object side, is a convex aspheric surface, and an image-side surface 234, which faces the image side, is a concave aspheric surface. The object-side surface 232 has an inflection point, and the image-side surface 234 has two inflection points.

The fourth lens 240 has negative refractive power and is made of plastic. An object-side surface 242, which faces the object side, is a concave aspheric surface, and an image-side surface 244, which faces the image side, is a concave aspheric surface. The object-side surface 242 has an inflection point.

The fifth lens 250 has positive refractive power and is made of plastic. An object-side surface 252, which faces the object side, is a convex aspheric surface, and an image-side surface 254, which faces the image side, is a concave aspheric surface.

The sixth lens 260 has positive refractive power and is made of plastic. An object-side surface 262, which faces the object side, is a convex aspheric surface, and an image-side surface 264, which faces the image side, is a concave aspheric surface. The object-side surface 262 has two inflection points, and the image-side surface 264 has three inflection points. Whereby, the incident angle of each view field could be adjusted to improve aberration.

The seventh lens 270 has negative refractive power and is made of plastic. An object-side surface 272, which faces the object side, is a convex aspheric surface, and an image-side surface 274, which faces the image side, is a concave aspheric surface. The object-side surface 272 and the image-side surface 274 both have an inflection point. It may help to shorten the back focal length to keep small in size. In addition, which may reduce an incident angle of the light of an off-axis field of view and correct the aberration of the off-axis field of view.

The infrared rays filter 280 is made of glass and between the seventh lens 270 and the image plane 290. The infrared rays filter 280 gives no contribution to the focal length of the system.

The parameters of the lenses of the second embodiment are listed in Table 3 and Table 4.

TABLE 3 f = 8.4991 mm; f/HEP = 1.6; HAF = 14.9992 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 1E+18 | | | | |
| 1 | aperture | 1E+18 | −0.361 | | | | |
| 2 | 1st lens | 6.447698007 | 1.000 | plastic | 1.544 | 56.09 | 16.285 |
| 3 | | 22.18945545 | 0.100 | | | | |
| 4 | 2nd lens | 3.483665121 | 1.000 | plastic | 1.544 | 56.09 | 10.524 |
| 5 | | 7.954302526 | 0.025 | | | | |
| 6 | 3rd lens | 5.66931248 | 1.000 | plastic | 1.544 | 56.09 | 12.118 |
| 7 | | 37.20035686 | 0.100 | | | | |
| 8 | 4th lens | −8.66067349 | 0.716 | plastic | 1.661 | 20.39 | −3.728 |
| 9 | | 3.60174356 | 0.736 | | | | |
| 10 | 5th lens | 2.350844049 | 0.371 | plastic | 1.661 | 20.39 | 12.202 |
| 11 | | 3.097492638 | 1.219 | | | | |
| 12 | 6th lens | 2.132520879 | 0.241 | plastic | 1.515 | 56.55 | 146.348 |
| 13 | | 2.109859867 | 0.923 | | | | |
| 14 | 7th lens | 17.78119025 | 0.772 | plastic | 1.661 | 20.39 | −21.896 |
| 15 | | 7.877909093 | 0.121 | | | | |

TABLE 3-continued f = 8.4991 mm; f/HEP = 1.6; HAF = 14.9992 deg

| Surface | | Radius of curvature (mm) | Thickness (mm) | Material | Refractive index | Abbe number | Focal length (mm) |
|---|---|---|---|---|---|---|---|
| 16 | Infrared rays filter | 1E+18 | 0.175 | BK_7 | 1.517 | 64.2 | |
| 17 | | 1E+18 | 0.750 | | | | |
| 18 | Image plane | 1E+18 | 0.000 | | | | |

Reference wavelength: 555 nm; the position of blocking light: the effective half diameter of the clear aperture of the eighth surface is 2.250 mm; in the current embodiment, the aperture value is calculated with the first aperture, and the effective diameter of the second aperture disposed on the 11th surface is used as the HEP, and its value is 3.250 mm.

TABLE 4

Coefficients of the aspheric surfaces

| Surface | 2 | 3 | 4 | 5 | 6 | 7 | 8 |
|---|---|---|---|---|---|---|---|
| k | −5.535603E+00 | −5.553215E+01 | −5.237161E+00 | 6.325933E+00 | −4.844017E+00 | −6.064212E+01 | −8.415886E+01 |
| A4 | 1.554436E−03 | −4.563755E−03 | 1.772811E−02 | 4.430733E−02 | 2.910324E−02 | −1.612181E−02 | 3.128972E−03 |
| A6 | 2.678979E−04 | −3.506708E−04 | −4.204303E−03 | −1.856230E−02 | −1.437141E−02 | 8.147418E−03 | 4.925738E−03 |
| A8 | −9.432729E−05 | 4.190190E−05 | 1.874538E−04 | 2.496466E−03 | 2.683052E−03 | −2.213949E−03 | −2.395915E−03 |
| A10 | 1.707594E−06 | −2.955195E−06 | 9.726853E−06 | −1.261762E−04 | −1.909220E−04 | 2.294538E−04 | 3.116642E−04 |
| A12 | 0.000000E+00 | 0.000000E+00 | 0.000000E+00 | 0.000000E+00 | 0.000000E+00 | 0.000000E+00 | 0.000000E+00 |

| Surface | 9 | 10 | 11 | 12 | 13 | 14 | 15 |
|---|---|---|---|---|---|---|---|
| k | −1.976129E+00 | −5.144034E+00 | −1.209540E+01 | −6.878320E+00 | −5.850466E+00 | −1.073856E+01 | −2.565493E+01 |
| A4 | 2.578747E−03 | −1.951443E−02 | −1.433206E−02 | 2.063840E−02 | 2.216475E−02 | −4.455157E−02 | −5.064972E−02 |
| A6 | 5.649010E−03 | 6.242894E−03 | 6.090989E−03 | −2.807821E−02 | −1.950083E−02 | 1.956719E−02 | 1.457645E−02 |
| A8 | −3.903506E−03 | −1.980777E−04 | 4.844492E−04 | 8.270586E−03 | 5.260753E−03 | −4.609317E−03 | −2.868019E−03 |
| A10 | 6.089203E−04 | 2.732812E−05 | 2.865964E−04 | −7.500485E−04 | −4.730056E−04 | 3.642591E−04 | 1.932998E−04 |
| A12 | 0.000000E+00 | 0.000000E+00 | 0.000000E+00 | 0.000000E+00 | 0.000000E+00 | 0.000000E+00 | 0.000000E+00 |

An equation of the aspheric surfaces of the second embodiment is the same as that of the first embodiment, and the definitions are the same as well.

The exact parameters of the second embodiment based on Table 3 and Table 4 are listed in the following table:

| Second embodiment (Reference wavelength: 555 nm) | | | | | |
|---|---|---|---|---|---|
| MTFE0 | MTFE3 | MTFE7 | MTFQ0 | MTFQ3 | MTFQ7 |
| 0.89 | 0.83 | 0.8 | 0.73 | 0.55 | 0.5 |
| ETP1 | ETP2 | ETP3 | ETP4 | ETP5 | ETP6 |
| 0.401 | 0.540 | 1.432 | 3.482 | 6.504 | 0.770 |
| ETP7 | ETL | EBL | EIN | EIR | PIR |
| 0.157 | 8.813 | 1.872 | 6.941 | 0.947 | 0.121 |
| EIN/ETL | SETP/EIN | EIR/PIR | SETP | STP | SETP/STP |
| 0.788 | 1.914 | 7.798 | 13.287 | 5.101 | 2.605 |
| ETP1/TP1 | ETP2/TP2 | ETP3/TP3 | ETP4/TP4 | ETP5/TP5 | ETP6/TP6 |
| 0.401 | 0.540 | 1.432 | 4.863 | 17.542 | 3.191 |
| ETP7/TP7 | BL | EBL/BL | SED | SIN | SED/SIN |
| 0.204 | 1.047 | 1.7879 | 6.346 | 3.103 | 2.045 |
| ED12 | ED23 | ED34 | ED45 | ED56 | ED67 |
| 1.010 | 0.023 | 0.619 | 1.159 | 7.637 | 0.843 |
| ED12/IN12 | ED23/IN23 | ED34/IN34 | ED45/IN45 | ED56/IN56 | ED67/IN67 |
| 10.101 | 0.907 | 6.183 | 1.575 | 6.266 | 0.914 |
| \|f/f1\| | \|f/f2\| | \|f/f3\| | \|f/f4\| | \|f/f5\| | \|f/f6\| |
| 0.5219 | 0.8076 | 0.7014 | 2.2799 | 0.6965 | 0.0581 |
| \|f/f7\| | ΣPPR | ΣNPR | ΣPPR/\|ΣNPR\| | IN12/f | IN67/f |
| 0.3882 | 3.5612 | 1.8923 | 1.8819 | 0.0118 | 0.1086 |
| \|f1/f2\| | \|f2/f3\| | (TP1 + IN12)/TP2 | | (TP7 + IN67)/TP6 | |
| 1.5474 | 0.8685 | 1.1000 | | 7.0211 | |
| HOS | InTL | HOS/HOI | InS/HOS | ODT % | TDT % |
| 9.2501 | 8.2033 | 4.0218 | 0.9610 | 1.0006 | 0.9591 |
| HVT11 | HVT12 | HVT21 | HVT22 | HVT31 | HVT32 |
| 0.0000 | 1.3869 | 0.0000 | 0.0000 | 0.0000 | 0.8297 |

-continued

| Second embodiment (Reference wavelength: 555 nm) | | | | | |
|---|---|---|---|---|---|
| HVT61 | HVT62 | HVT71 | HVT72 | HVT72/ HOI | HVT72/HOS |
| 0.0000 | 0.0000 | 0.6412 | 0.8641 | 0.3757 | 0.0934 |
| PSTA | PLTA | NSTA | NLTA | SSTA | SLTA |
| −0.093 mm | −0.028 mm | 0.002 mm | 0.002 mm | 0.009 mm | 0.006 mm |
| VSFS0 | VSFS3 | VSFS7 | VTFS0 | VTFS3 | VTFS7 |
| −0.003 mm | −0.003 mm | 0.003 mm | −0.003 mm | −0.005 mm | −0.005 mm |
| VSMTF0 | VSMTF3 | VSMTF7 | VTMTF0 | VTMTF3 | VTMTF7 |
| 0.751 | 0.681 | 0.662 | 0.751 | 0.620 | 0.528 |
| ISFS0 | ISFS3 | ISFS7 | ITFS0 | ITFS3 | ITFS7 |
| 0.005 mm | 0.005 mm | 0.008 mm | 0.005 mm | 0.003 mm | 0.003 mm |
| ISMTF0 | ISMTF3 | ISMTF7 | ITMTF0 | ITMTF3 | ITMTF7 |
| 0.808 | 0.748 | 0.726 | 0.808 | 0.745 | 0.648 |
| FS | AIFS | AVFS | AFS | | TP1 |
| 0.008 mm | 0.005 mm | −0.003 mm | 0.007 mm | | 1.000 mm |
| IN12 | IN23 | IN34 | IN45 | IN56 | IN67 |
| 0.1000 mm | 0.0250 mm | 0.1001 mm | 0.7357 mm | 1.2189 mm | 0.9230 mm |

The results of the equations of the second embodiment based on Table 3 and Table 4 are listed in the following table:

| Values related to the inflection points of the second embodiment (Reference wavelength: 555 nm) | | | | | | | |
|---|---|---|---|---|---|---|---|
| HIF111 | 1.9903 | HIF111/HOI | 0.8653 | SGI111 | 0.2992 | \|SGI111\|/(\|SGI111\| + TP1) | 0.2303 |
| HIF121 | 0.8161 | HIF121/HOI | 0.3548 | SGI121 | 0.0126 | \|SGI121\|/(\|SGI121\| + TP1) | 0.0125 |
| HIF211 | 1.6647 | HIF211/HOI | 0.7238 | SGI211 | 0.3904 | \|SGI211\|/(\|SGI211\| + TP2) | 0.2808 |
| HIF212 | 2.3682 | HIF212/HOI | 1.0296 | SGI212 | 0.6473 | \|SGI212\|/(\|SGI212\| + TP2) | 0.3929 |
| HIF221 | 1.3713 | HIF221/HOI | 0.5962 | SGI221 | 0.1870 | \|SGI211\|/(\|SGI221\| + TP2) | 0.1575 |
| HIF311 | 1.4927 | HIF311/HOI | 0.6490 | SGI311 | 0.2261 | \|SGI311\|/(\|SGI311\| + TP3) | 0.1844 |
| HIF321 | 0.4140 | HIF321/HOI | 0.1800 | SGI321 | 0.0019 | \|SGI321\|/(\|SGI321\| + TP3) | 0.0019 |
| HIF322 | 1.7794 | HIF322/HOI | 0.7736 | SGI322 | −0.0113 | \|SGI322\|/(\|SGI322\| + TP3) | 0.0112 |
| HIF411 | 0.7893 | HIF411/HOI | 0.3432 | SGI411 | −0.0292 | \|SGI411\|/(\|SGI411\| + TP4) | 0.0392 |
| HIF611 | 0.9279 | HIF611/HOI | 0.4034 | SGI611 | 0.1661 | \|SGI611\|/(\|SGI611\| + TP6) | 0.4076 |
| HIF612 | 1.5757 | HIF612/HOI | 0.6851 | SGI612 | 0.3225 | \|SGI612\|/(\|SGI612\| + TP6) | 0.5719 |
| HIF621 | 1.1584 | HIF621/HOI | 0.5036 | SGI621 | 0.2553 | \|SGI621\|/(\|SGI621\| + TP6) | 0.5140 |
| HIF622 | 1.5536 | HIF622/HOI | 0.6755 | SGI622 | 0.3885 | \|SGI622\|/(\|SGI622\| + TP6) | 0.6167 |
| HIF623 | 1.9050 | HIF623/HOI | 0.8283 | SGI623 | 0.5078 | \|SGI623\|/(\|SGI623\| + TP6) | 0.6777 |
| HIF711 | 0.3457 | HIF711/HOI | 0.1503 | SGI711 | 0.0028 | \|SGI711\|/(\|SGI711\| + TP7) | 0.0036 |
| HIF721 | 0.4642 | HIF721/HOI | 0.2018 | SGI721 | 0.0112 | \|SGI721\|/(\|SGI721\| + TP7) | 0.0143 |

Third Embodiment

Figure 3A:
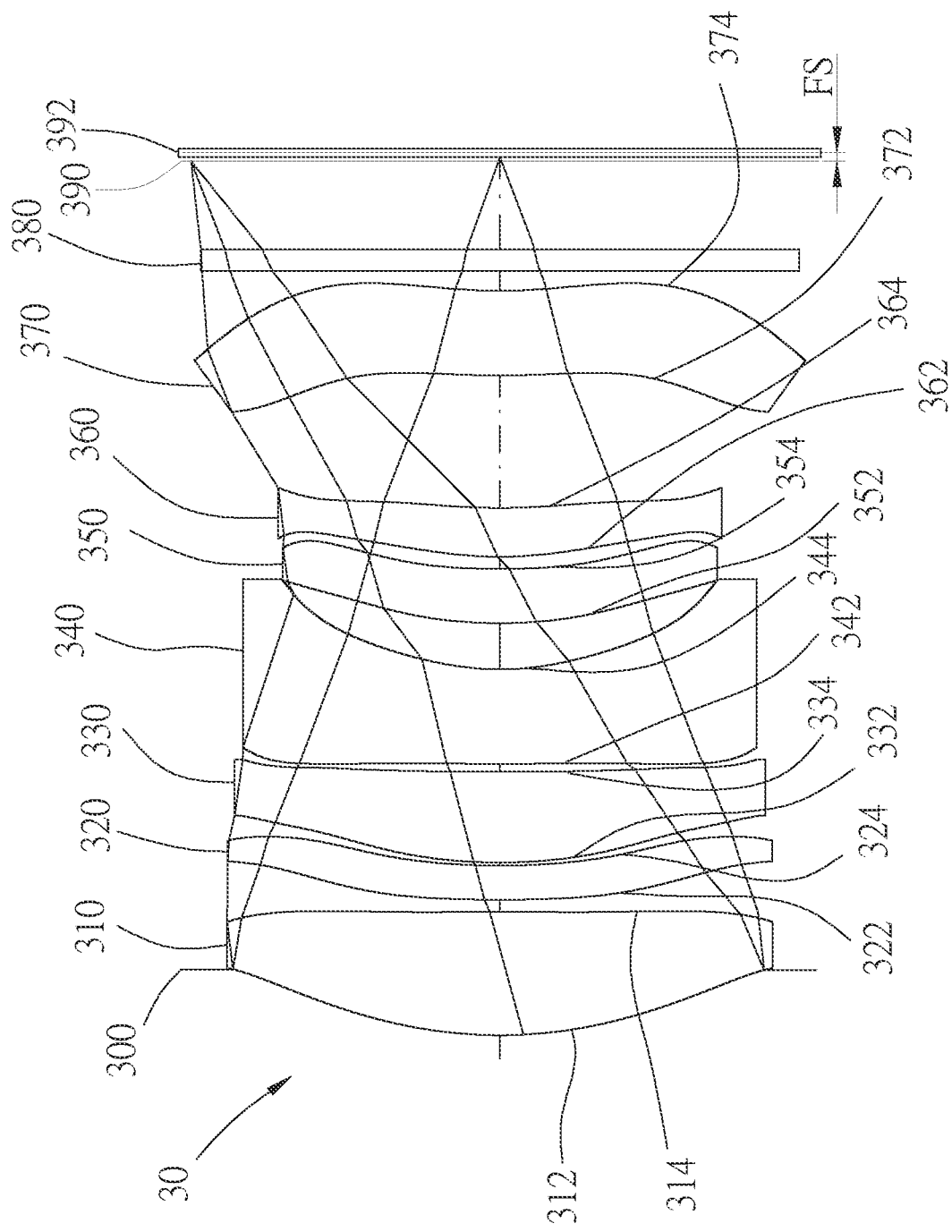
FIG. 3A is a schematic diagram of a third embodiment of the present invention.
Figure 3:
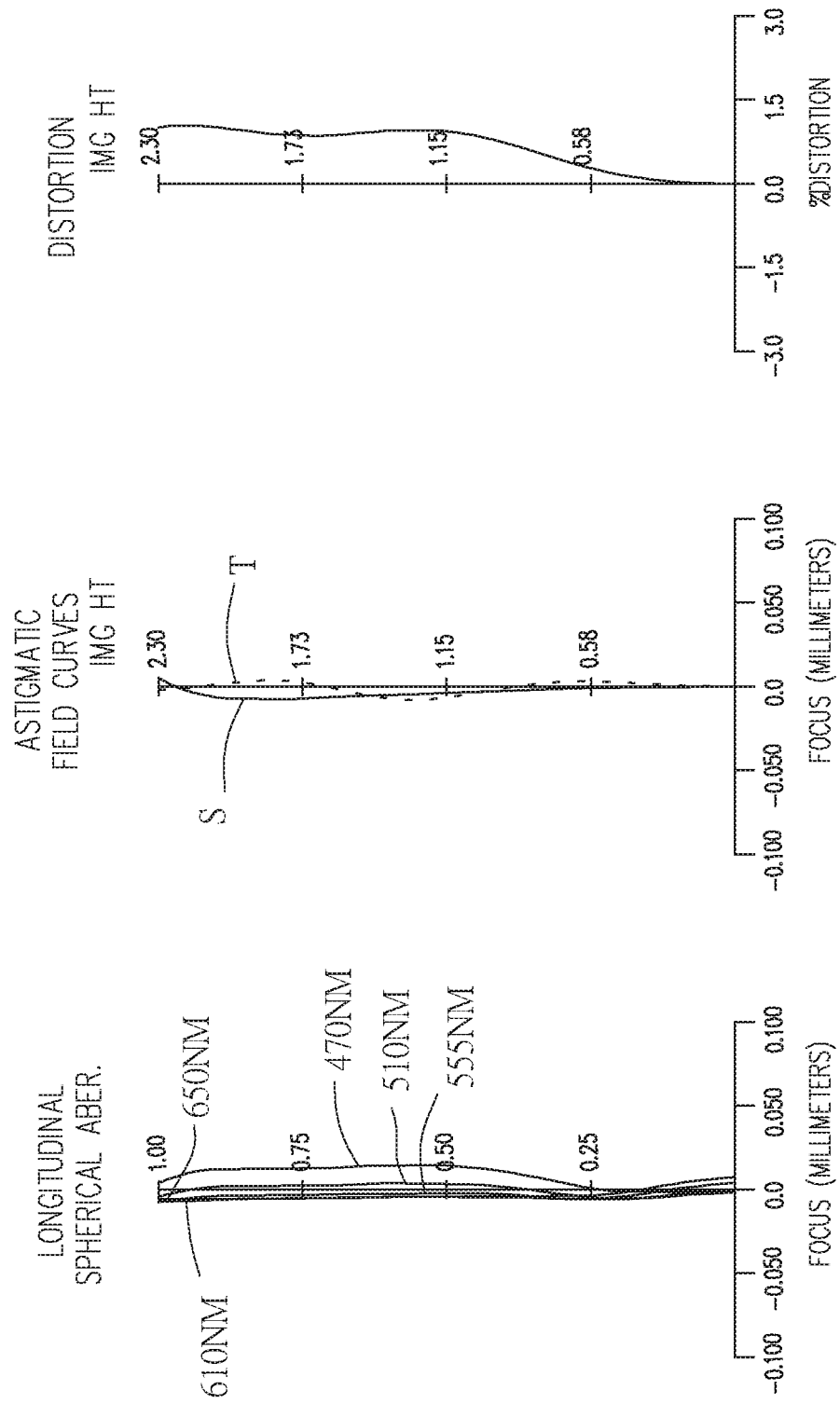
FIG. 3B shows curve diagrams of longitudinal spherical aberration, astigmatic field, and optical distortion of the optical image capturing system in the order from left to right of the third embodiment of the present application.
FIG. 3C shows a feature map of modulation transformation of the optical image capturing system of the third embodiment of the present application in visible light spectrum.
FIG. 3D is a diagram showing the through-focus MTF values of the visible light spectrum at the central field of view, 0.3 field of view, and 0.7 field of view of the third embodiment of the present invention.
FIG. 3E is a diagram showing the through-focus MTF values of the infrared light spectrum at the central field of view, 0.3 field of view, and 0.7 field of view of the third embodiment of the present disclosure.
Figure 3C:
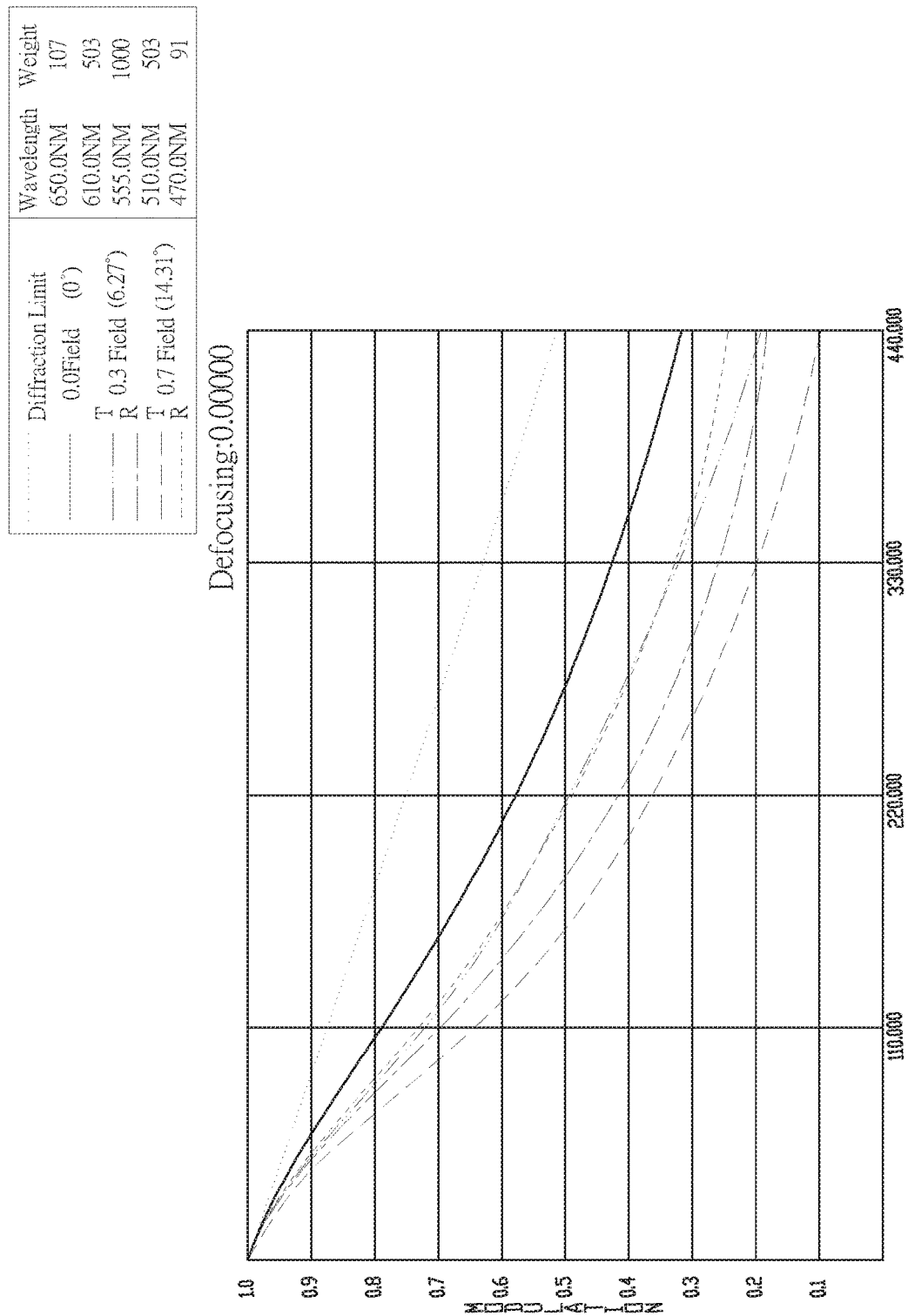
Figure 3D:
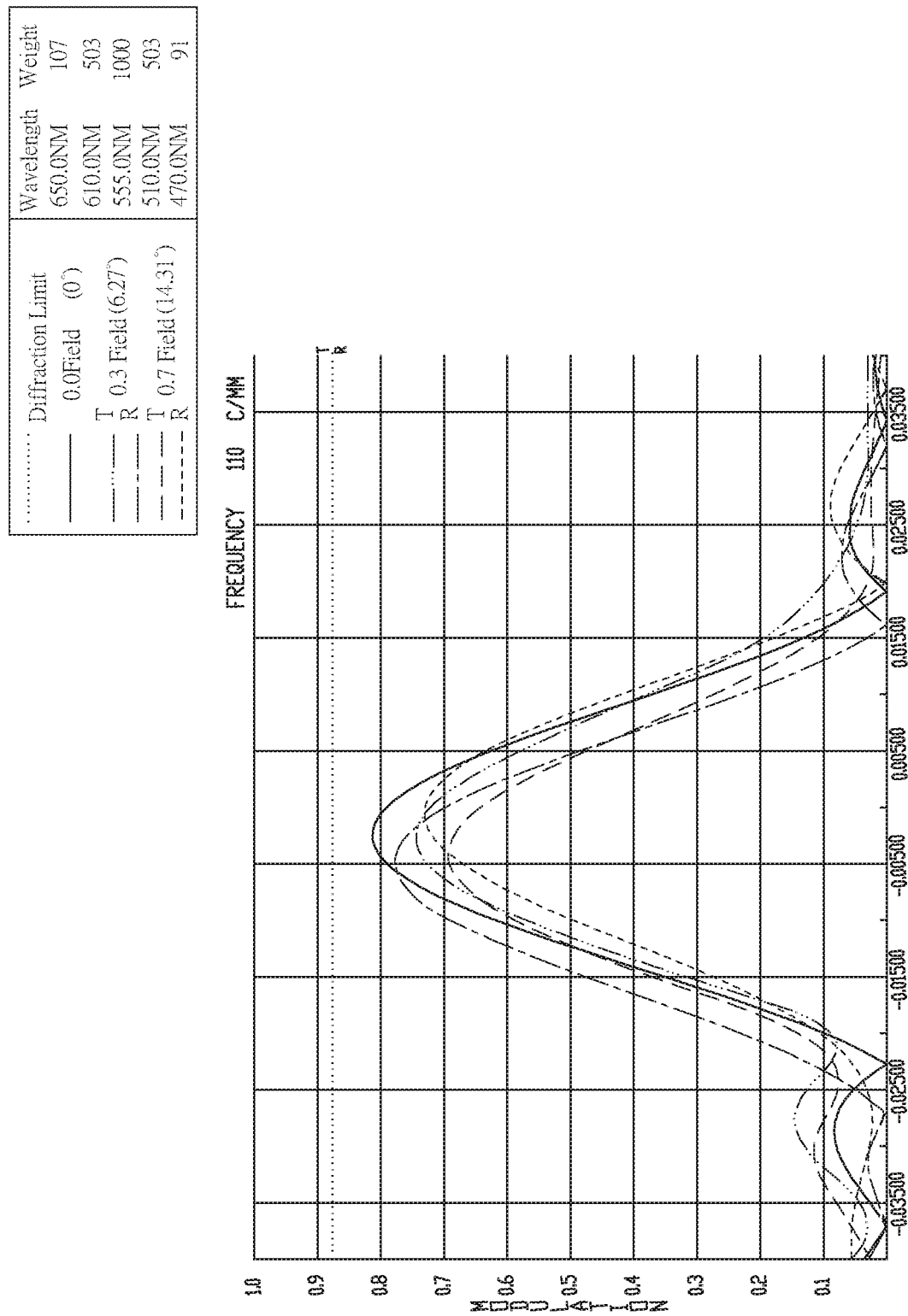
Figure 3:
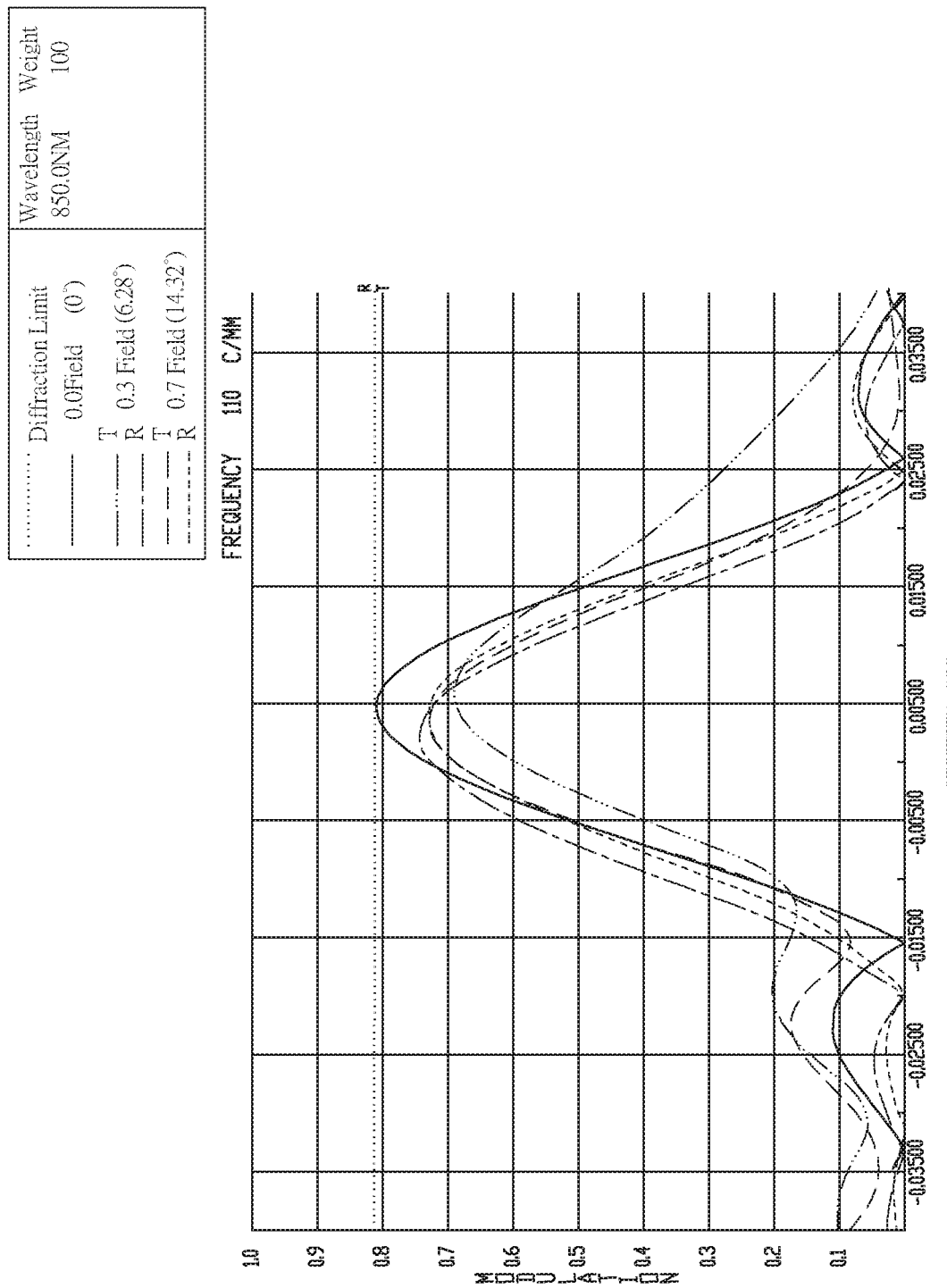

As shown in FIG. 3A and FIG. 3B, an optical image capturing system of the third embodiment of the present invention includes, along an optical axis from an object side to an image side, an aperture 300, a first lens 310, a second lens 320, a third lens 330, a fourth lens 340, a fifth lens 350, a sixth lens 360, a seventh lens 370, an infrared rays filter 380, an image plane 390, and an image sensor 392. FIG. 3C shows a feature map of modulation transformation of the optical image capturing system of the third embodiment of the present application in visible light spectrum. FIG. 3D is a diagram showing the through-focus MTF values of the visible light spectrum at the central field of view, 0.3 field of view, and 0.7 field of view of the third embodiment of the present invention. FIG. 3E is a diagram showing the through-focus MTF values of the infrared light spectrum at the central field of view, 0.3 field of view, and 0.7 field of view of the third embodiment of the present disclosure.

The first lens 310 has positive refractive power and is made of plastic. An object-side surface 312 thereof, which faces the object side, is a convex aspheric surface, and an image-side surface 314 thereof, which faces the image side, is a convex aspheric surface. The object-side surface 312 has an inflection point, and the image-side surface 314 has two inflection points.

The second lens 320 has negative refractive power and is made of plastic. An object-side surface 322 thereof, which faces the object side, is a convex aspheric surface, and an image-side surface 324 thereof, which faces the image side, is a concave aspheric surface. The object-side surface 322 has two inflection points, and the image-side surface 324 has an inflection point.

The third lens 330 has positive refractive power and is made of plastic. An object-side surface 332 thereof, which faces the object side, is a convex aspheric surface, and an image-side surface 334 thereof, which faces the image side, is a concave aspheric surface. The object-side surface 332 has three inflection points, and the image-side surface 334 has two inflection points.

The fourth lens 340 has negative refractive power and is made of plastic. An object-side surface 342, which faces the object side, is a convex aspheric surface, and an image-side surface 344, which faces the image side, is a concave aspheric surface. The object-side surface 342 has two inflection points.

The fifth lens 350 has positive refractive power and is made of plastic. An object-side surface 352, which faces the object side, is a convex aspheric surface, and an image-side surface 354, which faces the image side, is a concave aspheric surface. The object-side surface 352 has three inflection points, and the image-side surface 354 has an inflection point.

The sixth lens 360 has positive refractive power and is made of plastic. An object-side surface 362, which faces the object side, is a convex aspheric surface, and an image-side surface 364, which faces the image side, is a concave aspheric surface. The object-side surface 362 and the image-side surface 364 both have three inflection points. Whereby, the incident angle of each view field could be adjusted to improve aberration.

The seventh lens 370 has negative refractive power and is made of plastic. An object-side surface 372, which faces the object side, is a convex aspheric surface, and an image-side surface 374, which faces the image side, is a concave aspheric surface. It may help to shorten the back focal length to keep small in size. In addition, the object-side surface 372 has two inflection points, and the image-side surface 374 has an inflection point. It may reduce an incident angle of the light of an off-axis field of view and correct the aberration of the off-axis field of view.

The infrared rays filter 380 is made of glass and between the seventh lens 370 and the image plane 390. The infrared rays filter 380 gives no contribution to the focal length of the system.

The parameters of the lenses of the third embodiment are listed in Table 5 and Table 6.

TABLE 5 f = 6.2573 mm; f/HEP = 1.6; HAF = 19.9977 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 1E+18 | | | | |
| 1 | aperture | 1E+18 | −0.478 | | | | |
| 2 | 1st lens | 3.133247792 | 1.000 | plastic | 1.544 | 56.09 | 5.241 |
| 3 | | −29.18622727 | 0.100 | | | | |
| 4 | 2nd lens | 13.56514942 | 0.275 | plastic | 1.544 | 56.09 | −12.472 |
| 5 | | 4.500689588 | 0.025 | | | | |
| 6 | 3rd lens | 3.434531578 | 0.736 | plastic | 1.544 | 56.09 | 7.626 |
| 7 | | 18.15120713 | 0.062 | | | | |
| 8 | 4th lens | 10.02043639 | 0.769 | plastic | 1.661 | 20.39 | −3.528 |
| 9 | | 1.846692851 | 0.375 | | | | |
| 10 | 5th lens | 3.837222995 | 0.440 | plastic | 1.515 | 56.55 | 15.575 |
| 11 | | 7.053608055 | 0.098 | | | | |
| 12 | 6th lens | 2.650594367 | 0.395 | plastic | 1.661 | 20.39 | 11.612 |
| 13 | | 3.789786932 | 1.075 | | | | |
| 14 | 7th lens | 5.320360687 | 0.688 | plastic | 1.584 | 29.89 | −19.299 |
| 15 | | 3.447806829 | 0.161 | | | | |
| 16 | Infrared rays filter | 1E+18 | 0.175 | BK_7 | 1.517 | 64.2 | |
| 17 | | 1E+18 | 0.750 | | | | |
| 18 | Image plane | 1E+18 | 0.000 | | | | |

Reference wavelength: 555 nm; the position of blocking light: none; in the current embodiment, the aperture value is calculated with the first aperture, and the effective diameter of the second aperture disposed on the 9th surface is used as the HEP, and its value is 3.054 mm.

TABLE 6

Coefficients of the aspheric surfaces

| Surface | 2 | 3 | 4 | 5 | 6 | 7 | 8 |
|---|---|---|---|---|---|---|---|
| k | −9.198605E−01 | −1.698626E+01 | 2.742700E+01 | −3.861333E+01 | −9.178131E+00 | 5.739133E+01 | −3.487819E+00 |
| A4 | 4.975445E−04 | 3.731084E−02 | 4.232650E−02 | 6.151410E−03 | −2.928505E−05 | −4.560688E−02 | −1.134810E−01 |
| A6 | −2.191788E−03 | −2.110369E−02 | 2.715583E−03 | 8.004535E−02 | 7.293121E−02 | 7.039653E−02 | 1.108751E−01 |
| A8 | 7.769409E−04 | 4.342392E−03 | −1.117654E−02 | −7.862726E−02 | −7.526724E−02 | −4.862859E−02 | −5.797996E−02 |
| A10 | −3.062781E−04 | −1.722479E−04 | 4.273636E−03 | 2.963007E−02 | 2.964403E−02 | 1.571173E−02 | 1.657600E−02 |
| A12 | 5.865475E−05 | −8.251126E−05 | −7.872032E−04 | −5.139265E−03 | −5.202982E−03 | −2.319321E−03 | −2.310717E−03 |
| A14 | −5.908380E−06 | 9.136346E−06 | 6.014973E−05 | 3.415643E−04 | 3.383067E−04 | 1.271967E−04 | 1.277043E−04 |

| Surface | 9 | 10 | 11 | 12 | 13 | 14 | 15 |
|---|---|---|---|---|---|---|---|
| k | −1.281805E+00 | −8.249022E−01 | −3.853875E+01 | −7.708254E+00 | −2.896254E+01 | −5.015481E+01 | −2.630334E+01 |
| A4 | −7.320248E−02 | 1.200263E−01 | 1.769711E−01 | −3.459088E−02 | −7.440458E−02 | −7.095834E−02 | −3.553583E−02 |
| A6 | 3.192608E−02 | −1.740717E−01 | −1.702710E−01 | 2.766450E−02 | 6.074074E−02 | −1.712290E−03 | −1.358331E−02 |
| A8 | 1.806664E−02 | 1.402847E−01 | 9.231089E−02 | −4.773417E−02 | −5.319211E−02 | 3.585368E−03 | 6.585718E−03 |
| A10 | −2.351583E−02 | −7.533975E−02 | −2.762462E−02 | 4.352002E−02 | 3.268823E−02 | 6.121757E−04 | −1.131133E−03 |
| A12 | 1.023710E−02 | 2.291316E−02 | 2.386684E−03 | −1.666755E−02 | −8.808329E−03 | −2.825444E−04 | 7.071253E−05 |
| A14 | −1.493500E−03 | −2.846854E−03 | 1.910397E−04 | 2.152559E−03 | 8.180323E−04 | 2.225535E−05 | 3.888315E−07 |

An equation of the aspheric surfaces of the third embodiment is the same as that of the first embodiment, and the definitions are the same as well.

The exact parameters of the third embodiment based on Table 5 and Table 6 are listed in the following table:

| Third embodiment (Reference wavelength: 555 nm) | | | | | |
|---|---|---|---|---|---|
| MTFE0 | MTFE3 | MTFE7 | MTFQ0 | MTFQ3 | MTFQ7 |
| 0.92 | 0.88 | 0.86 | 0.79 | 0.73 | 0.65 |
| ETP1 | ETP2 | ETP3 | ETP4 | ETP5 | ETP6 |
| 0.645 | 0.280 | 0.481 | 1.370 | 0.326 | 0.322 |
| ETP7 | ETL | EBL | EIN | EIR | PIR |
| 0.808 | 6.767 | 1.127 | 5.640 | 0.202 | 0.161 |
| EIN/ETL | SETP/EIN | EIR/PIR | SETP | STP | SETP/STP |
| 0.833 | 0.750 | 1.253 | 4.232 | 4.303 | 1.086 |
| ETP1/TP1 | ETP2/TP2 | ETP3/TP3 | ETP4/TP4 | ETP5/TP5 | ETP6/TP6 |
| 0.645 | 1.017 | 0.653 | 1.781 | 0.741 | 0.815 |
| ETP7/TP7 | BL | EBL/BL | SED | SIN | SED/SIN |
| 1.176 | 1.086 | 1.0378 | 1.408 | 1.735 | 0.811 |
| ED12 | ED23 | ED34 | ED45 | ED56 | ED67 |
| 0.318 | 0.093 | 0.033 | 0.088 | 0.084 | 0.792 |
| ED12/IN12 | ED23/IN23 | ED34/IN34 | ED45/IN45 | ED56/IN56 | ED67/IN67 |
| 3.179 | 3.713 | 0.233 | 0.859 | 0.737 | |
| |f/f1| | |f/f2| | |f/f3| | |f/f4| | |f/f5| | |f/f6| |
| 1.1940 | 0.5017 | 0.8206 | 1.7736 | 0.4018 | 0.5388 |
| |f/f7| | ΣPPR | ΣNPR | ΣPPR/|ΣNPR| | IN12/f | IN67/f |
| 0.3242 | 4.3270 | 1.2277 | 3.5245 | 0.0160 | 0.1717 |
| |f1/f2| | |f2/f3| | (TP1 + IN12)/TP2 | | (TP7 + IN67)/TP6 | |
| 0.4202 | 1.6356 | 4.0000 | | 4.4590 | |
| HOS | InTL | HOS/HOI | InS/HOS | ODT % | TDT % |
| 7.1251 | 6.0387 | 3.0979 | 0.9329 | 1.0395 | 0.1849 |
| HVT11 | HVT12 | HVT21 | HVT22 | HVT31 | HVT32 |
| 0.0000 | 0.0000 | 0.0000 | 1.7312 | 0.0000 | 0.0000 |
| HVT61 | HVT62 | HVT71 | HVT72 | HVT72/HOI | HVT72/HOS |
| 1.4508 | 0.0000 | 0.7005 | 0.9641 | 0.4192 | 0.1353 |
| PSTA | PLTA | NSTA | NLTA | SSTA | SLTA |
| −0.021 mm | 0.005 mm | −0.010 mm | −0.006 mm | 0.005 mm | 0.001 mm |
| VSFS0 | VSFS3 | VSFS7 | VTFS0 | VTFS3 | VTFS7 |
| −0.003 mm | −0.005 mm | −0.000 mm | −0.003 mm | −0.003 mm | −0.005 mm |
| VSMTF0 | VSMTF3 | VSMTF7 | VTMTF0 | VTMTF3 | VTMTF7 |
| 0.813 | 0.778 | 0.730 | 0.813 | 0.744 | 0.692 |
| ISFS0 | ISFS3 | ISFS7 | ITFS0 | ITFS3 | ITFS7 |
| 0.005 mm | 0.003 mm | 0.005 mm | 0.005 mm | 0.005 mm | 0.003 mm |
| ISMTF0 | ISMTF3 | ISMTF7 | ITMTF0 | ITMTF3 | ITMTF7 |
| 0.809 | 0.743 | 0.727 | 0.809 | 0.689 | 0.726 |
| FS | AIFS | AVFS | AFS | | TP1 |
| 0.008 mm | 0.004 mm | −0.003 mm | 0.007 mm | | 1.000 mm |
| IN12 | IN23 | IN34 | IN45 | IN56 | IN67 |
| 0.1000 mm | 0.0250 mm | 0.0625 mm | 0.3754 mm | 0.0978 mm | 1.0746 mm |

The results of the equations of the third embodiment based on Table 5 and Table 6 are listed in the following table:

| Values related to the inflection points of the third embodiment (Reference wavelength: 555 nm) | | | | | | | |
|---|---|---|---|---|---|---|---|
| HIF111 | 1.6071 | HIF111/HOI | 0.6987 | SGI111 | 0.3922 | |SGI111|/(|SGI111| + TP1) | 0.2817 |
| HIF121 | 0.2943 | HIF121/HOI | 0.1280 | SGI121 | −0.0012 | |SGI121|/(|SGI121| + TP1) | 0.0012 |
| HIF122 | 0.9993 | HIF122/HOI | 0.4345 | SGI122 | 0.0032 | |SGI122|/(|SGI122| + TP1) | 0.0032 |
| HIF211 | 1.4093 | HIF211/HOI | 0.6127 | SGI211 | 0.1853 | |SGI211|/(|SGI211| + TP2) | 0.4026 |
| HIF212 | 1.9629 | HIF212/HOI | 0.8534 | SGI212 | 0.3058 | |SGI212|/(|SGI212| + TP2) | 0.5265 |
| HIF221 | 1.0973 | HIF221/HOI | 0.4771 | SGI221 | 0.1395 | |SGI221|/(|SGI221| + TP2) | 0.3366 |
| HIF311 | 1.0905 | HIF311/HOI | 0.4741 | SGI311 | 0.1763 | |SGI311|/(|SGI311| + TP3) | 0.1932 |
| HIF312 | 1.5505 | HIF312/HOI | 0.6741 | SGI312 | 0.2979 | |SGI312|/(|SGI312| + TP3) | 0.2881 |
| HIF313 | 1.7434 | HIF313/HOI | 0.7580 | SGI313 | 0.3424 | |SGI313|/(|SGI313| + TP3) | 0.3175 |
| HIF321 | 1.0905 | HIF321/HOI | 0.4741 | SGI321 | 0.0226 | |SGI321|/(|SGI321| + TP3) | 0.0297 |
| HIF322 | 1.4261 | HIF322/HOI | 0.6200 | SGI322 | 0.0347 | |SGI322|/(|SGI322| + TP3) | 0.0450 |
| HIF411 | 0.3031 | HIF411/HOI | 0.1318 | SGI411 | 0.0037 | |SGI411|/(|SGI411| + TP4) | 0.0048 |
| HIF412 | 0.9201 | HIF412/HOI | 0.4000 | SGI412 | 0.0046 | |SGI412|/(|SGI412| + TP4) | 0.0059 |
| HIF511 | 1.0620 | HIF511/HOI | 0.4617 | SGI511 | 0.1804 | |SGI511|/(|SGI511| + TP5) | 0.2908 |
| HIF512 | 1.2883 | HIF512/HOI | 0.5601 | SGI512 | 0.2480 | |SGI512|/(|SGI512| + TP5) | 0.3604 |
| HIF513 | 1.4965 | HIF513/HOI | 0.6506 | SGI513 | 0.3116 | |SGI513|/( SGI513| + TP5) | 0.4145 |
| HIF521 | 1.0592 | HIF521/HOI | 0.4605 | SGI521 | 0.1521 | |SGI521|/(|SGI521| + TP5) | 0.2568 |
| HIF611 | 0.8133 | HIF611/HOI | 0.3536 | SGI611 | 0.0975 | |SGI611|/(|SGI611| + TP6) | 0.1980 |
| HIF612 | 1.0378 | HIF612/HOI | 0.4512 | SGI612 | 0.1385 | |SGI612|/(|SGI612| + TP6) | 0.2595 |
| HIF613 | 1.1620 | HIF613/HOI | 0.5052 | SGI613 | 0.1610 | |SGI613|/(|SGI613| + TP6) | 0.2895 |

-continued

Values related to the inflection points of the third embodiment
(Reference wavelength: 555 nm)

| | | | | | | | |
|---|---|---|---|---|---|---|---|
| HIF621 | 0.5002 | HIF621/HOI | 0.2175 | SGI621 | 0.0259 | \|SGI621\|/(\|SGI621\| + TP6) | 0.0614 |
| HIF622 | 1.0466 | HIF622/HOI | 0.4551 | SGI622 | 0.0562 | \|SGI622\|/(\|SGI622\| + TP6) | 0.1245 |
| HIF623 | 1.6088 | HIF623/HOI | 0.1504 | SGI623 | 0.6995 | \|SGI623\|/(\|SGI623\| + TP6) | 0.2757 |
| HIF711 | 0.3926 | HIF711/HOI | 0.1707 | SGI711 | 0.0119 | \|SGI711\|/(\|SGI711\| + TP7) | 0.0171 |
| HIF712 | 1.5252 | HIF712/HOI | 0.6631 | SGI712 | −0.1607 | \|SGI712\|/(\|SGI712\| + TP7) | 0.1894 |
| HIF721 | 0.5291 | HIF721/HOI | 0.2300 | SGI721 | 0.0328 | \|SGI721\|/(\|SGI721\| + TP7) | 0.0456 |

Fourth Embodiment

Figure 4A:
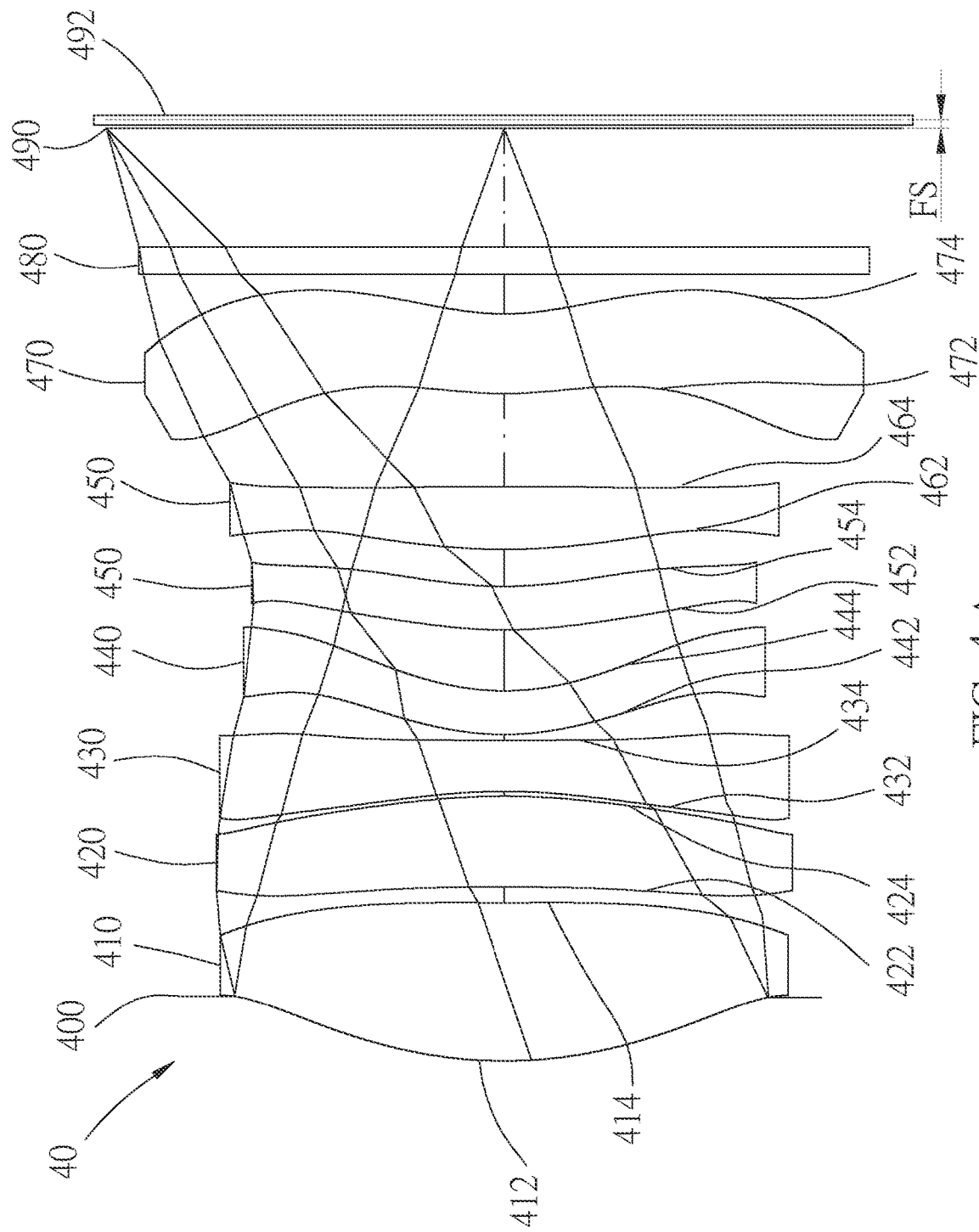
FIG. 4A is a schematic diagram of a fourth embodiment of the present invention.
Figure 4B:
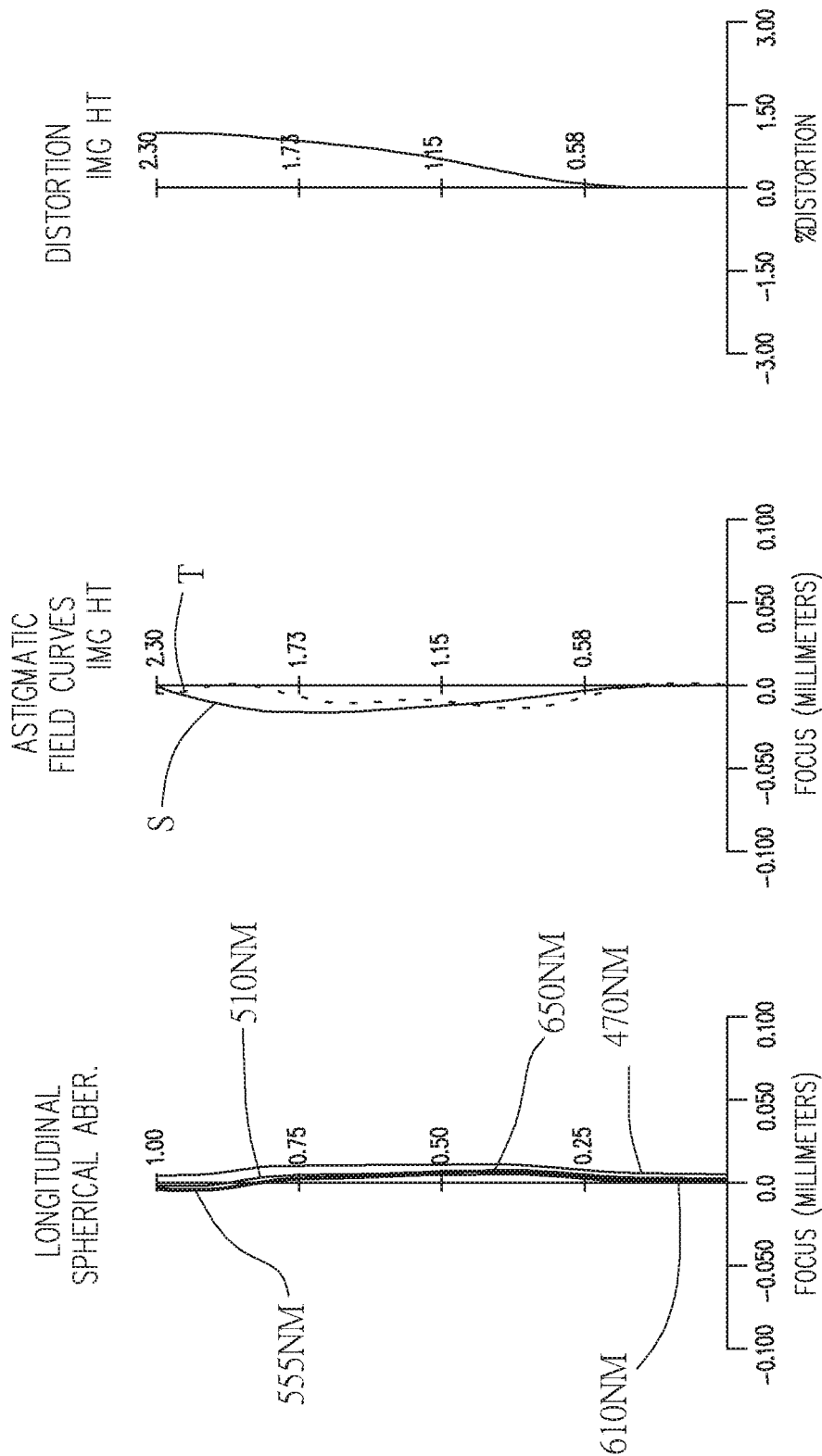
FIG. 4B shows curve diagrams of longitudinal spherical aberration, astigmatic field, and optical distortion of the optical image capturing system in the order from left to right of the fourth embodiment of the present application.
Figure 4C:
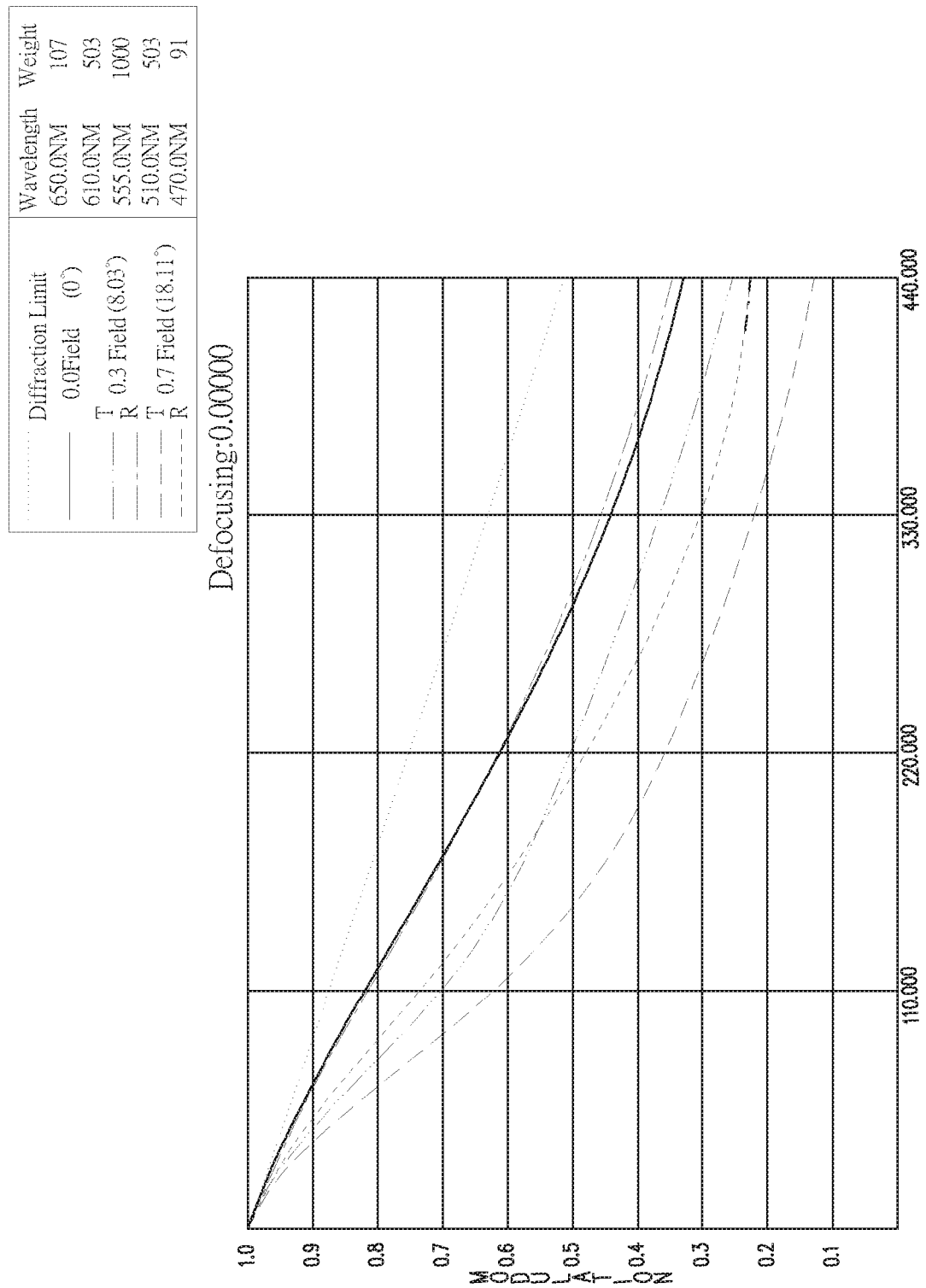
FIG. 4C shows a feature map of modulation transformation of the optical image capturing system of the fourth embodiment in visible light spectrum.
Figure 4D:
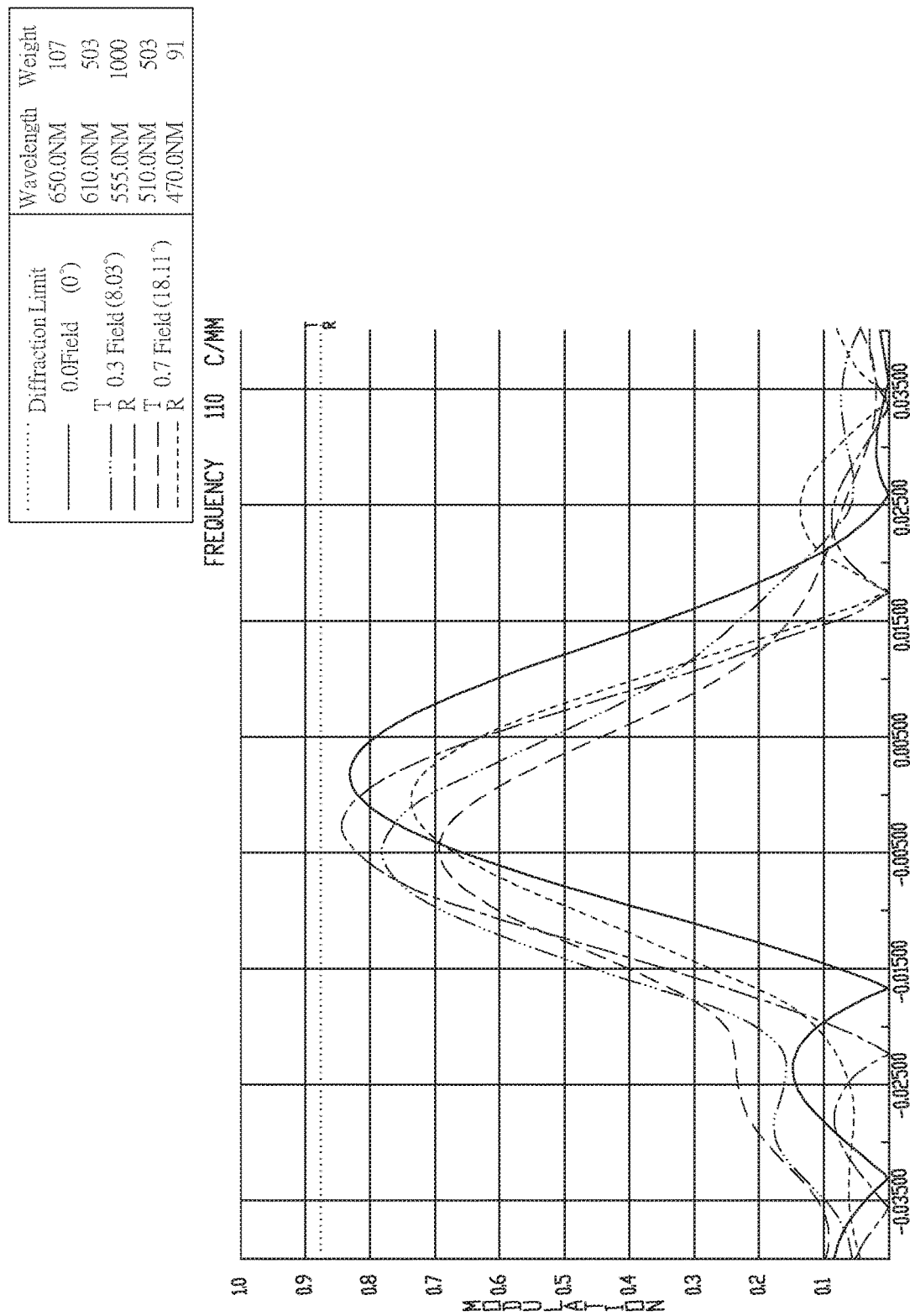
FIG. 4D is a diagram showing the through-focus MTF values of the visible light spectrum at the central field of view, 0.3 field of view, and 0.7 field of view of the fourth embodiment of the present invention.
Figure 4:
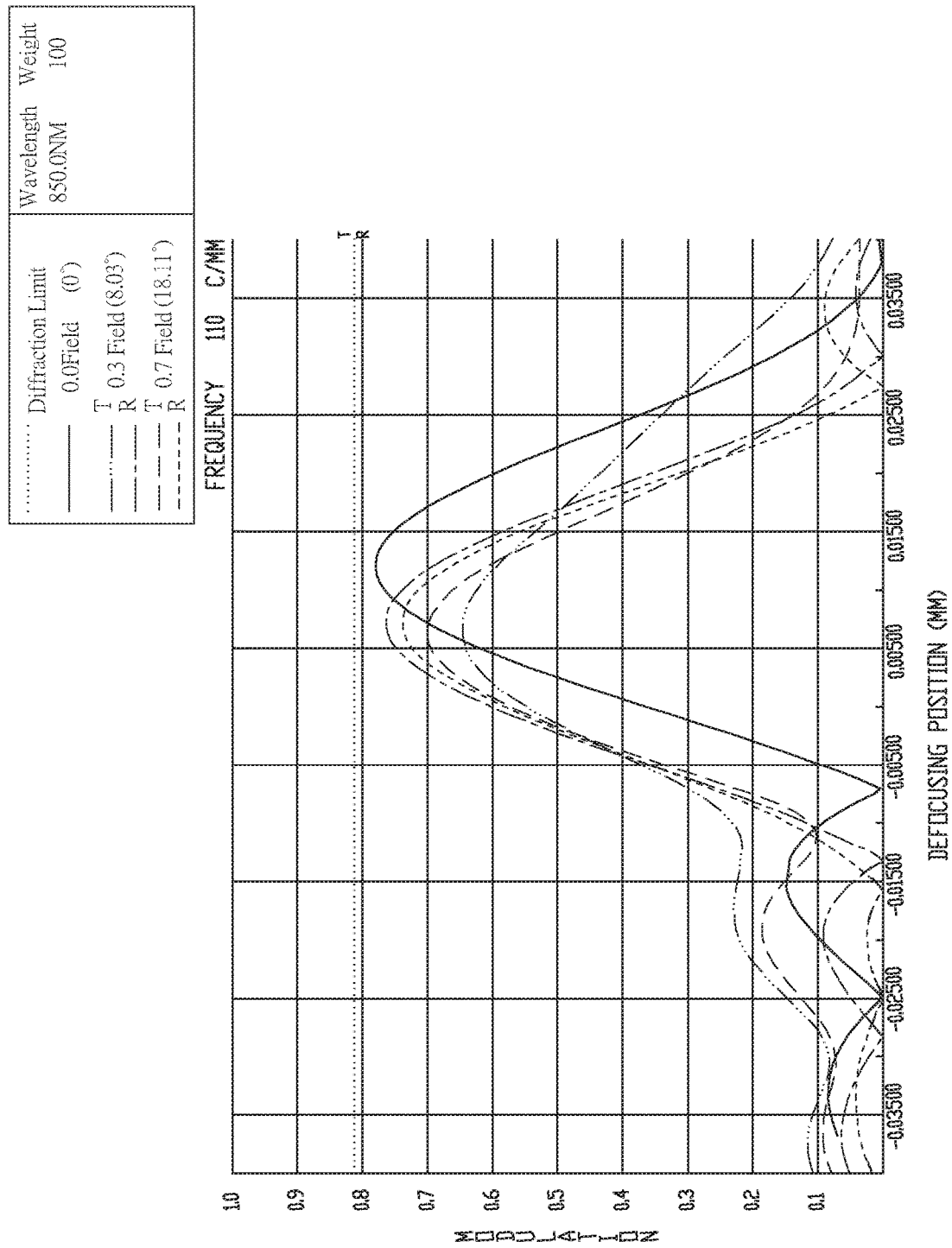
FIG. 4E is a diagram showing the through-focus MTF values of the infrared light spectrum at the central field of view, 0.3 field of view, and 0.7 field of view of the fourth embodiment of the present disclosure.

As shown in FIG. 4A and FIG. 4B, an optical image capturing system 40 of the fourth embodiment of the present invention includes, along an optical axis from an object side to an image side, an aperture 400, a first lens 410, a second lens 420, a third lens 430, a fourth lens 440, a fifth lens 450, a sixth lens 460, a seventh lens 470, an infrared rays filter 480, an image plane 490, and an image sensor 492. FIG. 4C shows a feature map of modulation transformation of the optical image capturing system of the fourth embodiment of the present application in visible light spectrum. FIG. 4D is a diagram showing the through-focus MTF values of the visible light spectrum at the central field of view, 0.3 field of view, and 0.7 field of view of the fourth embodiment of the present invention. FIG. 4E is a diagram showing the through-focus MTF values of the infrared light spectrum at the central field of view, 0.3 field of view, and 0.7 field of view of the fourth embodiment of the present disclosure.

The first lens 410 has positive refractive power and is made of plastic. An object-side surface 412 thereof, which faces the object side, is a convex aspheric surface, and an image-side surface 414 thereof, which faces the image side, is a concave aspheric surface. The object-side surface 412 and the image-side surface 414 both have an inflection point.

The second lens 420 has positive refractive power and is made of plastic. An object-side surface 422 thereof, which faces the object side, is a concave aspheric surface, and an image-side surface 424 thereof, which faces the image side, is a convex aspheric surface. The object-side surface 422 and the image-side surface 424 both have an inflection point.

The third lens 430 has negative refractive power and is made of plastic. An object-side surface 432 thereof, which faces the object side, is a concave aspheric surface, and an image-side surface 434 thereof, which faces the image side, is a concave aspheric surface. The object-side surface 432 has three inflection points, and the image-side surface 434 has two inflection points.

The fourth lens 440 has negative refractive power and is made of plastic. An object-side surface 442, which faces the object side, is a convex aspheric surface, and an image-side surface 444, which faces the image side, is a concave aspheric surface. The object-side surface 442 has two inflection points, and the image-side surface 444 has an inflection point.

The fifth lens 450 has negative refractive power and is made of plastic. An object-side surface 452, which faces the object side, is a convex aspheric surface, and an image-side surface 454, which faces the image side, is a concave aspheric surface. The object-side surface 452 has an inflection point, and the image-side surface 454 has two inflection points.

The sixth lens 460 has positive refractive power and is made of plastic. An object-side surface 462, which faces the object side, is a convex aspheric surface, and an image-side surface 464, which faces the image side, is a convex aspheric surface. The object-side surface 462 has an inflection point, and the image-side surface 464 has three inflection points. Whereby, the incident angle of each view field could be adjusted to improve aberration.

The seventh lens 470 has negative refractive power and is made of plastic. An object-side surface 472, which faces the object side, is a convex aspheric surface, and an image-side surface 474, which faces the image side, is a concave aspheric surface. The object-side surface 472 has two inflection points, and the image-side surface 474 has an inflection point. It may help to shorten the back focal length to keep small in size. In addition, it may reduce an incident angle of the light of an off-axis field of view and correct the aberration of the off-axis field of view.

The infrared rays filter 480 is made of glass and between the seventh lens 470 and the image plane 490. The infrared rays filter 480 gives no contribution to the focal length of the system.

The parameters of the lenses of the fourth embodiment are listed in Table 7 and Table 8.

TABLE 7 f = 4.8841 mm; f/HEP = 1.6; HAF = 24.9976 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 1E+18 | | | | |
| 1 | aperture | 1E+18 | −0.342 | | | | |
| 2 | 1$^{st}$ lens | 2.383255572 | 1.000 | plastic | 1.544 | 56.09 | 4.625 |
| 3 | | 36.22945911 | 0.101 | | | | |
| 4 | 2$^{nd}$ lens | −26.37799273 | 0.574 | plastic | 1.544 | 56.09 | 7.636 |
| 5 | | −3.626922672 | 0.030 | | | | |
| 6 | 3$^{rd}$ lens | −2.983928227 | 0.324 | plastic | 1.661 | 20.39 | −4.209 |
| 7 | | 49.20064476 | 0.037 | | | | |
| 8 | 4$^{th}$ lens | 1.481005395 | 0.275 | plastic | 1.661 | 20.39 | −188.787 |
| 9 | | 1.355049998 | 0.385 | | | | |
| 10 | 5$^{th}$ lens | 2.517699339 | 0.275 | plastic | 1.661 | 20.39 | −26.786 |

TABLE 7-continued f = 4.8841 mm; f/HEP = 1.6; HAF = 24.9976 deg

| Surface | Radius of curvature (mm) | | Thickness (mm) | Material | Refractive index | Abbe number | Focal length (mm) |
|---|---|---|---|---|---|---|---|
| 11 | | 2.110227348 | 0.235 | | | | |
| 12 | $6^{th}$ lens | 3.524964774 | 0.398 | plastic | 1.584 | 29.89 | 5.971 |
| 13 | | −683.8474211 | 0.587 | | | | |
| 14 | $7^{th}$ lens | 2.186825419 | 0.503 | plastic | 1.544 | 56.09 | −8.999 |
| 15 | | 1.39022866 | 0.249 | | | | |
| 16 | Infrared rays filter | 1E+18 | 0.175 | BK_7 | 1.517 | 64.2 | |
| 17 | | | 1E+18 | 0.750 | | | |
| 18 | Image plane | 1E+18 | 0.000 | | | | |

Reference wavelength: 555 nm; the position of blocking light: none; in the current embodiment, the aperture value is calculated with the first aperture, and the effective diameter of the second aperture disposed on the 10th surface is used as the HEP, and its value is 2.892 mm.

TABLE 8

Coefficients of the aspheric surfaces

| Surface | 2 | 3 | 4 | 5 | 6 | 7 | 8 |
|---|---|---|---|---|---|---|---|
| k | −1.218875E−01 | −8.969853E+01 | −1.435825E+01 | −8.680769E+00 | −3.634207E+01 | −7.954857E+01 | −7.021938E+00 |
| A4 | −1.019718E−02 | −8.633031E−02 | −7.372909E−02 | 2.405410E−02 | −3.859857E−02 | −1.719656E−02 | 7.571929E−02 |
| A6 | −7.807115E−04 | 6.977080E−02 | 1.086433E−01 | 6.016156E−04 | 6.619974E−02 | 6.746532E−02 | −9.807136E−02 |
| A8 | −3.488801E−03 | −4.771421E−02 | −9.164180E−02 | −1.489882E−02 | −3.610474E−02 | −3.479172E−02 | 5.035133E−02 |
| A10 | 2.044196E−03 | 2.030031E−02 | 4.638318E−02 | 1.017714E−02 | 4.622284E−03 | −5.684245E−03 | −3.790484E−02 |
| A12 | −1.141690E−03 | −4.781643E−03 | −1.191679E−02 | −3.314542E−03 | 1.428038E−03 | 6.404952E−03 | 1.683565E−02 |
| A14 | 1.918269E−04 | 4.675975E−04 | 1.199686E−03 | 4.532215E−04 | −2.713962E−04 | −9.653489E−04 | −2.502330E−03 |
| A16 | 0.000000E+00 | 0.000000E+00 | 0.000000E+00 | 0.000000E+00 | 0.000000E+00 | 0.000000E+00 | 0.000000E+00 |

| Surface | 9 | 10 | 11 | 12 | 13 | 14 | 15 |
|---|---|---|---|---|---|---|---|
| k | −2.108426E+00 | −1.766186E+01 | −1.589015E+01 | −5.021025E+01 | −9.000000E+01 | −1.440552E+01 | −7.523397E+00 |
| A4 | −1.170475E−02 | 1.548658E−02 | 2.504750E−02 | 5.882702E−02 | −1.111478E−01 | −2.340887E−01 | −1.251049E−01 |
| A6 | −1.693222E−02 | −9.776969E−02 | −1.423608E−01 | 1.187524E−02 | 2.692378E−01 | 1.239243E−01 | 5.412811E−02 |
| A8 | −2.835722E−03 | 1.425666E−01 | 1.081808E−01 | −1.010589E−01 | −2.660434E−01 | −4.440686E−02 | −1.848378E−02 |
| A10 | −1.022314E−02 | −8.491785E−02 | −2.220493E−02 | 6.618814E−02 | 1.309606E−01 | 1.008005E−02 | 4.114176E−03 |
| A12 | 9.125807E−03 | 2.091038E−02 | −6.487239E−03 | −1.628895E−02 | −3.156296E−02 | −1.041343E−03 | −5.534957E−04 |
| A14 | −1.766743E−03 | −1.803308E−03 | 2.543689E−03 | 1.354984E−03 | 2.984402E−03 | 2.704751E−05 | 3.335737E−05 |
| A16 | 0.000000E+00 | 0.000000E+00 | 0.000000E+00 | 0.000000E+00 | 0.000000E+00 | 0.000000E+00 | 0.000000E+00 |

An equation of the aspheric surfaces of the fourth embodiment is the same as that of the first embodiment, and the definitions are the same as well.

The exact parameters of the fourth embodiment based on Table 7 and Table 8 are listed in the following table:

| Fourth embodiment (Reference wavelength: 555 nm) | | | | | |
|---|---|---|---|---|---|
| MTFE0 | MTFE3 | MTFE7 | MTFQ0 | MTFQ3 | MTFQ7 |
| 0.93 | 0.87 | 0.84 | 0.83 | 0.7 | 0.63 |
| ETP1 | ETP2 | ETP3 | ETP4 | ETP5 | ETP6 |
| 0.487 | 0.430 | 0.531 | 0.432 | 0.253 | 0.303 |
| ETP7 | ETL | EBL | EIN | EIR | PIR |
| 0.768 | 5.518 | 1.064 | 4.453 | 0.139 | 0.249 |
| EIN/ETL | SETP/EIN | EIR/PIR | SETP | STP | SETP/STP |
| 0.807 | 0.720 | 0.557 | 3.205 | 3.350 | 0.957 |
| ETP1/TP1 | ETP2/TP2 | ETP3/TP3 | ETP4/TP4 | ETP5/TP5 | ETP6/TP6 |
| 0.487 | 0.749 | 1.638 | 1.572 | 0.921 | 0.761 |
| ETP7/TP7 | BL | EBL/BL | SED | SIN | SED/SIN |
| 1.527 | 1.174 | 0.9063 | 1.248 | 1.376 | 0.907 |
| ED12 | ED23 | ED34 | ED45 | ED56 | ED67 |
| 0.179 | 0.057 | 0.244 | 0.155 | 0.187 | 0.426 |
| ED12/IN12 | ED23/IN23 | ED34/IN34 | ED45/IN45 | ED56/IN56 | ED67/IN67 |
| 1.769 | 1.879 | 6.614 | 0.403 | 0.795 | 0.725 |
| |f/f1| | |f/f2| | |f/f3| | |f/f4| | |f/f5| | |f/f6| |
| 1.0560 | 0.6397 | 1.1605 | 0.0259 | 0.1823 | 0.8179 |
| |f/f7| | ΣPPR | ΣNPR | ΣPPR/ΣNPR | IN12/f | IN67/f |

-continued

| Fourth embodiment (Reference wavelength: 555 nm) | | | | | |
|---|---|---|---|---|---|
| 0.5427 | 3.0603 | 1.3647 | 2.2424 | 0.0207 | 0.1202 |
| \|f1/f2\| | \|f2/f3\| | (TP1 + IN12)/TP2 | | (TP7 + IN67)/TP6 | |
| 0.6057 | 1.8142 | 1.9196 | | 2.7372 | |
| HOS | InTL | HOS/HOI | InS/HOS | ODT % | TDT % |
| 5.9004 | 4.7260 | 2.5654 | 0.9421 | 0.9970 | 0.3176 |
| HVT11 | HVT12 | HVT21 | HVT22 | HVT31 | HVT32 |
| 0.0000 | 0.2974 | 1.3246 | 0.0000 | 1.5552 | 1.2936 |
| HVT61 | HVT62 | HVT71 | HVT72 | HVT72/HOI | HVT72/HOS |
| 1.1756 | 0.8024 | 0.6765 | 1.0990 | 0.4778 | 0.1863 |
| PSTA | PLTA | NSTA | NLTA | SSTA | SLTA |
| −0.010 mm | 0.005 mm | −0.003 mm | −0.00037 mm | 0.005 mm | 0.002 mm |
| VSFS0 | VSFS3 | VSFS7 | VTFS0 | VTFS3 | VTFS7 |
| 0.003 mm | −0.003 mm | −0.000 mm | 0.003 mm | −0.005 mm | −0.005 mm |
| VSMTF0 | VSMTF3 | VSMTF7 | VTMTF0 | VTMTF3 | VTMTF7 |
| 0.830 | 0.843 | 0.737 | 0.830 | 0.782 | 0.694 |
| ISFS0 | ISFS3 | ISFS7 | ITFS0 | ITFS3 | ITFS7 |
| 0.013 mm | 0.008 mm | 0.008 mm | 0.013 mm | 0.008 mm | 0.008 mm |
| ISMTF0 | ISMTF3 | ISMTF7 | ITMTF0 | ITMTF3 | ITMTF7 |
| 0.780 | 0.764 | 0.739 | 0.780 | 0.646 | 0.697 |
| FS | AIFS | AVFS | AFS | | TP1 |
| 0.010 mm | 0.009 mm | −0.001 mm | 0.010 mm | | 1.0002 mm |
| IN12 | IN23 | IN34 | IN45 | IN56 | IN67 |
| 0.1013 mm | 0.0303 mm | 0.0369 mm | 0.3854 mm | 0.2350 mm | 0.5871 mm |

The results of the equations of the fourth embodiment based on Table 7 and Table 8 are listed in the following table:

| Values related to the inflection points of the fourth embodiment (Reference wavelength: 555 nm) | | | | | | |
|---|---|---|---|---|---|---|
| HIF111 | 1.1882 | HIF111/HOI | 0.5166 | SGI111 | 0.2826 | \|SGI111\|/(\|SGI111\| + TP1) 0.2203 |
| HIF121 | 0.1676 | HIF121/HOI | 0.0729 | SGI121 | 0.0003 | \|SGI121\|/(\|SGI121\| + TP1) 0.0003 |
| HIF211 | 0.9628 | HIF211/HOI | 0.4186 | SGI211 | −0.0371 | \|SGI211\|/(\|SGI211\| + TP2) 0.0607 |
| HIF221 | 1.4790 | HIF221/HOI | 0.6430 | SGI221 | −0.2049 | \|SGI221\|/(\|SGI221\| + TP2) 0.2631 |
| HIF311 | 0.7480 | HIF311/HOI | 0.3252 | SGI311 | −0.0708 | \|SGI311\|/(\|SGI311\| + TP3) 0.1792 |
| HIF312 | 1.0499 | HIF312/HOI | 0.4565 | SGI312 | −0.1133 | \|SGI312\|/(\|SGI312\| + TP3) 0.2589 |
| HIF313 | 1.3240 | HIF313/HOI | 0.5757 | SGI313 | −0.1525 | \|SGI313\|/(\|SGI313\| + TP3) 0.3198 |
| HIF321 | 1.0249 | HIF321/HOI | 0.4456 | SGI321 | 0.0274 | \|SGI321\|/(\|SGI321\| + TP3) 0.0779 |
| HIF322 | 1.4519 | HIF322/HOI | 0.6312 | SGI322 | 0.0365 | \|SGI322\|/(\|SGI322\| + TP3) 0.1010 |
| HIF411 | 0.7580 | HIF411/HOI | 0.3295 | SGI411 | 0.1590 | \|SGI411\|/(\|SGI411\| + TP4) 0.3663 |
| HIF412 | 1.4116 | HIF412/HOI | 0.6137 | SGI412 | 0.2492 | \|SGI412\|/(\|SGI412\| + TP4) 0.4754 |
| HIF421 | 0.8274 | HIF421/HOI | 0.3598 | SGI421 | 0.2186 | \|SGI421\|/(\|SGI421\| + TP4) 0.4428 |
| HIF511 | 1.0525 | HIF511/HOI | 0.4576 | SGI511 | 0.1418 | \|SGI511\|/(\|SGI511\| + TP5) 0.3403 |
| HIF521 | 0.5608 | HIF521/HOI | 0.2438 | SGI521 | 0.0603 | \|SGI521\|/(\|SGI521\| + TP5) 0.1799 |
| HIF522 | 1.2372 | HIF522/HOI | 0.5379 | SGI522 | 0.1309 | \|SGI522\|/(\|SGI522\| + TP5) 0.3225 |
| HIF611 | 0.7699 | HIF611/HOI | 0.3347 | SGI611 | 0.0743 | \|SGI611\|/(\|SGI611\| + TP6) 0.1571 |
| HIF621 | 0.5342 | HIF621/HOI | 0.2323 | SGI621 | −0.0045 | \|SGI621\|/(\|SGI621\| + TP6) 0.0113 |
| HIF622 | 1.0117 | HIF622/HOI | 0.4399 | SGI622 | −0.0061 | \|SGI622\|/(\|SGI622\| + TP6) 0.0152 |
| HIF623 | 1.1416 | HIF623/HOI | 0.4963 | SGI623 | −0.0045 | \|SGI623\|/(\|SGI623\| + TP6) 0.0111 |
| HIF711 | 03505 | HIF711/HOI | 0.1524 | SGI711 | 0.0227 | \|SGI711\|/(\|SGI711\| + TP7) 0.0432 |
| HIF712 | 1.4634 | HIF712/HOI | 0.6363 | SGI712 | −0.1627 | \|SGI712\|/(\|SGI712\| + TP7) 0.2444 |
| HIF721 | 0.4992 | HIF721/HOI | 0.2170 | SGI721 | 0.0690 | \|SGI721\|/(\|SGI721\| + TP7) 0.1207 |

Fifth Embodiment

Figure 5A:
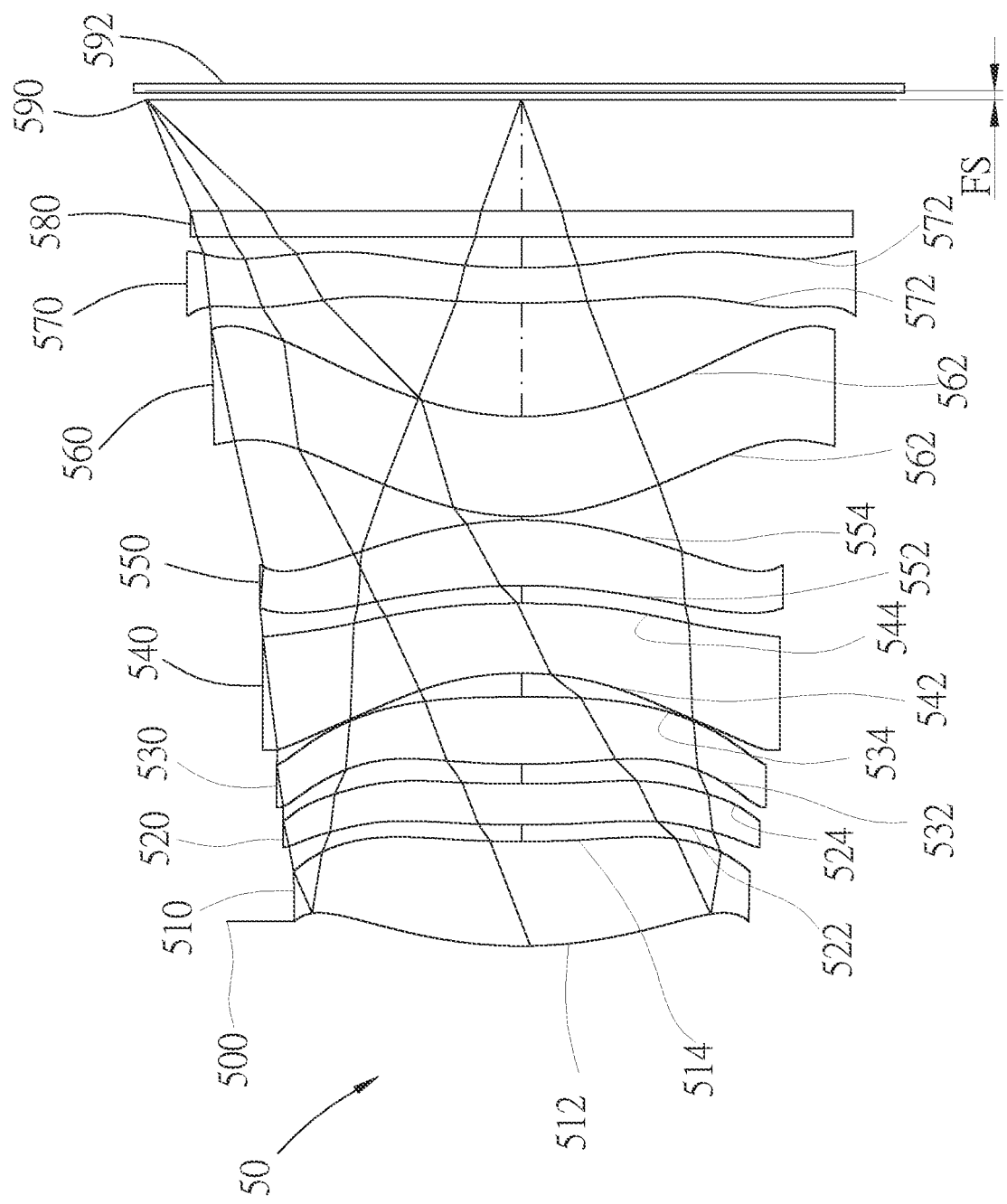
FIG. 5A is a schematic diagram of a fifth embodiment of the present invention.
Figure 5B:
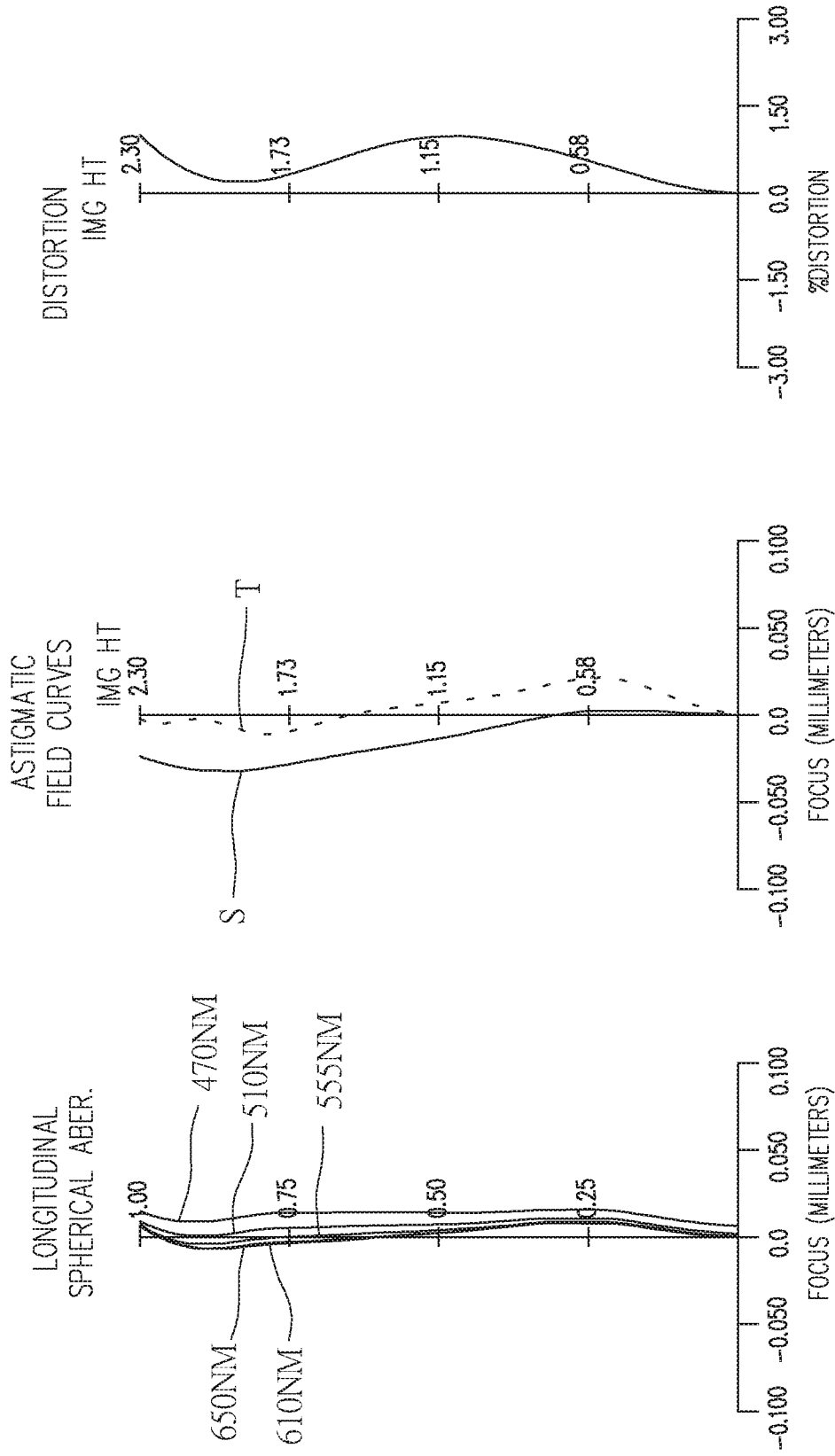
FIG. 5B shows curve diagrams of longitudinal spherical aberration, astigmatic field, and optical distortion of the optical image capturing system in the order from left to right of the fifth embodiment of the present application.
Figure 5C:
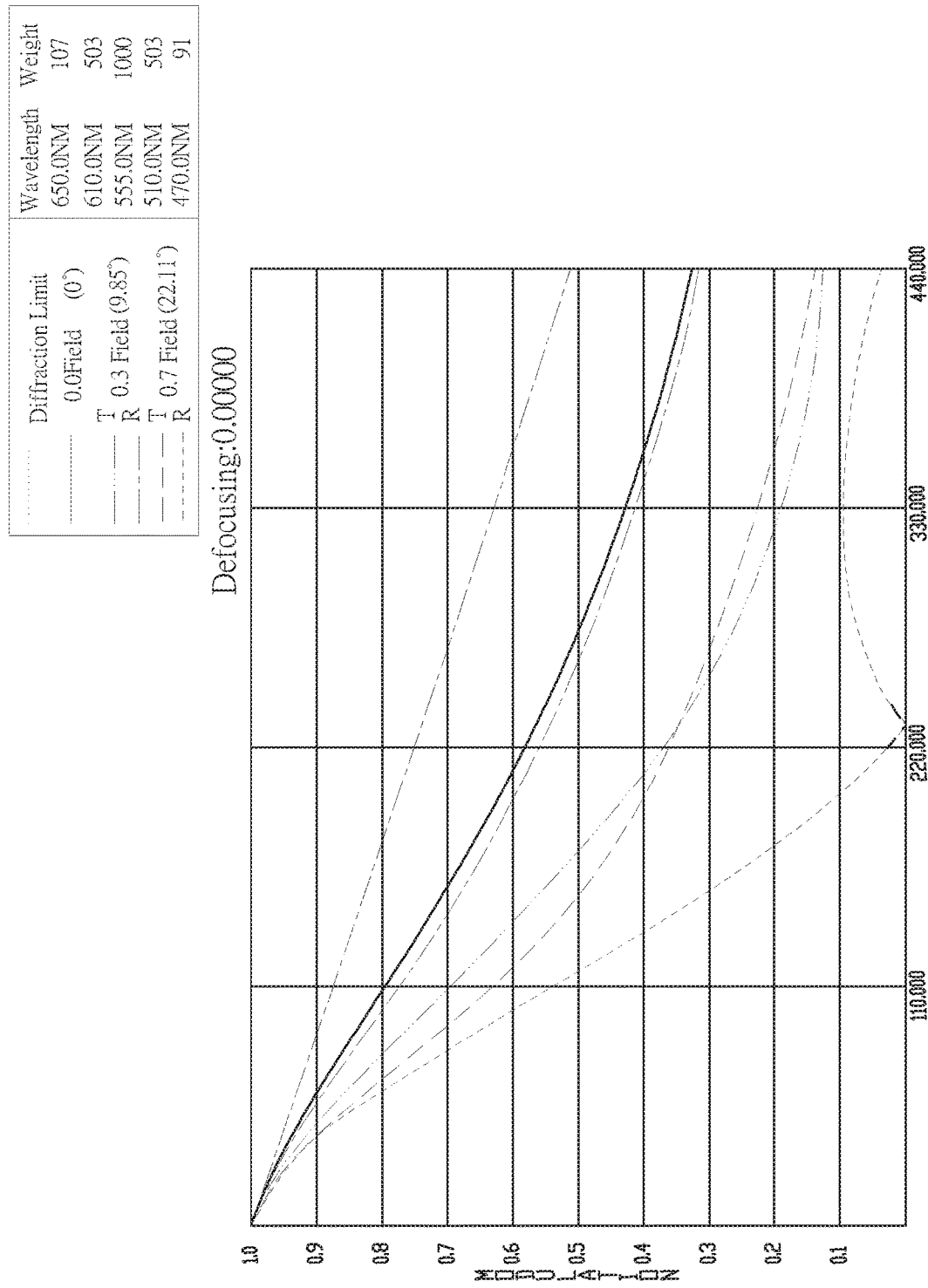
FIG. 5C shows a feature map of modulation transformation of the optical image capturing system of the fifth embodiment of the present application in visible light spectrum.
Figure 5E:
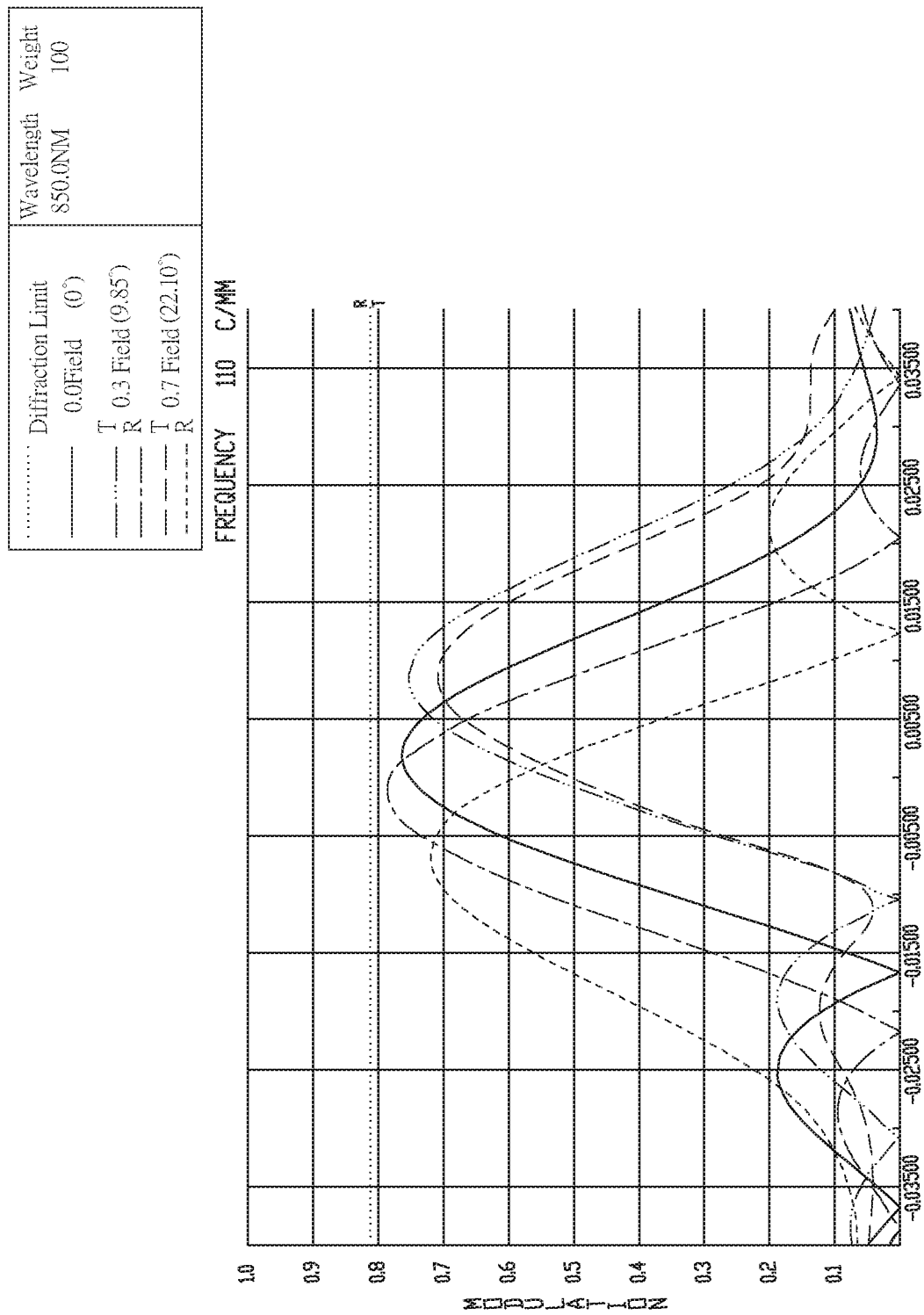
FIG. 5E is a diagram showing the through-focus MTF values of the infrared light spectrum at the central field of view, 0.3 field of view, and 0.7 field of view of the fifth embodiment of the present disclosure.

As shown in FIG. 5A and FIG. 5B, an optical image capturing system of the fifth embodiment of the present invention includes, along an optical axis from an object side to an image side, an aperture 500, a first lens 510, a second lens 520, a third lens 530, a fourth lens 540, a fifth lens 550, a sixth lens 560, a seventh lens 570, an infrared rays filter 580, an image plane 590, and an image sensor 592. FIG. 5C shows a feature map of modulation transformation of the optical image capturing system of the fifth embodiment of the present application in visible light spectrum. FIG. 5D is a diagram showing the through-focus MTF values of the visible light spectrum at the central field of view, 0.3 field of view, and 0.7 field of view of the fifth embodiment of the present invention. FIG. 5E is a diagram showing the through-focus MTF values of the infrared light spectrum at the central field of view, 0.3 field of view, and 0.7 field of view of the fifth embodiment of the present disclosure.

The first lens 510 has positive refractive power and is made of plastic. An object-side surface 512, which faces the object side, is a convex aspheric surface, and an image-side surface 514, which faces the image side, is a concave aspheric surface. The object-side surface 512 and the image-side surface 514 both have an inflection point.

The second lens 520 has negative refractive power and is made of plastic. An object-side surface 522 thereof, which faces the object side, is a convex aspheric surface, and an image-side surface 524 thereof, which faces the image side, is a concave aspheric surface. The object-side surface 522 and the image-side surface 524 both have two inflection points.

The third lens 530 has positive refractive power and is made of plastic. An object-side surface 532, which faces the object side, is a convex aspheric surface, and an image-side surface 534, which faces the image side, is a convex aspheric surface. The object-side surface 532 has two inflection points, and the image-side surface 534 has an inflection point.

The fourth lens 540 has negative refractive power and is made of plastic. An object-side surface 542, which faces the object side, is a concave aspheric surface, and an image-side surface 544, which faces the image side, is a convex aspheric surface. The object-side surface 542 has three inflection points, and the image-side surface 544 has two inflection points.

The fifth lens 550 has positive refractive power and is made of plastic. An object-side surface 552, which faces the object side, is a concave aspheric surface, and an image-side surface 554, which faces the image side, is a convex aspheric surface. The object-side surface 552 and the image-side surface 554 both have an inflection point.

The sixth lens 560 has positive refractive power and is made of plastic. An object-side surface 562, which faces the object side, is a concave aspheric surface, and an image-side surface 564, which faces the image side, is a convex aspheric surface. The object-side surface 562 and the image-side surface 564 both have an inflection point. Whereby, the incident angle of each view field could be adjusted to improve aberration.

The seventh lens 570 has negative refractive power and is made of plastic. An object-side surface 572, which faces the object side, is a convex surface, and an image-side surface 574, which faces the image side, is a concave surface. The object-side surface 572 has three inflection points, and the image-side surface 574 has two inflection points. It may help to shorten the back focal length to keep small in size. In addition, it may reduce an incident angle of the light of an off-axis field of view and correct the aberration of the off-axis field of view.

The infrared rays filter 580 is made of glass and between the fifth lens 550 and the image plane 590. The infrared rays filter 580 gives no contribution to the focal length of the system.

The parameters of the lenses of the fifth embodiment are listed in Table 9 and Table 10.

TABLE 9 f = 3.9446 mm; f/HEP = 1.6; HAF = 29.9982 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 1E+18 | | | | |
| 1 | Aperture | 1E+18 | −0.094 | | | | |
| 2 | $1^{st}$ lens | 2.582337911 | 0.703 | plastic | 1.544 | 56.09 | 7.535 |
| 3 | | 6.271657304 | 0.114 | | | | |
| 4 | $2^{nd}$ lens | 10.73449934 | 0.275 | plastic | 1.544 | 56.09 | −627.872 |
| 5 | | 10.31434797 | 0.133 | | | | |
| 6 | $3^{rd}$ lens | 4.607442758 | 0.452 | plastic | 1.544 | 56.09 | 5.947 |
| 7 | | −10.60731353 | 0.159 | | | | |
| 8 | $4^{th}$ lens | −1.892183995 | 0.471 | plastic | 1.661 | 20.39 | −4.206 |
| 9 | | −6.3969941 | 0.119 | | | | |
| 10 | $5^{th}$ lens | −3.212520771 | 0.441 | plastic | 1.544 | 56.09 | 8.681 |
| 11 | | −2.007328166 | 0.025 | | | | |
| 12 | $6^{th}$ lens | 1.404024374 | 0.673 | plastic | 1.544 | 56.09 | 8.500 |
| 13 | | 1.672385919 | 0.765 | | | | |
| 14 | $7^{th}$ lens | 7.105765275 | 0.236 | plastic | 1.661 | 20.39 | −11.567 |
| 15 | | 3.649355434 | 0.207 | | | | |
| 16 | Infrared rays filter | 1E+18 | 0.175 | BK_7 | 1.517 | 64.2 | |
| 17 | | 1E+18 | 0.750 | | | | |
| 18 | Image plane | 1E+18 | 0.000 | | | | |

Reference wavelength: 555 nm; the position of blocking light: the effective half diameter of the clear aperture of the ninth surface is 1.589 mm.

TABLE 10

Coefficients of the aspheric surfaces

| Surface | 2 | 3 | 4 | 5 | 6 | 7 | 8 |
|---|---|---|---|---|---|---|---|
| k | 1.438752E+00 | −8.975554E+01 | 3.018075E+01 | 4.715501E+01 | −3.141719E+01 | 3.298165E+01 | −1.792474E+00 |
| A4 | −2.435341E−02 | 1.054081E−01 | 1.945984E−01 | 1.779328E−01 | 7.524064E−02 | −1.332504E−01 | −2.165761E−01 |
| A6 | −6.190749E−03 | −3.418445E−01 | −6.136170E−01 | −6.871100E−01 | −3.536879E−01 | 1.196815E−01 | 4.436398E−01 |
| A8 | −2.244164E−02 | 3.396384E−01 | 6.425709E−01 | 7.543361E−01 | 2.942447E−01 | −1.799483E−01 | −5.376709E−01 |
| A10 | 3.389647E−02 | −2.419514E−01 | −4.501046E−01 | −4.907625E−01 | −1.870698E−01 | 1.819762E−01 | 4.624279E−01 |
| A12 | −3.157502E−02 | 1.277772E−01 | 2.445956E−01 | 2.223776E−01 | 1.194351E−01 | −9.980069E−02 | −2.482566E−01 |
| A14 | 1.386552E−02 | −4.239072E−02 | −8.554985E−02 | −6.548002E−02 | −4.984623E−02 | 2.635089E−02 | 7.112411E−02 |
| A16 | −2.722459E−03 | 6.098846E−03 | 1.288300E−02 | 8.635420E−03 | 8.370554E−03 | −2.489022E−03 | −8.185129E−03 |

TABLE 10-continued

| Surface | 9 | 10 | 11 | 12 | 13 | 14 | 15 |
|---|---|---|---|---|---|---|---|
| k | −3.846584E+00 | −1.449854E+01 | −5.324282E+00 | −4.736846E+00 | −4.647770E+00 | −4.897707E+00 | −1.395204E+00 |
| A4 | −2.266551E−01 | −6.321889E−02 | −5.076235E−02 | 6.098674E−02 | 1.094803E−01 | 5.050844E−02 | 4.393170E−02 |
| A6 | 4.953249E−01 | 2.515191E−01 | 8.258974E−02 | −7.898685E−02 | −1.512617E−01 | −1.430509E−01 | −1.488640E−01 |
| A8 | −6.755372E−01 | −4.753578E−01 | −8.197080E−02 | 6.752834E−02 | 1.336133E−01 | 8.279849E−02 | 1.014189E−01 |
| A10 | 5.656146E−01 | 4.545430E−01 | 5.376279E−02 | −3.687991E−02 | −7.265801E−02 | −2.219675E−02 | −3.798973E−02 |
| A12 | −2.682079E−01 | −2.254947E−01 | −2.025166E−02 | 1.080382E−02 | 2.259252E−02 | 3.422342E−03 | 8.558079E−03 |
| A14 | 6.591230E−02 | 5.606943E−02 | 4.118217E−03 | −1.624441E−03 | −3.714494E−03 | −3.334158E−04 | −1.035502E−03 |
| A16 | −6.525531E−03 | −5.525451E−03 | −3.154130E−04 | 1.017652E−04 | 2.486393E−04 | 1.540855E−05 | 4.952013E−05 |

An equation of the aspheric surfaces of the fifth embodiment is the same as that of the first embodiment, and the definitions are the same as well.

The exact parameters of the fifth embodiment based on Table 9 and Table 10 are listed in the following table:

| Fifth embodiment (Reference wavelength: 555 nm) | | | | | |
|---|---|---|---|---|---|
| MTFE0 | MTFE3 | MTFE7 | MTFQ0 | MTFQ3 | MTFQ7 |
| 0.93 | 0.88 | 0.85 | 0.8 | 0.7 | 0.64 |
| ETP1 | ETP2 | ETP3 | ETP4 | ETP5 | ETP6 |
| 0.406 | 0.241 | 0.310 | 0.691 | 0.315 | 0.673 |
| ETP7 | ETL | EBL | EIN | EIR | PIR |
| 0.325 | 5.477 | 1.027 | 4.450 | 0.102 | 0.207 |
| EIN/ETL | SETP/EIN | EIR/PIR | SETP | STP | SETP/STP |
| 0.812 | 0.665 | 0.492 | 2.960 | 3.252 | 0.910 |
| ETP1/TP1 | ETP2/TP2 | ETP3/TP3 | ETP4/TP4 | ETP5/TP5 | ETP6/TP6 |
| 0.577 | 0.875 | 0.686 | 1.466 | 0.714 | 1.000 |
| ETP7/TP7 | BL | EBL/BL | SED | SIN | SED/SIN |
| 1.376 | 1.132 | 0.9072 | 1.489 | 1.316 | 1.132 |
| ED12 | ED23 | ED34 | ED45 | ED56 | ED67 |
| 0.121 | 0.115 | 0.026 | 0.121 | 0.719 | 0.387 |
| ED12/IN12 | ED23/IN23 | ED34/IN34 | ED45/IN45 | ED56/IN56 | ED67/IN67 |
| 1.059 | 0.863 | 0.165 | 1.016 | 28.748 | 0.506 |
| |f/f1| | |f/f2| | |f/f3| | |f/f4| | |f/f5| | |f/f6| |
| 0.5235 | 0.0063 | 0.6633 | 0.9379 | 0.4544 | 0.4641 |
| |f/f7| | ΣPPR | ΣNPR | ΣPPR/|ΣNPR| | IN12/f | IN67/f |
| 0.3410 | 2.5888 | 0.8017 | 3.2291 | 0.0290 | 0.1939 |
| |f1/f2| | |f2/f3| | (TP1 + IN12)/TP2 | | (TP7 + IN67)/TP6 | |
| 0.0120 | 105.5792 | 2.9728 | | 1.4869 | |
| HOS | InTL | HOS/HOI | InS/HOS | ODT % | TDT % |
| 5.7000 | 4.5675 | 2.4783 | 0.9835 | 0.9991 | 0.8158 |
| HVT11 | HVT12 | HVT21 | HVT22 | HVT31 | HVT32 |
| 1.2458 | 0.7563 | 0.7131 | 0.6529 | 0.7050 | 0.0000 |
| HVT61 | HVT62 | HVT71 | HVT72 | HVT72/HOI | HVT72/HOS |
| 1.6645 | 1.7949 | 0.9129 | 1.1438 | 0.4973 | 0.2007 |
| PSTA | PLTA | NSTA | NLTA | SSTA | SLTA |
| −0.003 mm | −0.003 mm | 0.010 mm | −0.003 mm | −0.002 mm | −0.004 mm |
| VSFS0 | VSFS3 | VSFS7 | VTFS0 | VTFS3 | VTFS7 |
| −0.000 mm | −0.003 mm | −0.008 mm | −0.000 mm | 0.005 mm | −0.003 mm |
| VSMTF0 | VSMTF3 | VSMTF7 | VTMTF0 | VTMTF3 | VTMTF7 |
| 0.796 | 0.800 | 0.717 | 0.796 | 0.759 | 0.652 |
| ISFS0 | ISFS3 | ISFS7 | ITFS0 | ITFS3 | ITFS7 |
| 0.003 mm | −0.000 mm | −0.008 mm | 0.003 mm | 0.008 mm | 0.008 mm |
| ISMTF0 | ISMTF3 | ISMTF7 | ITMTF0 | ITMTF3 | ITMTF7 |
| 0.762 | 0.778 | 0.719 | 0.762 | 0.750 | 0.706 |
| FS | AIFS | AVFS | AFS | | TP1 |
| 0.003 mm | 0.002 mm | −0.001 mm | 0.003 mm | | 0.7031 mm |
| IN12 | IN23 | IN34 | IN45 | IN56 | IN67 |
| 0.1144 mm | 0.1331 mm | 0.1589 mm | 0.1194 mm | 0.0250 mm | 0.7650 mm |

The results of the equations of the fifth embodiment based on Table 9 and Table 10 are listed in the following table:

| Values related to the inflection points of the fifth embodiment (Reference wavelength: 555 nm) | | | | | |
|---|---|---|---|---|---|
| HIF111 | 0.9256 | HIF111/HOI | 0.4024 | SGI111 | 0.1546 | |SGI111|/(|SGI111| + TP1) | 0.1803 |
| HIF121 | 0.4892 | HIF121/HOI | 0.2127 | SGI121 | 0.0193 | |SGI121|/(|SGI121| + TP1) | 0.0267 |
| HIF211 | 0.4843 | HIF211/HOI | 0.2106 | SGI211 | 0.0156 | |SGI211|/(|SGI211| + TP2) | 0.0535 |
| HIF212 | 1.3687 | HIF212/HOI | 0.5951 | SGI212 | −0.1205 | |SGI212|/(|SGI212| + TP2) | 0.3047 |

Values related to the inflection points of the fifth embodiment
(Reference wavelength: 555 nm)

| | | | | | | |
|---|---|---|---|---|---|---|
| HIF221 | 0.4420 | HIF221/HOI | 0.1922 | SGI221 | 0.0123 | \|SGI221\|/(\|SGI221\| + TP2) | 0.0429 |
| HIF222 | 1.4304 | HIF222/HOI | 0.6219 | SGI222 | −0.2241 | \|SGI222\|/(\|SGI222\| + TP2) | 0.4491 |
| HIF311 | 0.4548 | HIF311/HOI | 0.1977 | SGI311 | 0.0216 | \|SGI311\|/(\|SGI311\| + TP3) | 0.0455 |
| HIF312 | 1.3745 | HIF312/HOI | 0.5976 | SGI312 | −0.2229 | \|SGI312\|/(\|SGI312\| + TP3) | 0.3301 |
| HIF321 | 1.3807 | HIF321/HOI | 0.6003 | SGI321 | −0.3721 | \|SGI321\|/(\|SGI321\| + TP3) | 0.4513 |
| HIF411 | 0.9607 | HIF411/HOI | 0.4177 | SGI411 | −0.2659 | \|SGI411\|/(\|SGI411\| + TP4) | 0.3607 |
| HIF412 | 1.1094 | HIF412/HOI | 0.4824 | SGI412 | −0.3361 | \|SGI412\|/(\|SGI412\| + TP4) | 0.4163 |
| HIF413 | 1.3131 | HIF413/HOI | 0.5709 | SGI413 | −0.4339 | \|SGI413\|/(\|SGI413\| + TP4) | 0.4793 |
| HIF421 | 0.9548 | HIF421/HOI | 0.4151 | SGI421 | −0.1163 | \|SGI421\|/(\|SGI421\| + TP4) | 0.1979 |
| HIF422 | 1.5505 | HIF422/HOI | 0.6741 | SGI422 | −0.2214 | \|SGI422\|/(\|SGI422\| + TP4) | 0.3196 |
| HIF511 | 0.9584 | HIF511/HOI | 0.4167 | SGI511 | −0.1220 | \|SGI511\|/(\|SGI511\| + TP5) | 0.2167 |
| HIF521 | 1.0346 | HIF521/HOI | 0.4498 | SGI521 | −0.2295 | \|SGI521\|/(\|SGI521\| + TP5) | 0.3424 |
| HIF611 | 1.0904 | HIF611/HOI | 0.4741 | SGI611 | 0.3283 | \|SGI611\|/(\|SGI611\| + TP6) | 0.3278 |
| HIF621 | 1.2199 | HIF621/HOI | 0.5304 | SGI621 | 0.3880 | \|SGI621\|/(\|SGI621\| + TP6) | 0.3657 |
| HIF711 | 0.5855 | HIF711/HOI | 0.2546 | SGI711 | 0.0252 | \|SGI711\|/(\|SGI711\| + TP7) | 0.0965 |
| HIF712 | 1.3213 | HIF712/HOI | 0.5745 | SGI712 | 0.0027 | \|SGI712\|/(\|SGI712\| + TP7) | 0.0111 |
| HIF713 | 1.7635 | HIF713/HOI | 0.7667 | SGI713 | −0.0263 | \|SGI713\|/(\|SGI713\| + TP7) | 0.1004 |
| HIF721 | 0.6696 | HIF721/HOI | 0.2911 | SGI721 | 0.0601 | \|SGI721\|/(\|SGI721\| + TP7) | 0.2031 |
| HIF722 | 1.4859 | HIF722/HOI | 0.6460 | SGI722 | 0.0810 | \|SGI722\|/(\|SGI722\| + TP7) | 0.2556 |

Sixth Embodiment

Figure 6A:
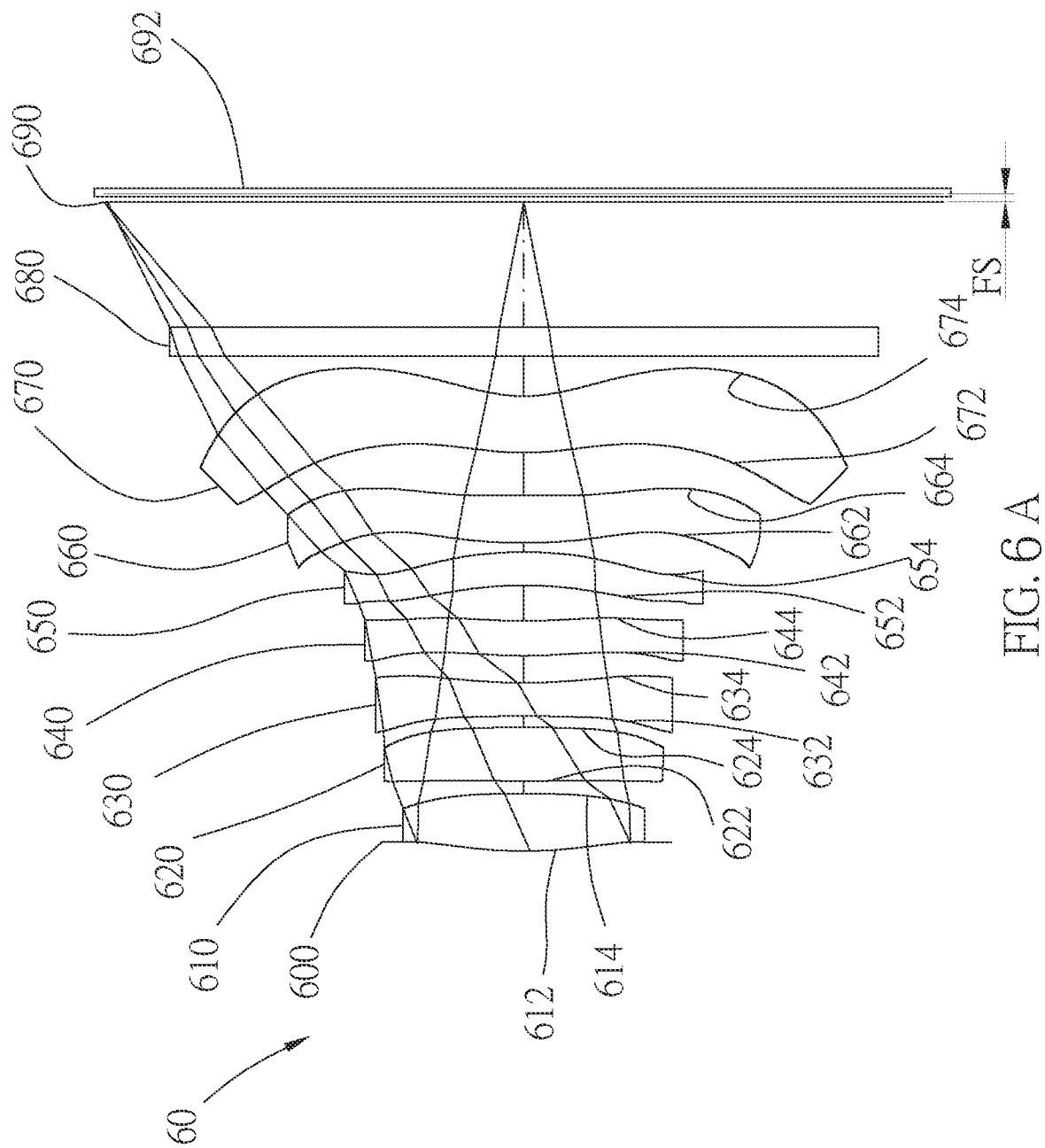
FIG. 6A is a schematic diagram of a sixth embodiment of the present invention.
Figure 6B:
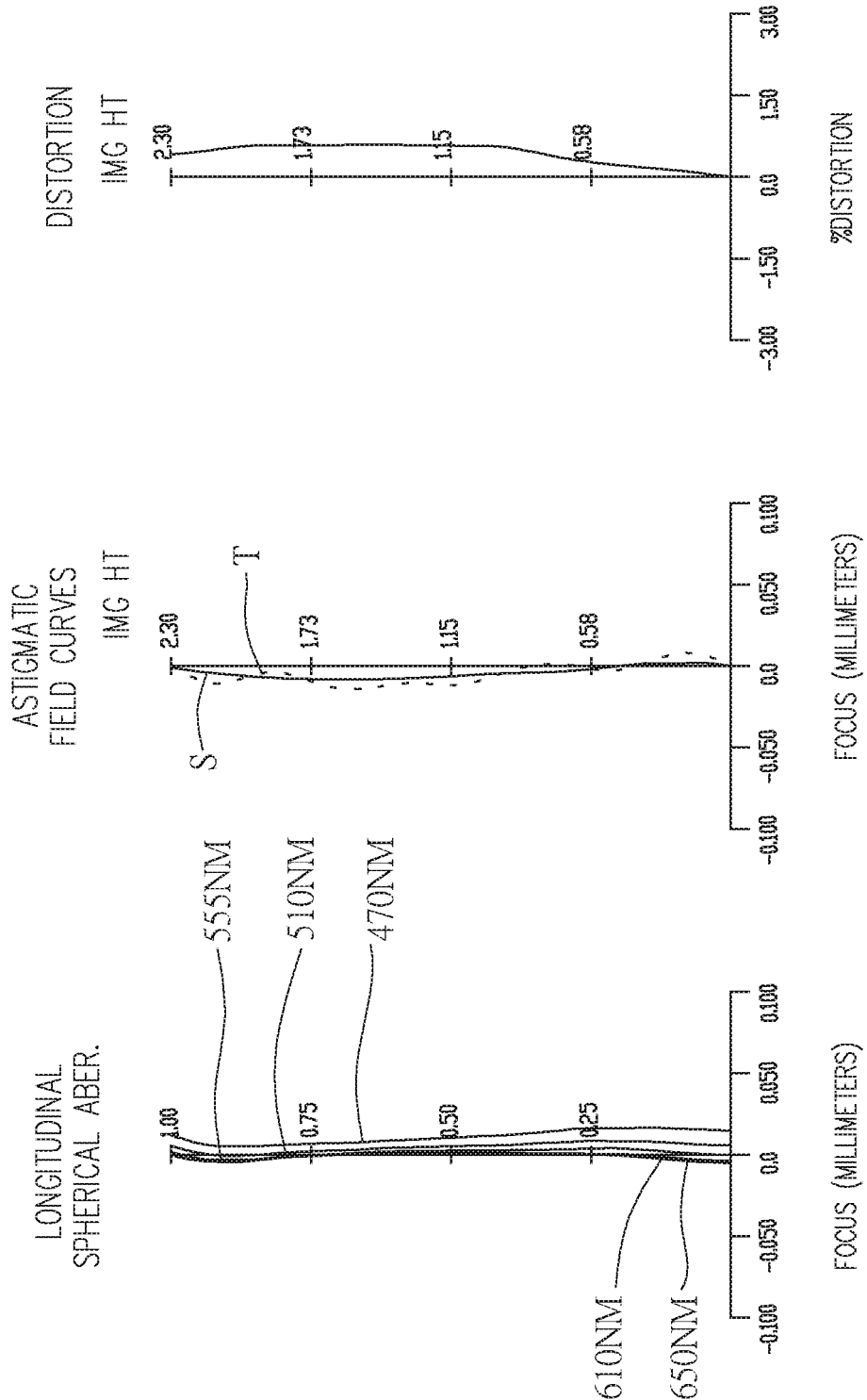
FIG. 6B shows curve diagrams of longitudinal spherical aberration, astigmatic field, and optical distortion of the optical image capturing system in the order from left to right of the sixth embodiment of the present application.
Figure 6C:
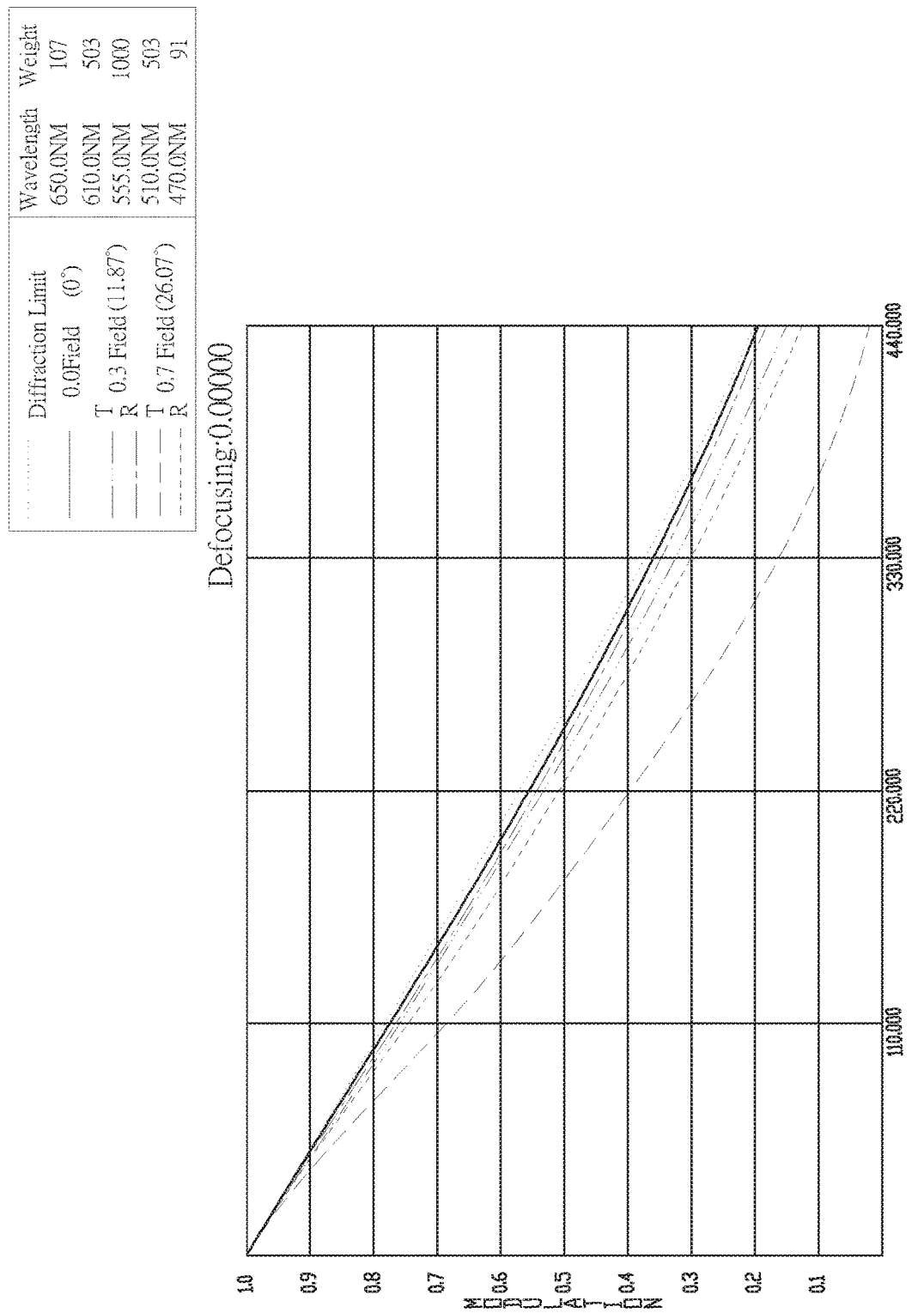
FIG. 6C shows a feature map of modulation transformation of the optical image capturing system of the sixth embodiment of the present application in visible light spectrum.
Figure 6D:
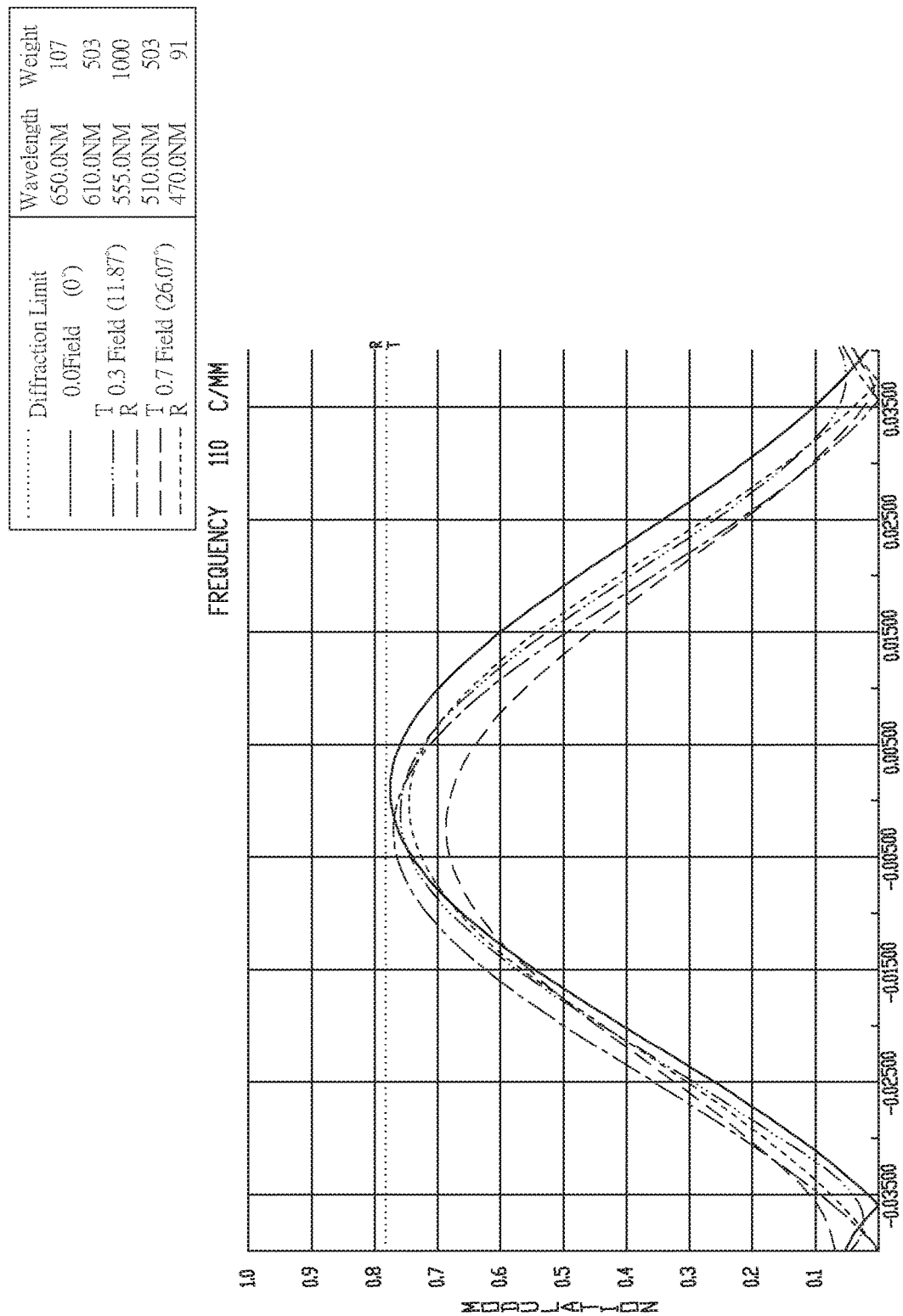
FIG. 6D is a diagram showing the through-focus MTF values of the visible light spectrum at the central field of view, 0.3 field of view, and 0.7 field of view of the sixth embodiment of the present invention.
Figure 6:
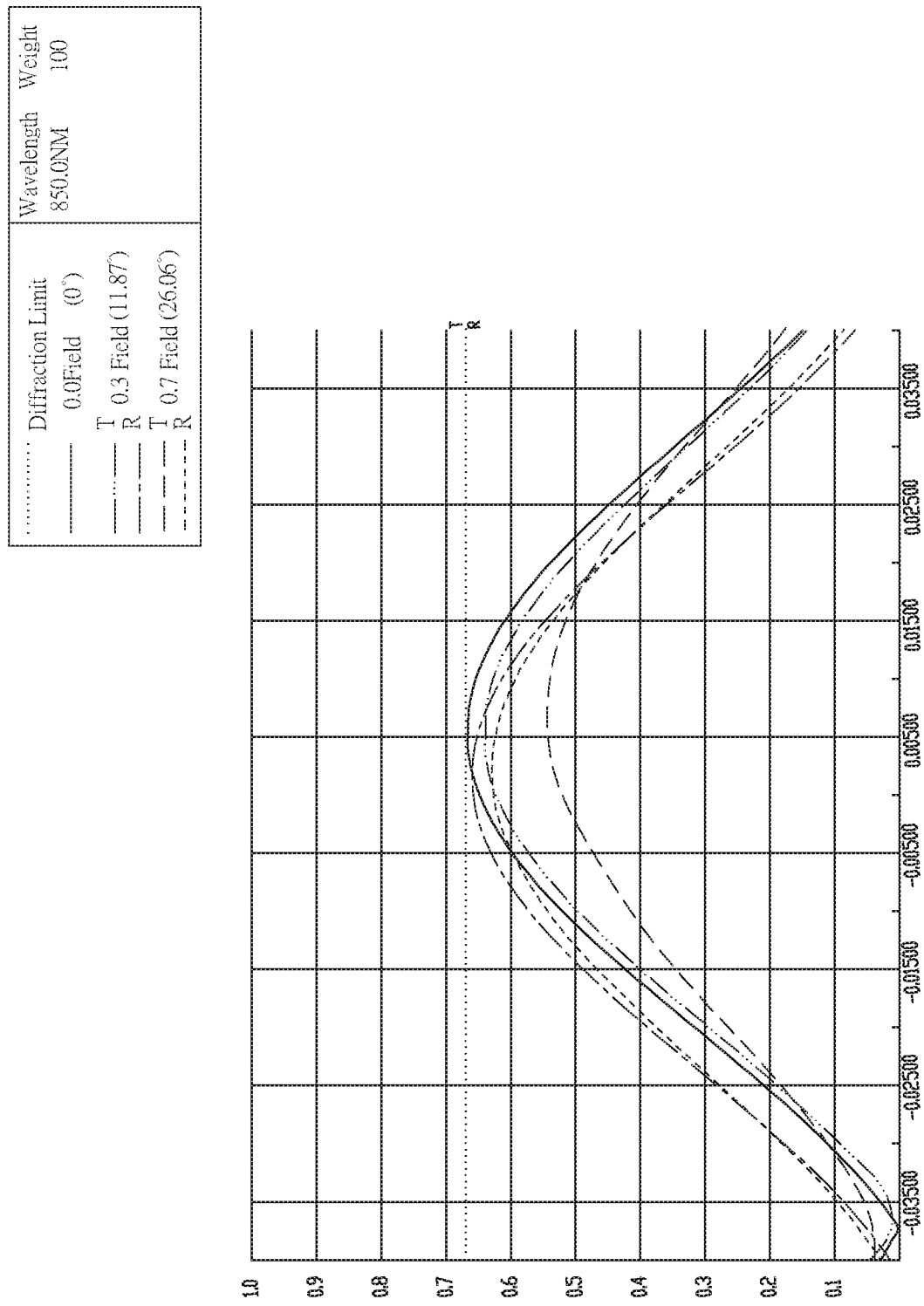
FIG. 6E is a diagram showing the through-focus MTF values of the infrared light spectrum at the central field of view, 0.3 field of view, and 0.7 field of view of the sixth embodiment of the present disclosure.

As shown in FIG. 6A and FIG. 6B, an optical image capturing system of the sixth embodiment of the present invention includes, along an optical axis from an object side to an image side, an aperture 600, a first lens 610, a second lens 620, a third lens 630, a fourth lens 640, a fifth lens 650, a sixth lens 660, a seventh lens 670, an infrared rays filter 680, an image plane 690, and an image sensor 692. FIG. 6C shows a feature map of modulation transformation of the optical image capturing system of the sixth embodiment of the present application in visible light spectrum. FIG. 6D is a diagram showing the through-focus MTF values of the visible light spectrum at the central field of view, 0.3 field of view, and 0.7 field of view of the sixth embodiment of the present invention. FIG. 6E is a diagram showing the through-focus MTF values of the infrared light spectrum at the central field of view, 0.3 field of view, and 0.7 field of view of the sixth embodiment of the present disclosure.

The first lens 610 has positive refractive power and is made of plastic. An object-side surface 612, which faces the object side, is a convex aspheric surface, and an image-side surface 614, which faces the image side, is a convex aspheric surface. The object-side surface 612 has an inflection point.

The second lens 620 has positive refractive power and is made of plastic. An object-side surface 622 thereof, which faces the object side, is a convex aspheric surface, and an image-side surface 624 thereof, which faces the image side, is a convex aspheric surface. The object-side surface 622 has four inflection points.

The third lens 630 has negative refractive power and is made of plastic. An object-side surface 632, which faces the object side, is a concave aspheric surface, and an image-side surface 634, which faces the image side, is a concave aspheric surface. The object-side surface 632 has an inflection point.

The fourth lens 640 has positive refractive power and is made of plastic. An object-side surface 642, which faces the object side, is a convex aspheric surface, and an image-side surface 644, which faces the image side, is a concave aspheric surface. The object-side surface 642 has an inflection point, and the image-side surface 644 has two inflection points.

The fifth lens 650 has negative refractive power and is made of plastic. An object-side surface 652, which faces the object side, is a concave aspheric surface, and an image-side surface 654, which faces the image side, is a convex aspheric surface. The object-side surface 652 and the image-side surface 654 both have two inflection points.

The sixth lens 660 has positive refractive power and is made of plastic. An object-side surface 662, which faces the object side, is a convex surface, and an image-side surface 664, which faces the image side, is a convex surface. The object-side surface 662 and the image-side surface 664 both have two inflection points. Whereby, the incident angle of each view field could be adjusted to improve aberration.

The seventh lens 670 has negative refractive power and is made of plastic. An object-side surface 672, which faces the object side, is a convex surface, and an image-side surface 674, which faces the image side, is a concave surface. The object-side surface 672 has two inflection points, and the image-side surface 674 has an inflection point. It may help to shorten the back focal length to keep small in size. In addition, it may reduce an incident angle of the light of an off-axis field of view and correct the aberration of the off-axis field of view.

The infrared rays filter 680 is made of glass and between the fifth lens 650 and the image plane 690. The infrared rays filter 680 gives no contribution to the focal length of the system.

The parameters of the lenses of the sixth embodiment are listed in Table 11 and Table 12.

TABLE 11

| | | f = 3.2715 mm; f/HEP = 2.8; HAF = 34.9964 deg | | | | |
|---|---|---|---|---|---|---|
| Surface | | Radius of curvature (mm) | Thickness (mm) | Material | Refractive Index | Abbe number | Focal length (mm) |
| 0 | Object | 1E+18 | 1E+18 | | | | |
| 1 | Aperture | 1E+18 | −0.049 | | | | |
| 2 | 1st lens | 2.123628672 | 0.345 | plastic | 1.544 | 56.09 | 3.310 |
| 3 | | −11.41489114 | 0.075 | | | | |
| 4 | 2nd lens | 5.216279969 | 0.323 | plastic | 1.544 | 56.09 | 5.756 |
| 5 | | −7.729115831 | 0.069 | | | | |
| 6 | 3rd lens | −4.540597489 | 0.200 | plastic | 1.661 | 20.39 | −3.133 |
| 7 | | 3.937524834 | 0.162 | | | | |
| 8 | 4th lens | 2.311555686 | 0.209 | plastic | 1.544 | 56.09 | 65.305 |
| 9 | | 2.393008907 | 0.213 | | | | |
| 10 | 5th lens | −2.363989366 | 0.200 | plastic | 1.661 | 20.39 | −63.397 |
| 11 | | −2.588767702 | 0.056 | | | | |
| 12 | 6th lens | 2.868569873 | 0.286 | plastic | 1.544 | 56.09 | 3.936 |
| 13 | | −8.254419277 | 0.255 | | | | |
| 14 | 7th lens | 1.348646849 | 0.339 | plastic | 1.544 | 56.09 | −3.979 |
| 15 | | 0.758063345 | 0.242 | | | | |
| 16 | Infrared rays filter | 1E+18 | 0.175 | BK_7 | 1.517 | 64.2 | |
| 17 | | 1E+18 | 0.750 | | | | |
| 18 | Image plane | 1E+18 | 0.000 | | | | |

Reference wavelength: 555 nm; the position of blocking light: none.

TABLE 12

| | Coefficients of the aspheric surfaces | | | | | | |
|---|---|---|---|---|---|---|---|
| Surface | 2 | 3 | 4 | 5 | 6 | 7 | 8 |
| k | −5.872399E+01 | −8.917421E+01 | 4.601835E+01 | 2.730664E+01 | −2.290025E+01 | −6.412630E+01 | −6.168611E+01 |
| A4 | 5.821566E−01 | −6.800140E−01 | −7.149636E−01 | 1.839184E−01 | 7.687307E−01 | 4.872486E−01 | −2.876545E−01 |
| A6 | −4.078975E+00 | 1.191890E+00 | 1.098030E+00 | −3.509455E+00 | −5.696446E+00 | −2.427052E+00 | −1.828526E−01 |
| A8 | 1.899444E+01 | −1.028767E+00 | 2.850328E+00 | 1.590269E+01 | 1.900213E+01 | 5.967175E+00 | 2.706357E+00 |
| A10 | −6.941363E+01 | 1.169079E+00 | −1.156362E+01 | −3.783590E+01 | −3.899180E+01 | −1.216661E+01 | −8.757225E+00 |
| A12 | 1.645705E+02 | −1.118908E+01 | 6.481895E+00 | 4.016787E+01 | 4.048924E+01 | 1.699985E+01 | 1.176148E+01 |
| A14 | −2.239231E+02 | 2.664056E+00 | 1.512276E+01 | −9.906497E+00 | −9.658520E+00 | −1.285355E+01 | −6.629334E+00 |
| A16 | 1.316983E+02 | −1.891422E+01 | −1.709533E+01 | −6.472041E+00 | −7.727829E+00 | 4.050280E+00 | 1.399168E+00 |
| Surface | 9 | 10 | 11 | 12 | 13 | 14 | 15 |
| k | −8.912061E+01 | 1.416191E+00 | −2.642802E+01 | −2.230855E+01 | −4.631578E+01 | −1.625349E+01 | −5.377114E+00 |
| A4 | −3.228397E−01 | −7.813425E−01 | −1.161453E+00 | 3.089152E−01 | 8.857705E−01 | −2.689953E−01 | −3.136405E−01 |
| A6 | 1.900364E−01 | 7.018929E+00 | 6.135124E+00 | −6.797602E−01 | −2.223669E+00 | −1.894268E−01 | 2.322462E−01 |
| A8 | 1.666561E−01 | −2.890215E+01 | −1.990012E+01 | −9.922245E−01 | 2.786765E+00 | 7.374765E−01 | −1.171006E−01 |
| A10 | −1.227527E−01 | 6.899266E+01 | 3.832451E+01 | 3.614197E+00 | −2.119847E+00 | −7.650810E−01 | 3.610750E−02 |
| A12 | 1.706656E+00 | −9.271901E+01 | −4.044259E+01 | −4.028400E+00 | 9.612066E−01 | 3.831749E−01 | −7.479467E−03 |
| A14 | −4.020174E+00 | 6.576087E+01 | 2.172594E+01 | 2.073208E+00 | −2.381594E−01 | −9.500648E−02 | 1.038500E−03 |
| A16 | 2.472513E+00 | −1.946289E+01 | −4.672204E+00 | −4.157157E−01 | 2.461790E−02 | 9.404501E−03 | −8.529039E−05 |

An equation of the aspheric surfaces of the sixth embodiment is the same as that of the first embodiment, and the definitions are the same as well.

The exact parameters of the sixth embodiment based on Table 11 and Table 12 are listed in the following table:

| Sixth embodiment (Reference wavelength: 555 nm) | | | | | |
|---|---|---|---|---|---|
| MTFE0 | MTFE3 | MTFE7 | MTFQ0 | MTFQ3 | MTFQ7 |
| 0.89 | 0.88 | 0.85 | 0.78 | 0.76 | 0.68 |
| ETP1 | ETP2 | ETP3 | ETP4 | ETP5 | ETP6 |
| 0.230 | 0.279 | 0.277 | 0.205 | 0.185 | 0.254 |
| ETP7 | ETL | EBL | EIN | EIR | PIR |
| 0.413 | 3.846 | 1.040 | 2.806 | 0.115 | 0.242 |
| EIN/ETL | SETP/EIN | EIR/PIR | SETP | STP | SETP/STP |
| 0.729 | 0.656 | 0.477 | 1.842 | 1.902 | 0.968 |

-continued

| Sixth embodiment (Reference wavelength: 555 nm) | | | | | |
|---|---|---|---|---|---|
| ETP1/TP1 | ETP2/TP2 | ETP3/TP3 | ETP4/TP4 | ETP5/TP5 | ETP6/TP6 |
| 0.666 | 0.863 | 1.383 | 0.984 | 0.925 | 0.886 |
| ETP7/TP7 | BL | EBL/BL | SED | SIN | SED/SIN |
| 1.216 | 1.167 | 0.8912 | 0.964 | 0.830 | 1.161 |
| ED12 | ED23 | ED34 | ED45 | ED56 | ED67 |
| 0.137 | 0.076 | 0.139 | 0.125 | 0.203 | 0.284 |
| ED12/IN12 | ED23/IN23 | ED34/IN34 | ED45/IN45 | ED56/IN56 | ED67/IN67 |
| 1.826 | 1.096 | 0.858 | 0.588 | 3.606 | 1.113 |
| \|f/f1\| | \|f/f2\| | f/f3\| | \|f/f4\| | \|f/f5\| | \|f/f6\| |
| 0.9884 | 0.5684 | 1.0442 | 0.0501 | 0.0516 | 0.8313 |
| \|f/f7\| | ΣPPR | ΣNPR | ΣPPR/\|ΣNPR\| | IN12/f | IN67/f |
| 0.8222 | 2.9656 | 1.3906 | 2.1326 | 0.0229 | 0.0781 |
| \|f1/f2\| | \|f2/f3\| | (TP1 + IN12)/TP2 | | (TP7 + IN67)/TP6 | |
| 0.5750 | 1.8373 | 1.3003 | | 2.0800 | |
| HOS | InTL | HOS/HOI | InS/HOS | ODT % | TDT % |
| 3.9001 | 2.7329 | 1.6957 | 0.9876 | 0.6026 | 0.1851 |
| HVT11 | HVT12 | HVT21 | HVT22 | HVT31 | HVT32 |
| 0.0000 | 0.0000 | 0.3206 | 0.0000 | 0.0000 | 0.6358 |
| HVT61 | HVT62 | HVT71 | HVT72 | HVT72/HOI | HVT72/HOS |
| 0.6991 | 0.0000 | 0.6055 | 0.9235 | 0.4015 | 0.2368 |
| PSTA | PLTA | NSTA | NLTA | SSTA | SLTA |
| −0.001 mm | −0.005 mm | 0.002 mm | 0.001 mm | 0.004 mm | 0.001 mm |
| VSFS0 | VSFS3 | VSFS7 | VTFS0 | VTFS3 | VTFS7 |
| −0.000 mm | −0.003 mm | −0.000 mm | −0.000 mm | −0.000 mm | −0.003 mm |
| VSMTF0 | VSMTF3 | VSMTF7 | VTMTF0 | VTMTF3 | VTMTF7 |
| 0.775 | 0.771 | 0.746 | 0.775 | 0.758 | 0.687 |
| ISFS0 | ISFS3 | ISFS7 | ITFS0 | ITFS3 | ITFS7 |
| 0.005 mm | 0.003 mm | 0.003 mm | 0.005 mm | 0.005 mm | 0.008 mm |
| ISMTF0 | ISMTF3 | ISMTF7 | ITMTF0 | ITMTF3 | ITMTF7 |
| 0.668 | 0.660 | 0.630 | 0.668 | 0.641 | 0.545 |
| FS | AIFS | AVFS | AFS | | TP1 |
| 0.005 mm | 0.005 mm | −0.001 mm | 0.005 mm | | 0.3451 mm |
| IN12 | IN23 | IN34 | IN45 | IN56 | IN67 |
| 0.0750 mm | 0.0692 mm | 0.1615 mm | 0.2130 mm | 0.0562 mm | 0.2555 mm |

The results of the equations of the sixth embodiment based on Table 11 and Table 12 are listed in the following table:

| Values related to the inflection points of the sixth embodiment (Reference wavelength: 555 nm) | | | | | | |
|---|---|---|---|---|---|---|
| HIF111 | 0.4045 | HIF111/HOI | 0.1759 | SGI111 | 0.0336 | \|SGI111\|/(\|SGI111\| + TP1) | 0.0888 |
| HIF211 | 0.1648 | HIF211/HOI | 0.0717 | SGI211 | 0.0021 | \|SGI211\|/(\|SGI211\| + TP2) | 0.0066 |
| HIF212 | 0.4618 | HIF212/HOI | 0.2008 | SGI212 | 0.0025 | \|SGI212\|/(\|SGI212\| + TP2) | 0.0078 |
| HIF213 | 0.5673 | HIF213/HOI | 0.2467 | SGI213 | 0.0009 | \|SGI213\|/(\|SGI213\| + TP2) | 0.0027 |
| HIF214 | 0.6943 | HIF214/HOI | 0.3019 | SGI214 | −0.0017 | \|SGI214\|/(\|SGI214\| + TP2) | 0.0051 |
| HIF311 | 0.6881 | HIF311/HOI | 0.2992 | SGI311 | −0.0669 | \|SGI311\|/(\|SGI311\| + TP3) | 0.2505 |
| HIF321 | 0.4118 | HIF321/HOI | 0.1791 | SGI321 | 0.0245 | \|SGI321\|/(\|SGI321\| + TP3) | 0.1091 |
| HIF322 | 0.7663 | HIF322/HOI | 0.3332 | SGI322 | 0.0339 | \|SGI322\|/(\|SGI322\| + TP3) | 0.1448 |
| HIF411 | 0.2430 | HIF411/HOI | 0.1057 | SGI411 | 0.0101 | \|SGI411\|/(\|SGI411\| + TP4) | 0.0463 |
| HIF412 | 0.7636 | HIF412/HOI | 0.3320 | SGI412 | −0.0154 | \|SGI412\|/(\|SGI412\| + TP4) | 0.0686 |
| HIF421 | 0.2233 | HIF421/HOI | 0.0971 | SGI421 | 0.0082 | \|SGI421\|/(\|SGI421\| + TP4) | 0.0377 |
| HIF422 | 0.6372 | HIF422/HOI | 0.2771 | SGI422 | 0.0108 | \|SGI422\|/(\|SGI422\| + TP4) | 0.0491 |
| HIF511 | 0.5101 | HIF511/HOI | 0.2218 | SGI511 | −0.0600 | \|SGI511\|/(\|SGI511\| + TP5) | 0.2307 |
| HIF512 | 0.7975 | HIF512/HOI | 0.3467 | SGI512 | −0.0945 | \|SGI512\|/(\|SGI512\| + TP5) | 0.3210 |
| HIF521 | 0.5855 | HIF521/HOI | 0.2545 | SGI521 | −0.0898 | \|SGI521\|/(\|SGI521\| + TP5) | 0.3098 |
| HIF522 | 0.9414 | HIF522/HOI | 0.4093 | SGI522 | −0.1203 | \|SGI522\|/(\|SGI522\| + TP5) | 0.3757 |
| HIF611 | 0.4565 | HIF611/HOI | 0.1985 | SGI611 | 0.0389 | \|SGI611\|/(\|SGI611\| + TP6) | 0.1198 |
| HIF621 | 0.1102 | HIF621/HOI | 0.0479 | SGI621 | −0.0006 | \|SGI621\|/(\|SGI621\| + TP6) | 0.0021 |
| HIF622 | 0.5586 | HIF622/HOI | 0.2429 | SGI622 | 0.0216 | \|SGI622\|/(\|SGI622\| + TP6) | 0.0703 |
| HIF711 | 0.3024 | HIF711/HOI | 0.1315 | SGI711 | 0.0268 | \|SGI711\|/(\|SGI711\| + TP7) | 0.0731 |
| HIF712 | 1.3850 | HIF712/HOI | 0.6022 | SGI712 | −0.2011 | \|SGI712\|/(\|SGI712\| + TP7) | 0.3720 |
| HIF721 | 0.3850 | HIF721/HOI | 0.1674 | SGI721 | 0.0733 | \|SGI721\|/(\|SGI721\| + TP7) | 0.1776 |

It must be pointed out that the embodiments described above are only some embodiments of the present invention. All equivalent structures which employ the concepts disclosed in this specification and the appended claims should fall within the scope of the present invention.

What is claimed is:

1. An optical image capturing system, in order along an optical axis from an object side to an image side, comprising:
   an aperture;
   a first lens having positive refractive power;
   a second lens having refractive power;
   a third lens having refractive power;
   a fourth lens having refractive power;
   a fifth lens having refractive power;
   a sixth lens having positive refractive power;
   a seventh lens having negative refractive power;
   a first image plane, which is an image plane specifically for a visible light spectrum, and the first image plane is located at the optical axis; a through-focus modulation transfer rate (value of MTF) at a first spatial frequency has a maximum value at the first image plane; and
   a second image plane, which is an image plane specifically for an infrared light spectrum, and second image plane is located at the optical axis; a through-focus modulation transfer rate (value of MTF) at a first spatial frequency has a maximum value at the second image plane;
   wherein the optical image capturing system consists of the seven lenses with refractive power; at least one lens among the second to the fifth lenses has positive refractive power; each lens among the first lens to the seventh lens has an object-side surface, which faces the object side, and an image-side surface, which faces the image side;
   wherein the optical image capturing system satisfies:

$1.6 \leq f/HEP \leq 2.8$;

$14.9 \text{ deg} < HAF \leq 35.0 \text{ deg}$;

$0.5 \leq SETP/STP < 1$; and $3 \text{ }\mu m \leq |FS| \leq 15 \text{ }\mu m$;

wherein f is a focal length of the optical image capturing system; HEP is an entrance pupil diameter of the optical image capturing system; HAF is a half of a maximum view angle of the optical image capturing system; ETP1, ETP2, ETP3, ETP4, ETP5, EFP6, and ETP7 are respectively a thickness at the height of ½ HEP of the first lens, the second lens, the third lens, the fourth lens, the fifth lens, the sixth lens, and the seventh lens; SETP is a sum of the aforementioned ETP1 to ETP7; TP1, TP2, TP3, TP4, TP5, TP5, and TP7 are respectively a thickness of the first lens, the second lens, the third lens, the fourth lens, the fifth lens, the sixth lens, and the seventh lens on the optical axis; STP is a sum of the aforementioned TP1 to TP7; FS is a distance on the optical axis between the first image plane and the second image plane,
   wherein the optical image capturing system further satisfies TP1 is greater than anyone of TP2, TP3, TP4, TP5, TP6, and TP7, and
   wherein TP1, TP2, TP3, TP4, TP5, TP6, and TP7 are respectively a central thickness on the optical axis of the first lens to the seventh lens.

2. The optical image capturing system of claim 1, wherein a wavelength of the infrared light ranges from 700 nm to 1300 nm, and the first spatial frequency is denoted by SP1, which satisfies the following condition: $SP1 \leq 440$ cycles/mm.

3. The optical image capturing system of claim 1, wherein IN23 is a distance on the optical axis between the second lens and the third lens, IN34 is a distance on the optical axis between the third lens and the fourth lens, and IN67 is a distance on the optical axis between the sixth lens and the seventh lens; the optical image capturing system further satisfies:

$IN67 > IN23$; and $IN67 > IN34$.

4. The optical image capturing system of claim 1, wherein IN23 is a distance on the optical axis between the second lens and the third lens, IN34 is a distance on the optical axis between the third lens and the fourth lens, and IN56 is a distance on the optical axis between the fifth lens and the sixth lens; the optical image capturing system further satisfies:

$IN56 > IN23$; and $IN56 > IN34$.

5. The optical image capturing system of claim 1, wherein IN23 is a distance on the optical axis between the second lens and the third lens, IN34 is a distance on the optical axis between the third lens and the fourth lens, and IN45 is a distance on the optical axis between the fourth lens and the fifth lens; the optical image capturing system further satisfies:

$IN45 > IN23$; and $IN45 > IN34$.

6. The optical image capturing system of claim 1, wherein the optical image capturing system further satisfies:

$HOS/f \leq 1.5$;

wherein HOS is a distance between the object-side surface of the first lens and the first image plane on the optical axis.

7. The optical image capturing system of claim 1, wherein the optical image capturing system further satisfies:

$0.2 \leq EIN/ETL < 1$;

where ETL is a distance in parallel with the optical axis between a coordinate point at a height of ½ HEP on the object-side surface of the first lens and the first image plane; EIN is a distance in parallel with the optical axis between the coordinate point at the height of ½ HEP on the object-side surface of the first lens and a coordinate point at a height of ½ HEP on the image-side surface of the seventh lens.

8. The optical image capturing system of claim 1, wherein the optical image capturing system further satisfies:

$0.1 \leq EBL/BL \leq 1.5$;

where EBL is a horizontal distance in parallel with the optical axis between a coordinate point at the height of ½ HEP on the image-side surface of the seventh lens and the first image plane; BL is a horizontal distance in parallel with the optical axis between the point on the image-side surface of the seventh lens where the optical axis passes through and the first image plane.

9. The optical image capturing system of claim 1, wherein the optical image capturing system further satisfies:

$0.2 \leq InS/HOS \leq 1.1;$ where InS is a distance between the aperture and the first image plane on the optical axis; HOS is a distance between the object-side surface of the first lens and the first image plane on the optical axis.

10. An optical image capturing system, in order along an optical axis from an object side to an image side, comprising:
- an aperture;
- a first lens having positive refractive power;
- a second lens having refractive power;
- a third lens having refractive power;
- a fourth lens having refractive power;
- a fifth lens having refractive power;
- a sixth lens having positive refractive power;
- a seventh lens having negative refractive power;
- a first image plane, which is an image plane specifically for a visible light spectrum, and the first image plane is located at the optical axis; a through-focus modulation transfer rate (value of MTF) at a first spatial frequency has a maximum value in a central portion of a field of view at the first image plane; and
- a second image plane, which is an image plane specifically for an infrared light spectrum, and the second image plane is located at the optical axis; a through-focus modulation transfer rate (value of MTF) at a first spatial frequency has a maximum value in a central portion of a field of view at the second image plane;
- wherein the optical image capturing system consists of the seven lenses with refractive power; at least one lens among the first lens to the seventh lens is made of plastic; at least one lens among the second lens to the fifth lens has positive refractive power; each lens among the first lens to the seventh lens has an object-side surface, which faces the object side, and an image-side surface, which faces the image side;
- wherein the optical image capturing system satisfies:

$1.6 \leq f/HEP \leq 2.8;$ $14.9 \text{ deg} < HAF \leq 35.0 \text{ deg};$ $3 \text{ } \mu m \leq |FS| \leq 10 \text{ } \mu m;$ and $0.729 \leq EIN/ETL < 0.833;$ wherein f is a focal length of the optical image capturing system; HEP is an entrance pupil diameter of the optical image capturing system; HAF is a half of a maximum view angle of the optical image capturing system; FS is a distance on the optical axis between the first image plane and the second image plane; ETL is a distance in parallel with the optical axis between a coordinate point at a height of ½ HEP on the object-side surface of the first lens and the first image plane; EIN is a distance in parallel with the optical axis between the coordinate point at the height of ½ HEP on the object-side surface of the first lens and a coordinate point at a height of ½ HEP on the image-side surface of the seventh lens, wherein the optical image capturing system further satisfies: TP1 is greater than anyone of TP2, TP3, TP4, TP5, TP6, and TP7, and wherein TP1, TP2, TP3, TP4, TP5, TP6, and TP7 are respectively a central thickness on the optical axis of the first lens to the seventh lens.

11. The optical image capturing system of claim 10, wherein the optical image capturing system further satisfies:

$MTFQ0 \geq 0.2;$ $MTFQ3 \geq 0.01;$ and $MTFQ7 \geq 0.01;$ where HOI is a maximum height for image formation perpendicular to the optical axis on the image plane; MTFQ0, MTFQ3, and MTFQ7 are respectively values of modulation transfer function in a spatial frequency of 110 cycles/mm at the optical axis, 0.3 HOI, and 0.7 HOI on an image plane.

12. The optical image capturing system of claim 10, wherein each two neighboring lenses among the first to the seventh lenses are separated by air.

13. The optical image capturing system of claim 10, wherein the image-side surface of the first lens is convex on the optical axis.

14. The optical image capturing system of claim 10, wherein the object-side surface of the sixth lens is convex on the optical axis.

15. The optical image capturing system of claim 10, wherein the optical image capturing system further satisfies:

$HOS/HOI \leq 5;$ wherein HOI is a maximum height for image formation perpendicular to the optical axis on the first image plane; HOS is a distance between the object-side surface of the first lens and the first image plane on the optical axis.

16. The optical image capturing system of claim 10, wherein at least one surface of each of at least three lenses among the first lens to the seventh lens has at least an inflection point thereon.

17. The optical image capturing system of claim 10, wherein at least one lens among the first lens to the seventh lens is a light filter, which is capable of filtering out light of wavelengths shorter than 500 nm.

18. The optical image capturing system of claim 10, wherein IN67 is a distance on the optical axis between the sixth lens and the seventh lens; TP6 and TP7 are respectively a central thickness on the optical axis of the sixth lens and the seventh lens; the optical image capturing system further satisfies:

$0.1 \leq (TP7+IN67)/TP6 \leq 50.$

19. An optical image capturing system, in order along an optical axis from an object side to an image side, comprising:
- an aperture;
- a first lens having positive refractive power;
- a second lens having refractive power;
- a third lens having refractive power;
- a fourth lens having refractive power;
- a fifth lens having refractive power;
- a sixth lens having positive refractive power;
- a seventh lens having negative refractive power;
- a first average image plane, which is an image plane specifically for visible light and perpendicular to the optical axis; the first average image plane being installed at the average position of the defocusing positions, where through-focus modulation transfer rates (values of MTF) of the visible light at central field of view, 0.3 field of view, and 0.7 field of view are at their respective maximum at a first spatial frequency; the first spatial frequency being 110 cycles/mm; and a second average image plane, which is an image plane specifically for infrared light and perpendicular to the optical axis; the second average image plane being installed at the average position of the defocusing positions, where through-focus modulation transfer rates of the infrared light (values of MTF) at central field of view, 0.3 field of view, and 0.7 field of view are at their respective maximum at the first spatial frequency; the first spatial frequency being 110 cycles/mm;

wherein the optical image capturing system consists of the seven lenses having refractive power; at least one lens among the first lens to the seventh lens is made of plastic; each lens among the first lens to the seventh lens has an object-side surface, which faces the object side, and an image-side surface, which faces the image side;

wherein the optical image capturing system satisfies:

$1.6 \leq f/HEP \leq 2.8$;

$14.9 \ deg < HAF \leq 35.0 \ deg$;

$3 \ \mu m \leq |AFS| \leq 10 \ \mu m$;

$0.5 \leq SETP/STP < 1$;

wherein f is a focal length of the optical image capturing system; HEP is an entrance pupil diameter of the optical image capturing system; HAF is a half of a maximum view angle of the optical image capturing system; AFS is a distance on the optical axis between the first average image plane and the second average image plane; ETP1, ETP2, ETP3, ETP4, ETP5, ETP6, and ETP7 are respectively a thickness at the height of ½ HEP of the first lens, the second lens, the third lens, the fourth lens, the fifth lens, the sixth lens, and the seventh lens; SETP is a sum of the aforementioned ETP1 to ETP7; TP1, TP2, TP3, TP4, TP5, TP6, and TP7 are respectively a thickness of the first lens, the second lens, the third lens, the fourth lens, the fifth lens, the sixth lens, and the seventh lens on the optical axis; STP is a sum of the aforementioned TP1 to TP7, and wherein the optical image capturing system further satisfies: TP1 is greater than anyone of TP2, TP3, TP4, TP5, TP6, and TP7.

20. The optical image capturing system of claim 19, wherein IN23 is a distance on the optical axis between the second lens and the third lens, IN34 is a distance on the optical axis between the third lens and the fourth lens, and IN67 is a distance on the optical axis between the sixth lens and the seventh lens; the optical image capturing system further satisfies:

$IN67 > IN23$; and $IN67 > IN34$.

21. The optical image capturing system of claim 19, wherein IN23 is a distance on the optical axis between the second lens and the third lens, IN34 is a distance on the optical axis between the third lens and the fourth lens, and IN56 is a distance on the optical axis between the fifth lens and the sixth lens; the optical image capturing system further satisfies:

$IN56 > IN23$; and $IN56 > IN34$.

22. The optical image capturing system of claim 19, wherein the optical image capturing system further satisfies:

$HOS/f \leq 1.5$;

wherein HOS is a distance between the object-side surface of the first lens and the first average image plane on the optical axis.

23. The optical image capturing system of claim 19, wherein the image-side surface of the first lens is convex on the optical axis, and the object-side surface of the sixth lens is convex on the optical axis.

24. The optical image capturing system of claim 19, wherein the image sensing device is disposed on the first average image plane and comprises at least 100 thousand pixels; the optical image capturing system further satisfies:

$0.2 \leq InS/HOS \leq 1.1$;

where InS is a distance between the aperture and the first average image plane on the optical axis; HOS is a distance between the object-side surface of the first lens and the first average image plane on the optical axis.

* * * * *